US006876765B2

(12) United States Patent
Suzuki

(10) Patent No.: US 6,876,765 B2
(45) Date of Patent: Apr. 5, 2005

(54) CHARACTER RECOGNITION METHOD AND COMPUTER-READABLE STORAGE MEDIUM

(75) Inventor: Toshihiro Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 668 days.

(21) Appl. No.: 09/819,866

(22) Filed: Mar. 29, 2001

(65) Prior Publication Data

US 2001/0028740 A1 Oct. 11, 2001

(30) Foreign Application Priority Data

Mar. 30, 2000 (JP) ........................................ 2000-094959

(51) Int. Cl.[7] ................................................ G06K 9/46
(52) U.S. Cl. ...................... 382/195; 382/176; 382/178; 382/179; 382/203; 382/229
(58) Field of Search ................................. 382/176, 199, 382/195, 203, 229, 164–165, 177–179, 185–189

(56) References Cited

U.S. PATENT DOCUMENTS 5,949,906 A * 9/1999 Hontani et al. ............. 382/177
6,035,059 A * 3/2000 Kurosawa et al. .......... 382/164
6,198,846 B1 * 3/2001 Nishiwaki ................... 382/178
6,535,619 B1 * 3/2003 Suwa et al. ................. 382/101

FOREIGN PATENT DOCUMENTS

| JP | 3-108079 | 5/1991 |
| JP | 5-233877 | 9/1993 |
| JP | 6-068305 | 3/1994 |

\* cited by examiner

Primary Examiner—Bhavesh M. Mehta
Assistant Examiner—Gregory Desire
(74) Attorney, Agent, or Firm—Oblon, Spivak, McClelland, Maier & Neustadt, P.C.

(57) ABSTRACT

A character recognition method carries out a character recognition using a cross section sequence graph which describes features of a character image. The character recognition method includes the steps of (a) extracting the cross section sequence graph from a character string image, (b) analyzing a singular region of the cross section sequence graph and generating a virtual boundary point sequence in the singular region based on an analyzed result, (c) generating character candidates by combining structural elements of the cross section sequence graph and recognizing one character by supplying the virtual boundary point sequence with respect to the generated character candidates if necessary, and (d) recognizing a character string based on an adjacency relationship of the character candidates which are recognized as one character in the step (c).

20 Claims, 48 Drawing Sheets

CHARACTER STRING IMAGE

BOUNDARY POINT & CROSS SECTION

CROSS SECTION SEQUENCE GRAPH

CROSS SECTION SEQUENCE & SINGULAR REGION

CROSS SECTION SEQUENCE GRAPH

FIG. 28
BCC : NORMAL BCC TAG
SS  : SS TAG
SR  : SR TAG
R   : ROUTE TAG (KIND OF VS TAG)
VS  : VS TAG
E   : END TAG (KIND OF VS TAG)
VCC : VCC TAG
VC  : BCC TAG PARTIALLY REPLACED BY VIRTUAL BOUNDARY POINT SEQUENCE
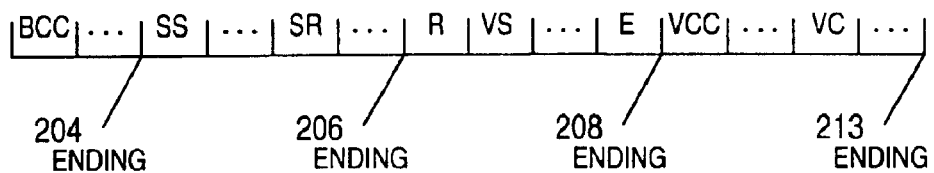
204 ENDING   206 ENDING   208 ENDING   213 ENDING
FIG. 29
TAG ARRAY (RIGHT OF FIG. 25) 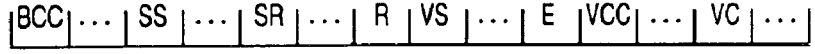
TAG SORT RESULT ARRAY 
207 ENDING 
208 ENDING 
212 ENDING 

FIG. 30

502    IMAGE DATA

FIG. 32

| SORT ARRAY | 6 | 2 | 0 | 5 | 4 | 7 | 3 | 1 | 8 | TAG NO. |

NEGATIVE BLANK

FIG. 35

SORT RESULT INCLUDING VS TAG

| SORT ARRAY | 9 | 6 | 2 | 0 | 5 | 4 | 7 | 3 | 1 | 8 | 11 |
|---|---|---|---|---|---|---|---|---|---|---|---|

| TAG NO. | 0 | 1 | 2 | 3 | 4 | 5 | 6 | 7 | 8 | 9 | 10 | 11 |
|---|---|---|---|---|---|---|---|---|---|---|---|---|
| TAG | BCC TAG 0 | BCC TAG 1 | SS TAG 0 | SS TAG 1 | SS TAG 2 | SR TAG 0 | SR TAG 1 | SR TAG 2 | SR TAG 3 | R TAG | VS TAG 0 | E TAG |
| CHILD | | | | | | | | | | | | |

ADDED VS TAG

FIG. 38

| SORT ARRAY | 9 | 8 | 2 | 0 | 5 | 4 | 10 | 7 | 3 | 1 | 8 | 11 |
|---|---|---|---|---|---|---|---|---|---|---|---|---|
| TAG NO. | 0 | 1 | 2 | 3 | 4 | 5 | 6 | 7 | 8 | 9 | 10 | 11 |
| TAG | BCC TAG 0 | BCC TAG 1 | SS TAG 0 | SS TAG 1 | SS TAG 2 | SR TAG 0 | SR TAG 1 | SR TAG 2 | SR TAG 3 | R TAG | VS TAG 0 | E TAG |
| CHILD | | | | | | | | | | | | |

FIG. 50
(a) IMAGE
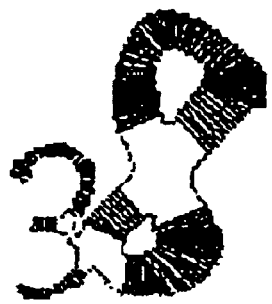
(b) CROSS SECTION
    SEQUENCE GRAPH
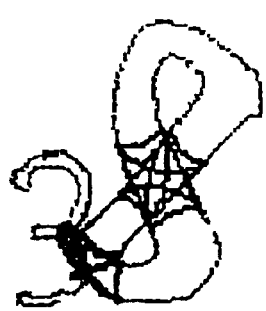
(c) VIRTUAL BOUNDARY
    POINT SEQUENCE
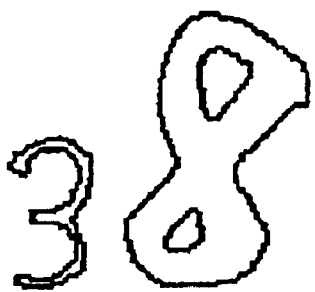
(d) PROCESSED RESULT

CHARACTER RECOGNITION METHOD AND COMPUTER-READABLE STORAGE MEDIUM

BACKGROUND OF THE INVENTION

The present application claims the benefit of a Japanese Patent Application No.2000-094959 filed Mar. 30, 2000, in the Japanese Patent Office, the disclosure of which is hereby incorporated by reference.

1. Field of the Invention

The present invention generally relates to character recognition methods and storage media, and more particularly to a character recognition method which uses a function for recognizing a single character and a function for recognizing a character string by appropriately extracting and recognizing a contacting character, a separated character and the like, and to a computer-readable storage medium which stores a program for causing a computer to carry out a character recognition by such a character recognition method. For example, the present invention is applied to a recognition of a character string made up of a plurality of lines, and a recognition of a character string which takes into account a contacting rule or the like.

2. Description of the Related Art

As a conventional method of recognizing a character string, there is a word reading method proposed in a Japanese Laid-Open Patent Application No.5-233877, for example. According to this proposed character recognition method, the character is extracted by a plurality of extracting methods, so that a correct character pattern is obtained even if the character has considerable separations or contacts.

When extracting the character according to the proposed character recognition method, data of a peripheral distribution of a character string pattern and data of a circumscribing rectangle are used. In other words, the rectangle is divided vertically based on the peripheral distribution. In addition, according to the proposed character recognition method, a direct access is made to image data in order to process a character candidate.

In closely adjacent characters or contacting characters of a character string, there are portions which cannot be mutually separated rectangularly or cannot be mutually separated linearly. According to the proposed character recognition method described above, the character recognition process is carried out in units of rectangles, even with respect to the closely adjacent characters and the contacting characters of the character string, and thus, there is a limit to improving the recognition accuracy.

In addition, an increase in the processing time required to carry out the character recognition process is unavoidable, because the direct access must be made to the image data.

SUMMARY OF THE INVENTION

Accordingly, it is a general object of the present invention to provide a novel and useful character recognition method and computer-readable storage medium, in which the problems described above are eliminated.

Another and more specific object of the present invention is to provide a character recognition method and a computer-readable storage medium which use a virtual boundary point sequence to appropriately extract adjacent or contacting characters of the character string, and improve the recognition accuracy while suppressing an increase of the processing time. It is possible to separate a contacting character by generating the virtual boundary point sequence with respect to a singular region of a cross section sequence graph. A separated character is subjected to the character recognition by being described by the virtual boundary point sequence and a boundary point sequence. The virtual boundary pint sequence is created by a smooth curve, thereby improving the recognition accuracy of the character recognition.

Still another object of the present invention is to provide a character recognition method and a computer-readable storage medium, which manage image features of different layers of a hierarchical structure by tags, so as to realize the recognition process at a high speed. In other words, structural elements of the cross section sequence graph are managed by the tags, and a common representation format or logic structure is employed for the tags.

A further object of the present invention is to provide a character recognition method for carrying out a character recognition using a cross section sequence graph which describes features of a character image, comprising the steps of (a) extracting the cross section sequence graph from a character string image, (b) analyzing a singular region of the cross section sequence graph and generating a virtual boundary point sequence in the singular region based on an analyzed result, (c) generating character candidates by combining structural elements of the cross section sequence graph and recognizing one character by supplying the virtual boundary point sequence with respect to the generated character candidates if necessary, and (d) recognizing a character string based on an adjacency relationship of the character candidates which are recognized as one character in the step (c). According to the character recognition method of the present invention, the virtual boundary point sequence is generated with respect to the singular region of the cross section sequence graph, and for this reason, it is possible to appropriately extract contacting characters of the character string and recognize the characters with a high accuracy. In addition, because the virtual boundary point sequence is generated in the singular region where the contacting characters of the character string exist, it is possible to positively separate the contacting characters.

Another object of the present invention is to provide a computer-readable storage medium which stores a program for causing a computer to carry out a character recognition, where the program comprises means for causing the computer to extract from a character string image, cross section sequences and a singular region of a first layer of a cross section sequence graph, and boundary point sequence of a second layer of the cross section sequence graph, means for causing the computer to generate character candidates by combining the cross section sequences, the singular region and the boundary point sequences, means for causing the computer to recognize one character with respect to the generated character candidates, and means for causing the computer to recognizing a character string based on an adjacency relationship of the character candidates which are recognized as one character. According to the computer-readable storage medium of the present invention, the virtual boundary point sequence is generated with respect to the singular region of the cross section sequence graph, and for this reason, it is possible to appropriately extract contacting characters of the character string and recognize the characters with a high accuracy. In addition, because the virtual boundary point sequence is generated in the singular region where the contacting characters of the character string exist, it is possible to positively separate the contacting characters.

Still another object of the present invention is to provide a computer-readable storage medium which stores a program for causing a computer to carry out a character recognition using a cross section sequence graph which describes features of a character image, where the program comprises the steps of (a) causing the computer to extract the cross section sequence graph from a character string image, (b) causing the computer to analyze a singular region of the cross section sequence graph and generating a virtual boundary point sequence in the singular region based on an analyzed result, (c) causing the computer to generate character candidates by combining structural elements of the cross section sequence graph and recognize one character by supplying the virtual boundary point sequence with respect to the generated character candidates if necessary, and (d) causing the computer to recognize a character string based on an adjacency relationship of the character candidates which are recognized as one character in the step (c). According to the computer-readable storage medium of the present invention, the virtual boundary point sequence is generated with respect to the singular region of the cross section sequence graph, and for this reason, it is possible to appropriately extract contacting characters of the character string and recognize the characters with a high accuracy. In addition, because the virtual boundary point sequence is generated in the singular region where the contacting characters of the character string exist, it is possible to positively separate the contacting characters.

A further object of the present invention is to provide a character recognition apparatus for carrying out a character recognition using a cross section sequence graph which describes features of a character image, comprising an extracting unit extracting the cross section sequence graph from a character string image, an analyzing unit analyzing a singular region of the cross section sequence graph and generating a virtual boundary point sequence in the singular region based on an analyzed result, a generating unit generating character candidates by combining structural elements of the cross section sequence graph and recognizing one character by supplying the virtual boundary point sequence with respect to the generated character candidates if necessary, and a recognizing unit recognizing a character string based on an adjacency relationship of the character candidates which are recognized as one character in the generating unit. According to the character recognition apparatus of the present invention, the virtual boundary point sequence is generated with respect to the singular region of the cross section sequence graph, and for this reason, it is possible to appropriately extract contacting characters of the character string and recognize the characters with a high accuracy. In addition, because the virtual boundary point sequence is generated in the singular region where the contacting characters of the character string exist, it is possible to positively separate the contacting characters.

Other objects and further features of the present invention will be apparent from the following detailed description when read in conjunction with the accompanying drawings.

BRIEF DESCRIPTION OF THE DRAWINGS

FIG. 28 is a diagram showing a state where a tag array is used;

FIG. 29 is a diagram showing a state of the tag array and a sort result array;

FIG. 30 is a diagram showing a character string image which becomes a processing target;

FIG. 32 is a diagram showing sort results of tag numbers;

FIG. 35 is a diagram showing a sort result obtained by adding the VS tag to element tags;

FIG. 38 is a diagram showing a result of the element tag adopt/reject selection;

FIG. 50 is a diagram for explaining processed results obtained by the embodiment of the present invention.

DESCRIPTION OF THE PREFERRED EMBODIMENTS

Figure 1:
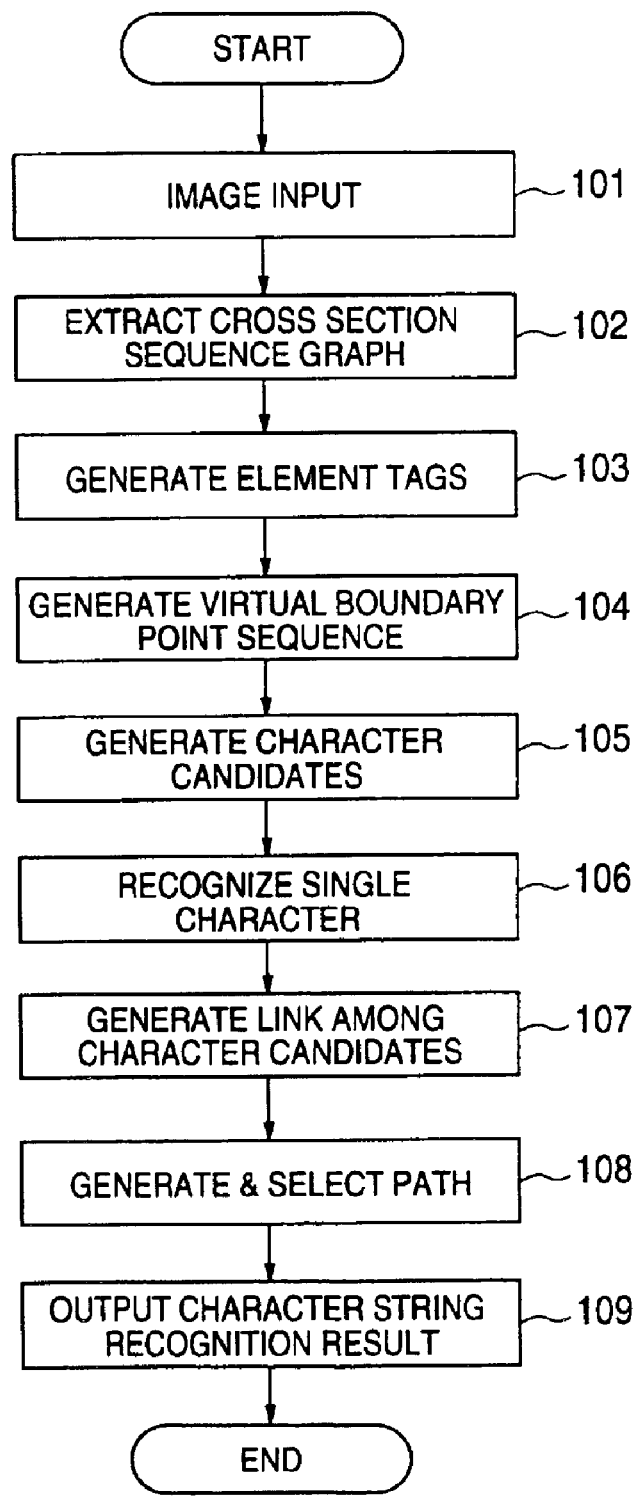
FIG. 1 is a flow chart for explaining the general operation of an embodiment of the present invention.

A description will be given of the operating principle of the present invention. The present invention is based on the following three concepts.

First, the present invention employs the concept of "combining feature elements" such as SS tags, SR tags and BCC tags which will be described later. The concept of "combining feature elements" is realized by a novel technique which uses a cross section sequence graph and a virtual boundary point sequence. According to this technique, the recognition accuracy is improved by correctly extracting a contacting character string, and an increase in the amount of processing required to make such an extraction is greatly suppressed.

Second, the present invention employs the concept of "using a common representation format for a plurality of kinds of character elements and character candidates". The character elements are cross section sequence, singular regions, boundary point sequences and the like. The concept of "using a common representation format for a plurality of kinds of character elements and character candidates" is realized by a novel technique which manages features of different layers of a hierarchical structure, such as an higher layer and a lower layer of the cross section sequence graph, by tags, and using the common representation format for the tags. As a result, the increase in the amount of processing is suppressed, and a processing means in particular is simplified.

Third, the present invention employs the concept of "integrating a back-track approach and a hypothesis verifying (or path selecting) approach, which utilize the hierarchical structure". The back-track approach and the hypothesis verifying (or path selecting) approach are well known approaches. The back-track approach employs the concept of "carrying out a process over again only if uncertain". On the other hand, the hypothesis verifying (or path selecting) approach employs the concept of "listing as many possibilities as possible from the beginning, and selecting an optimum combination of the possibilities". The integration of the back-track approach and the hypothesis verifying (or path selecting) approach is realized by a novel technique which employs a reserving/inheriting process, in addition to employing the tags described above. As a result, the increase in the amount of process is suppressed, while maintaining a high recognition accuracy.

Therefore, the present invention balances the recognition accuracy and the amount of processing, by employing the concept of "adding the virtual boundary point sequence to the cross section sequence graph, and managing by use of the tags".

[Cross Section Series Graph]

A description will be given of the cross section sequence graph. The cross section sequence graph is a method of representing line graphics proposed by the present inventor in a Japanese Laid-Open Patent Application No.6-68305 (now Japanese Patent No.2615247).

In other words, according to this method previously proposed by the present inventor, a cross section approximately perpendicular to a direction of a line segment is extracted from a line graphics image data, and a sequence of such cross sections is defined as a cross section sequence. In addition, regions other than the cross section sequence is regarded as uncertain regions. A graph structure (cross section sequence graph) is created in which each node represents the cross section sequence or the uncertain region and each arc represents connecting relationships of the nodes. This cross section sequence graph is used as the features of the line graphics.

Figure 12:
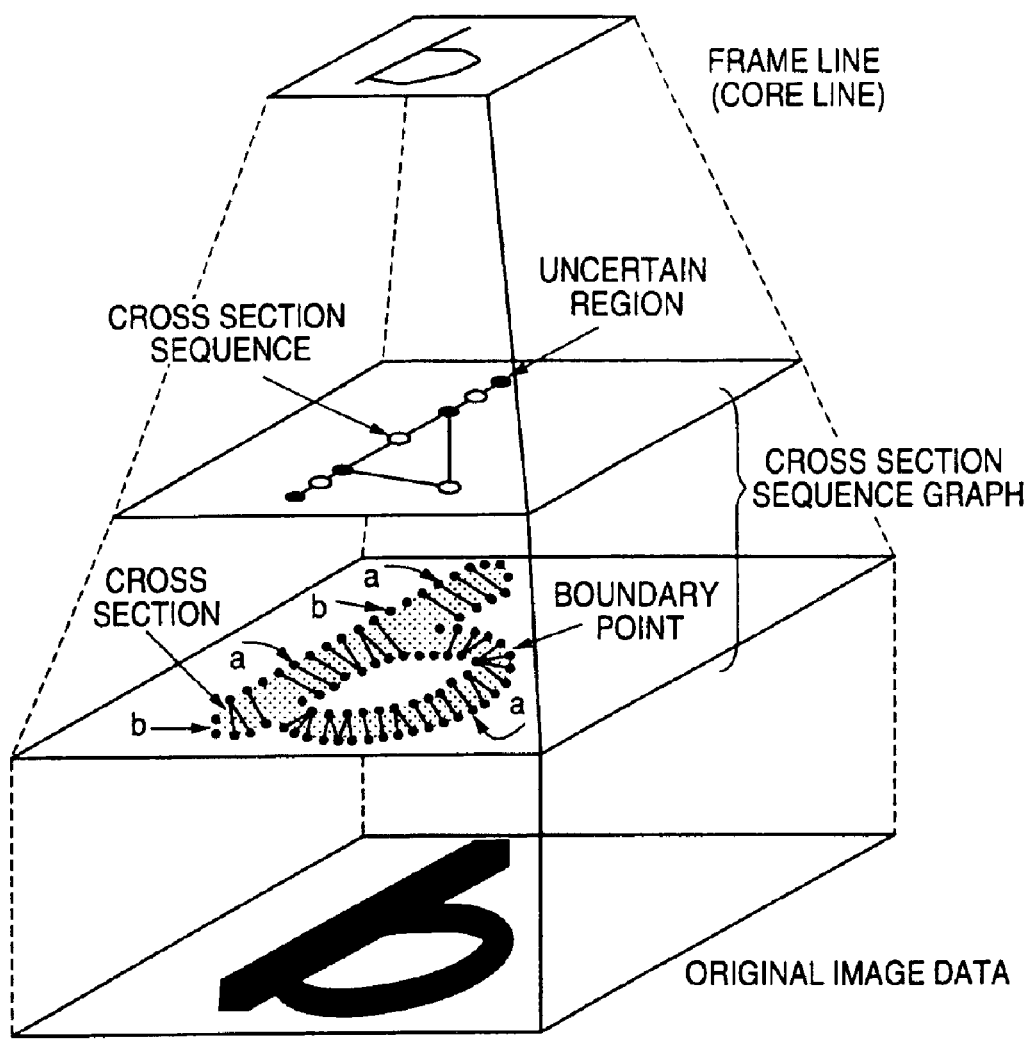
FIG. 12 is a diagram for explaining a relationship of a line graphics image data (original image data), a cross section sequence graph and a frame line (core line)

FIG. 12 is a diagram for explaining a relationship of the line graphics image data (original image data), the cross section sequence graph and a frame line (core line). In a line segment description by the cross section sequence graph having such a hierarchical structure, the cross section, which is a structural element, has a characteristic such that the cross section is approximately perpendicular to the direction of the line segment. In addition, in the cross section sequence, which is a structural element of a layer higher than that of the cross section, the cross sections are ordered as if in time-sequence, as indicated by "a" in FIG. 12. The uncertain region is the region not included in the cross section sequence, as indicated by "b" in FIG. 12, and includes planar regions of line ends, bends, branches and intersections.

Accordingly, the cross section sequence graph simplifies the description of the line graphics by clearly separating the line graphics into parts of simple lines and parts of lines other than the simple lines. It is possible to easily carry out a structural feature matching or general structural matching of features such as frame lines, based on the cross section sequence graph.

Figure 13:
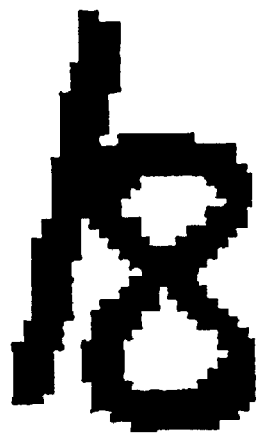
FIG. 13 is a diagram showing a character string image.
Figure 14:
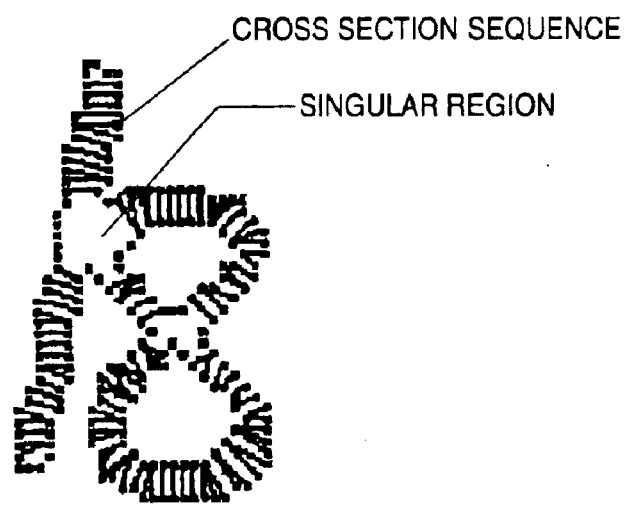
FIG. 14 is a diagram showing cross sections and boundary points of the cross section sequence graph with respect to the character string image shown in FIG. 13.
Figure 15:
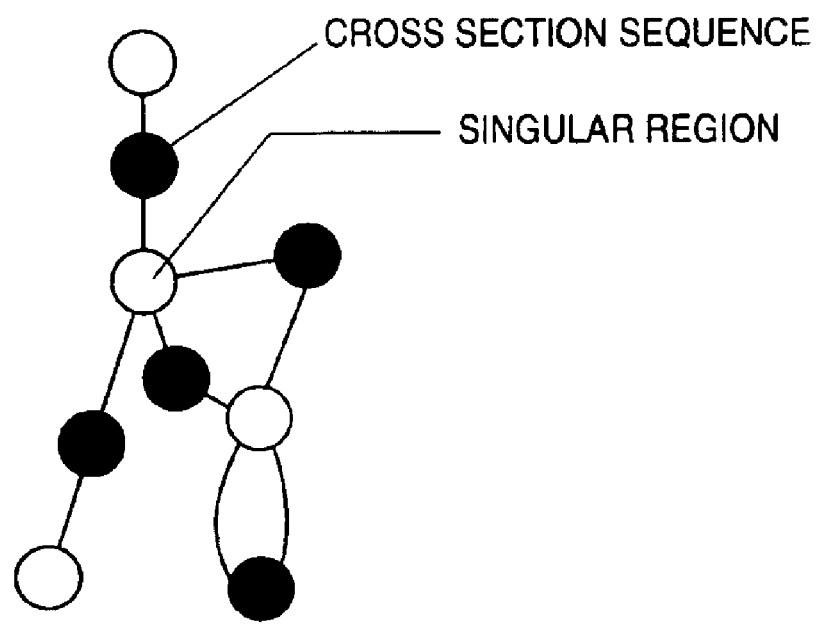
FIG. 15 is a diagram showing singular regions and cross section sequence of the cross section sequence graph with respect to the character string image shown in FIG. 13.

The cross section sequence graph describes the image data hierarchically. FIG. 13 is a diagram showing a character string image. FIG. 14 is a diagram showing cross sections and boundary points of the cross section sequence graph with respect to the character string image shown in FIG. 13. Further, FIG. 15 is a diagram showing singular regions and the cross section sequence of the cross section sequence graph with respect to the character string image shown in FIG. 13.

In FIG. 14, each point (black pixel side) on a contour is called a boundary point. In addition, a sequence of boundary points corresponding to the contour is called a boundary point sequence. There are two kinds of boundary point sequences, namely, an outer boundary point sequence and an inner boundary point sequence. In the particular case shown in FIG. 14, there is one outer boundary point sequence, and two inner boundary point sequences respectively corresponding to the two circular portions on the inner side of the contour of the character "8".

The cross section refers to a boundary point pair which are obtained so as to be approximately perpendicular to the direction of the line segment. In FIG. 14, the cross section is represented by a line connecting the boundary points. A sequence of cross sections which are arranged without gaps and without contradictions is referred to as the cross section sequence, and regions other than the cross section sequence are referred to as singular regions. The singular region corresponds to the uncertain region employed by the method proposed in the Japanese Patent No.2615247 described above. The term singular region is used in the present invention. The cross section sequence represents the normal character line portion, and the singular region represents the connecting portion and the end point portion of the character line portion.

The structural elements {boundary point, boundary point sequence, cross section, cross section sequence, singular region} themselves are features. Further, these structural elements have the function of structuring the image data by a combination thereof.

By regarding the structural elements {boundary point, boundary point sequence, cross section} as structural elements of a lower layer of the hierarchical structure, and regarding the structural elements {cross section sequence, singular region} as structural elements of a higher layer of the hierarchical structure, a general structure of the line graphics (characters) can be represented by the higher layer, and a detailed structure of the line graphics (characters) can be represented by the lower layer.

By taking into consideration error countermeasures of an extracting step which will be described later, the structural element {cross section] of the present invention will be described in the following by reference to the higher layer and not the lower layer.

Fundamentally, the present invention utilizes the cross section sequence graph. Particular representation methods of the cross section sequence graph are shown in FIGS. 16 through 20. FIGS. 16 through 20 are diagrams showing representation formats and methods of extracting the structural elements. A description of the method of extracting the structural elements shown in FIGS. 16 through 20 will be omitted in this specification, since the extracting method is described in the Japanese Patent No.2615247 described above.

Figure 16:
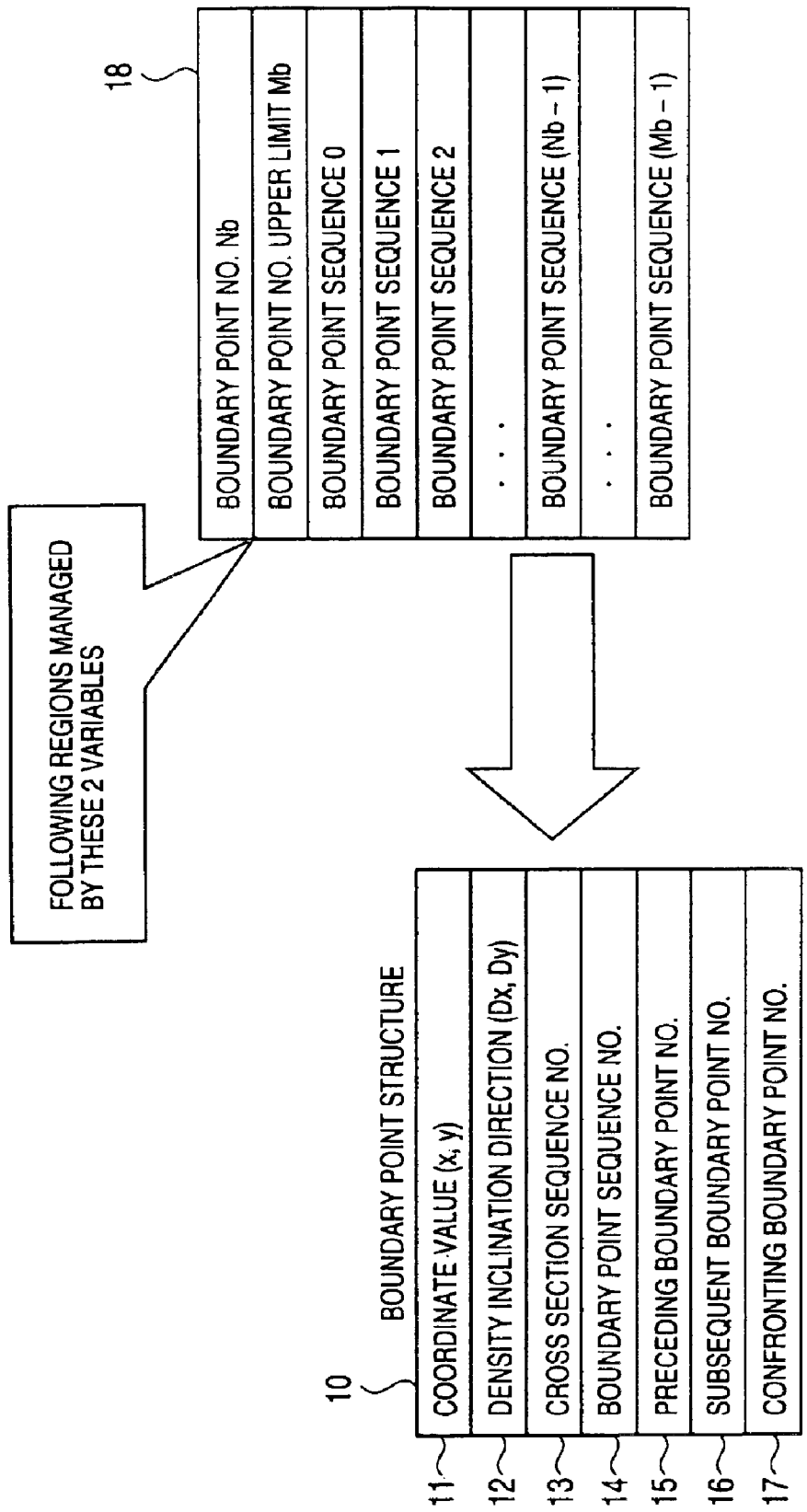
FIG. 16 is a diagram showing a representation format of boundary points.

FIG. 16 is a diagram showing a representation format of the boundary point. One boundary point is described by one structure. More particularly, the structure is arranged in a continuous region 18 of a memory as shown on the right side of FIG. 16, and this continuous region 18 is managed by two variables Mb and Nb, where Mb indicates an upper limit of the continuous region 18 and Nb indicates a number of boundary points actually used.

A boundary point structure 10 includes a coordinate value (x, y) 11, a density inclination direction (Dx, Dy) 12, a cross section sequence number 13, a boundary point sequence number 14, a preceding boundary point number 15, a subsequent boundary point number 16, and a confronting boundary point number 17. The density inclination direction (Dx, Dy) 12 is a direction from a character background towards a character line portion, and is approximately perpendicular to a boundary direction. The preceding boundary point number 15 is the number assigned to the boundary point which appears next when viewing the character line portion to the left. The subsequent boundary point number 16 is the number assigned to the boundary point which appears before when viewing the character line portion to the left. A boundary point q which appears first when searching for a black pixel in the density inclination direction from a certain boundary point p is called the confronting boundary point with respect to the boundary point p. The confronting boundary point is referred to as an extension boundary point in the Japanese Patent No.2615247 described above. The confronting boundary point number 17 is the number assigned to the confronting boundary point.

Figure 17:
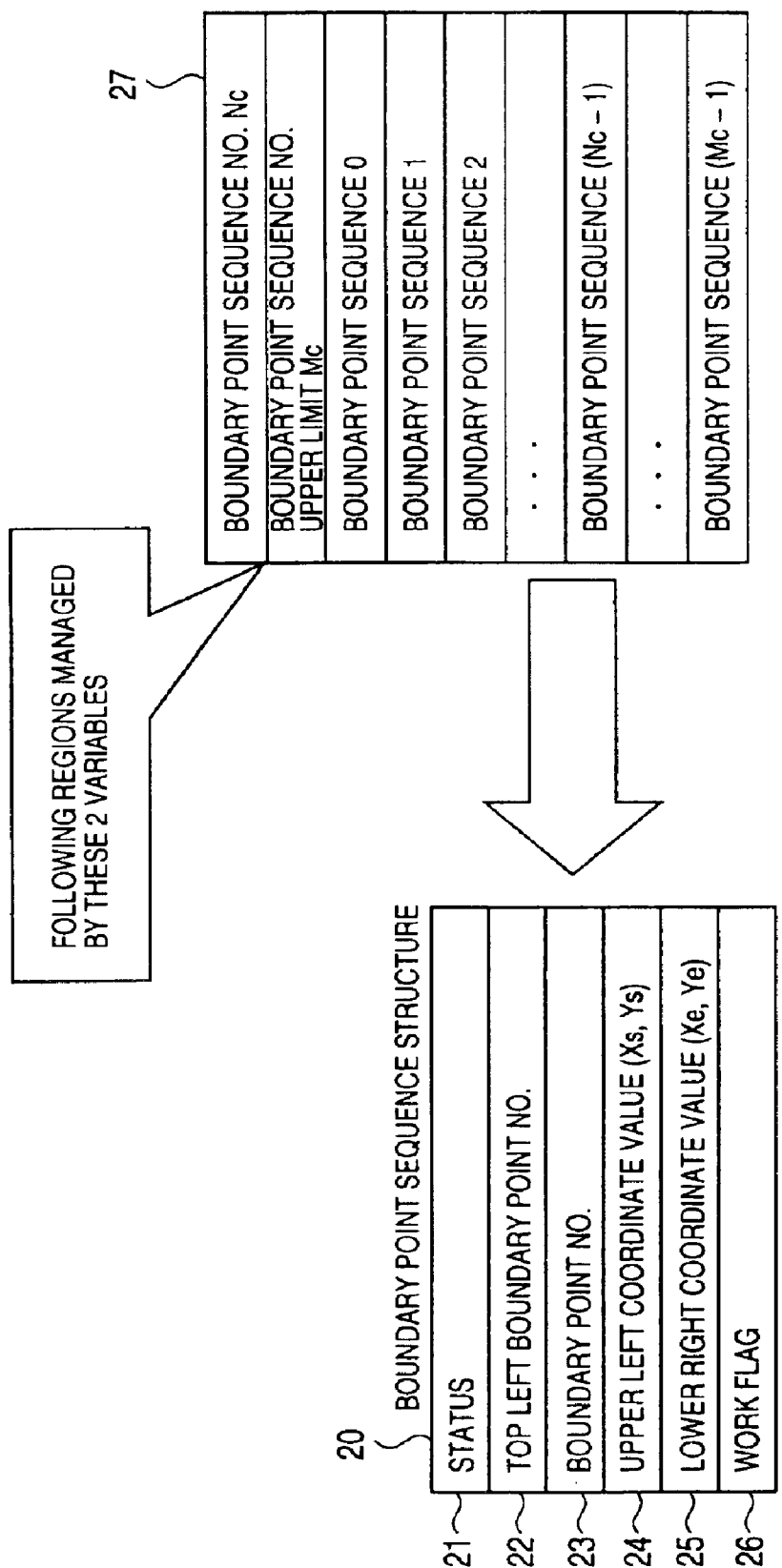
FIG. 17 is a diagram showing a representation format of boundary point sequences.

FIG. 17 is a diagram showing a representation format of the boundary point sequences. Similarly as in the case of the boundary point structure 10 described above, one boundary point sequence is described by one structure, and a plurality of boundary point sequences 0 through Mc-1 are arranged in a continuous region 27 of the memory.

A boundary point sequence structure 20 includes a status 21 indicating a flag for distinguishing the outer boundary point sequence, the inner boundary point sequence and noise, a top left boundary point number 22, a boundary point number 23 indicating a number of boundary points in one round, an upper left coordinate value (Xs, Ys) 24 of a circumscribing rectangle of the boundary point sequence, a lower right coordinate value (Xe, Ye) of a circumscribing rectangle of the boundary point sequence, and a work flag 26 indicating a work variable which temporarily is used during various processes.

Figure 18:
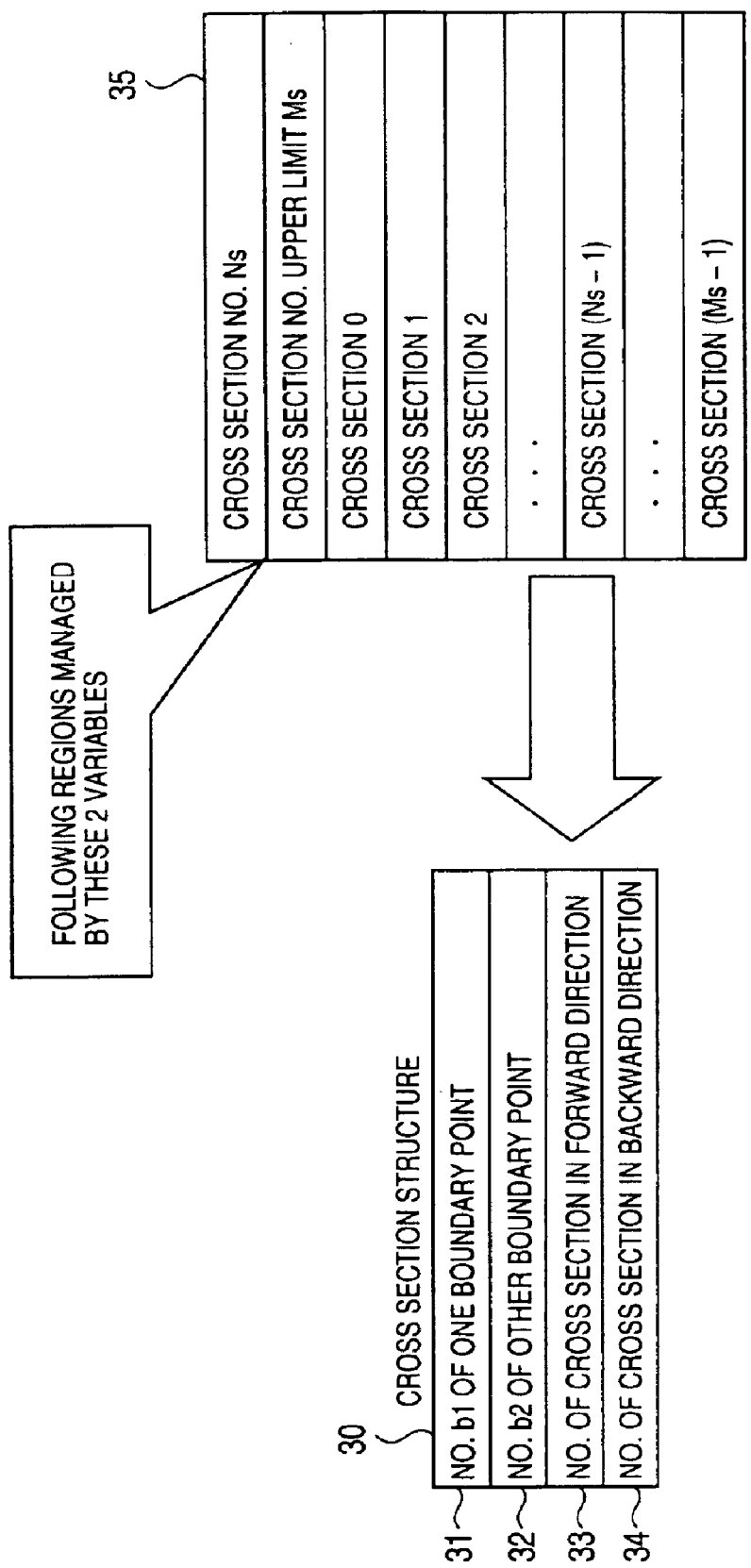
FIG. 18 is a diagram showing a representation format of cross sections.

FIG. 18 is a diagram showing a representation format of the cross sections. Similarly as in the case of the boundary point sequence structure 20 described above, one cross section is described by one structure, and a plurality of cross sections 0 through Ms-1 are arranged in a continuous region 35 of the memory.

A cross section structure 30 includes a number 31 of one (b1) of the boundary points, a number 32 of the other boundary point (b2), a number 33 of the cross section in a forward direction from the boundary point b1, and a number 34 of the cross section in a backward direction from the boundary point b2.

Figure 19:
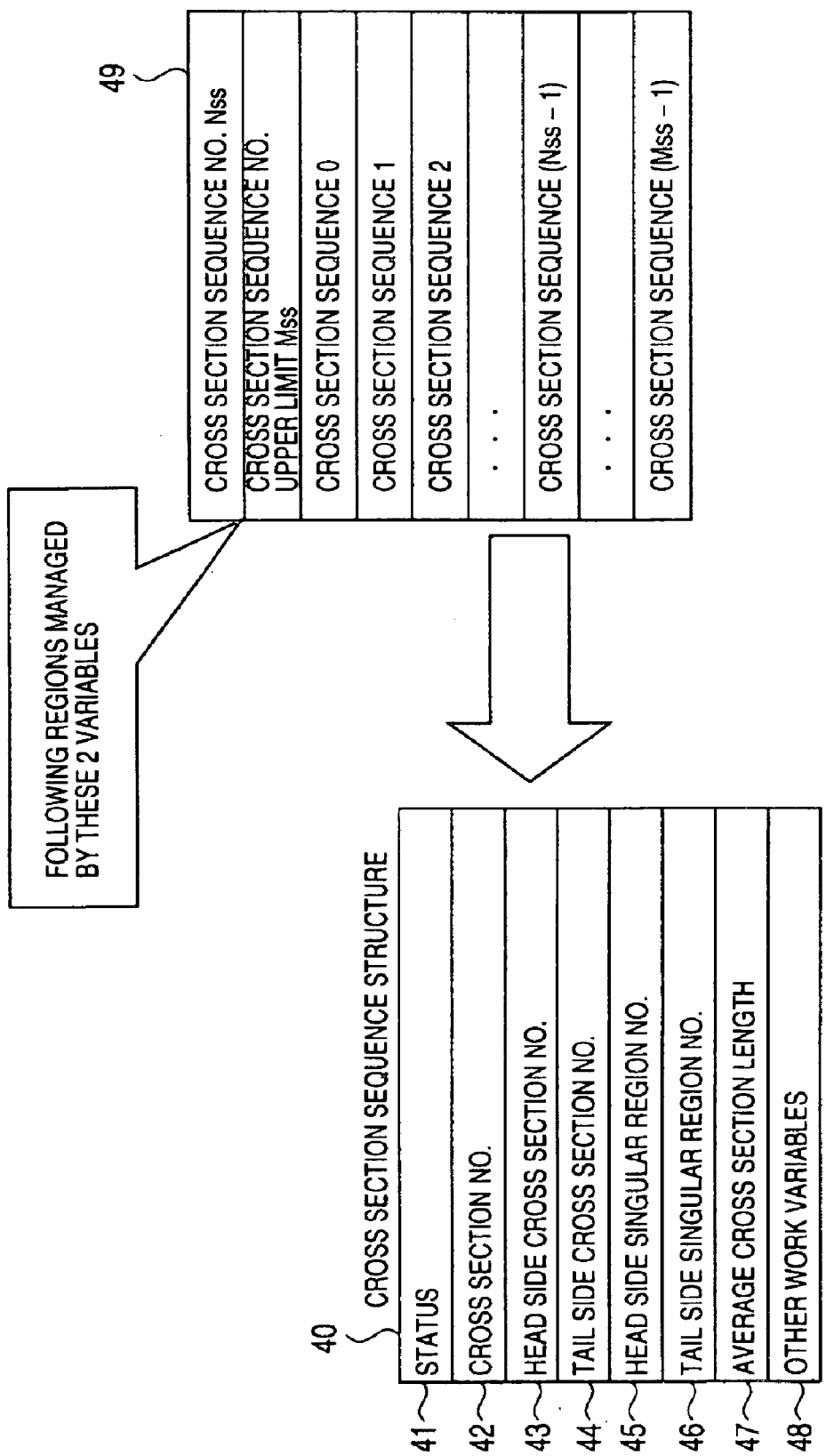
FIG. 19 is a diagram showing a representation format of cross section sequence.

FIG. 19 is a diagram showing a representation format of the cross section sequence. A cross section sequence structure 40 includes a status 41 indicating a valid/invalid flag, a number 42 of cross sections, a head side cross section number 43, a tail side cross section number 44, a head side singular region number 45, a tail side singular region number 46, an average cross section length 47 corresponding to an estimated line width, and other work variables 48 such as the point (node) number of the graph representation. When a cross section of the cross section sequence does not have another cross section in a forward direction, this cross section is referred to as the head (or head side) cross section of the cross section sequence. On the other hand, when a cross section of the cross section sequence does not have another cross section in a backward direction, this cross section is referred to as a tail (or tail side) cross section of the cross section sequence.

Figure 20:
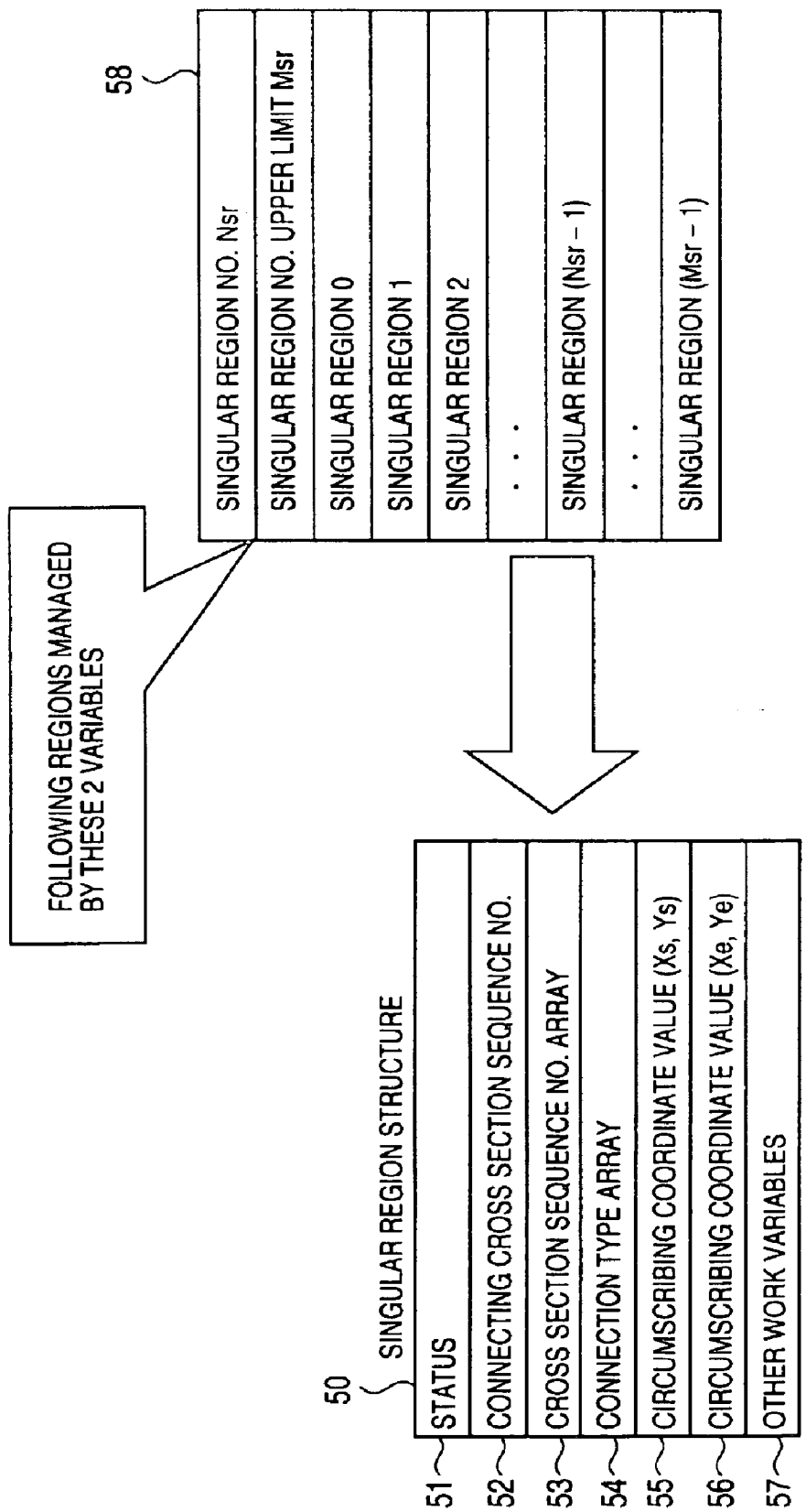
FIG. 20 is a diagram showing a representation format of singular regions.

FIG. 20 is a diagram showing a representation format of the singular regions. A singular region structure 50 includes a status 51 indicating a valid/invalid flag, a number 52 of connecting cross section sequences, an array 53 of the cross section sequence numbers, an array 54 of connection types, a circumscribing coordinate value (Xs, Ys) 55, a circumscribing coordinate value (Xe, Ye) 56, and other work variables 57 such as the point (node) number of the graph representation. The number 52 of connecting cross section sequence is an effective number of the two arrays 53 and 54. The arrays 53 and 54 are mutually corresponding arrays, and the connection type distinguishes the ends of cross section sequences.

An access to other structure is possible via the number of the cross section sequences of the structure, the number of the boundary point sequences and the like described above.

As described in the Japanese Patent No.2615247 described above, a graph representation of the frame is extracted in the process of obtaining the cross section sequence graph. In addition, by approximating the boundary point sequence by polygons, it is also possible to extract a graph representation of the contour. Accordingly, by incorporating the methods of analyzing these graph representations, it is possible to realize a single character recognition means. Moreover, by incorporating a method of statistically analyzing directionality or the like of the boundary points, it is possible to realize a different single character recognition means.

In the description given hereunder, the above described structural elements will be denoted by the following abbreviations. In other words, the boundary point is denoted by B (abbreviation for Border), the boundary point sequence is denoted by C (abbreviation for Contour), the cross section is denoted by S (abbreviation for Slice), the cross section sequence is denoted by SS (abbreviation for Slice Sequence), and the singular region is denoted by SR (abbreviation for Singular Region).

[Virtual Boundary Point Sequence]

One of the characterizing features of the present invention is that the present invention uses the concept of the virtual boundary point sequence. Hence, a description will be given of the virtual boundary point sequence, by referring to FIGS. 21 through 24.

Figure 21:
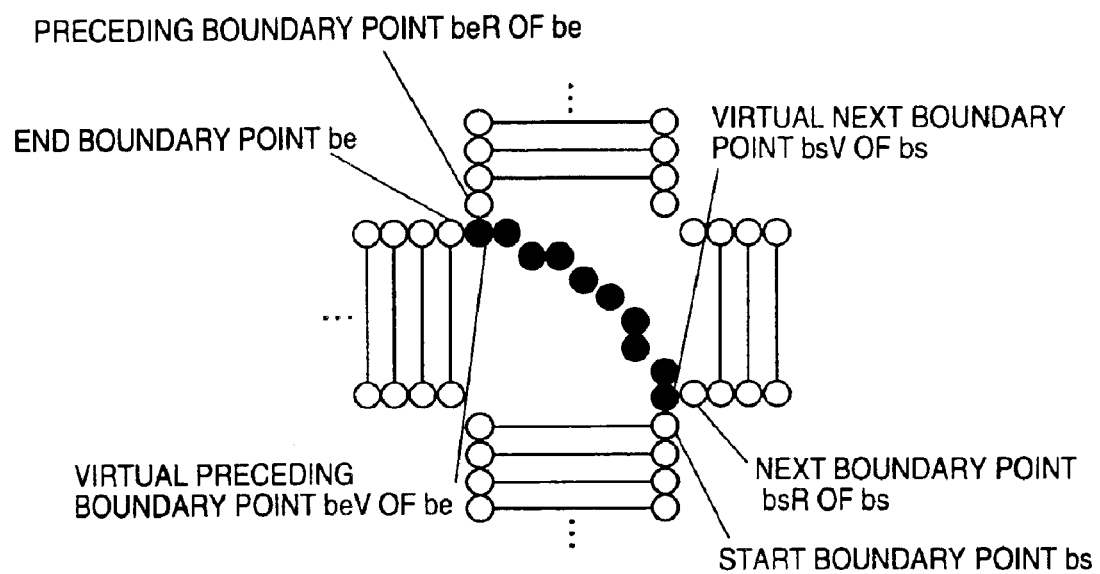
FIG. 21 is a diagram for explaining a virtual boundary point sequence segment.

FIG. 21 is a diagram for explaining a virtual boundary point sequence segment which connects from a boundary point bs to a boundary point be. Each boundary point of the virtual boundary point sequence segment is indicated by a black circular mark, and the same representation format is used as in FIG. 16. In the boundary point structure 10 shown in FIG. 16, there is the preceding boundary point number 15 and the subsequent boundary point number 16 as described above, and the boundary point structure 10 is connected in the form of a bidirectional list.

Originally, the start boundary point bs and a next boundary point bsR (R is an abbreviation for Real) are connected, but this connection is switched so that the start boundary point bs and a virtual next boundary point bsV (V is an abbreviation for Virtual) become connected, as if switching a railway switch. A similar switching is made on the side of the end boundary point b2, and the boundary points are traced. The boundary point sequence (broadly interpreted virtual boundary point sequence) which is obtained as a result of this tracing of the boundary points becomes different from the original boundary point sequence. The virtual boundary point sequence is effectively used when representing separation of a contacting character, as will be described later.

Figure 22:
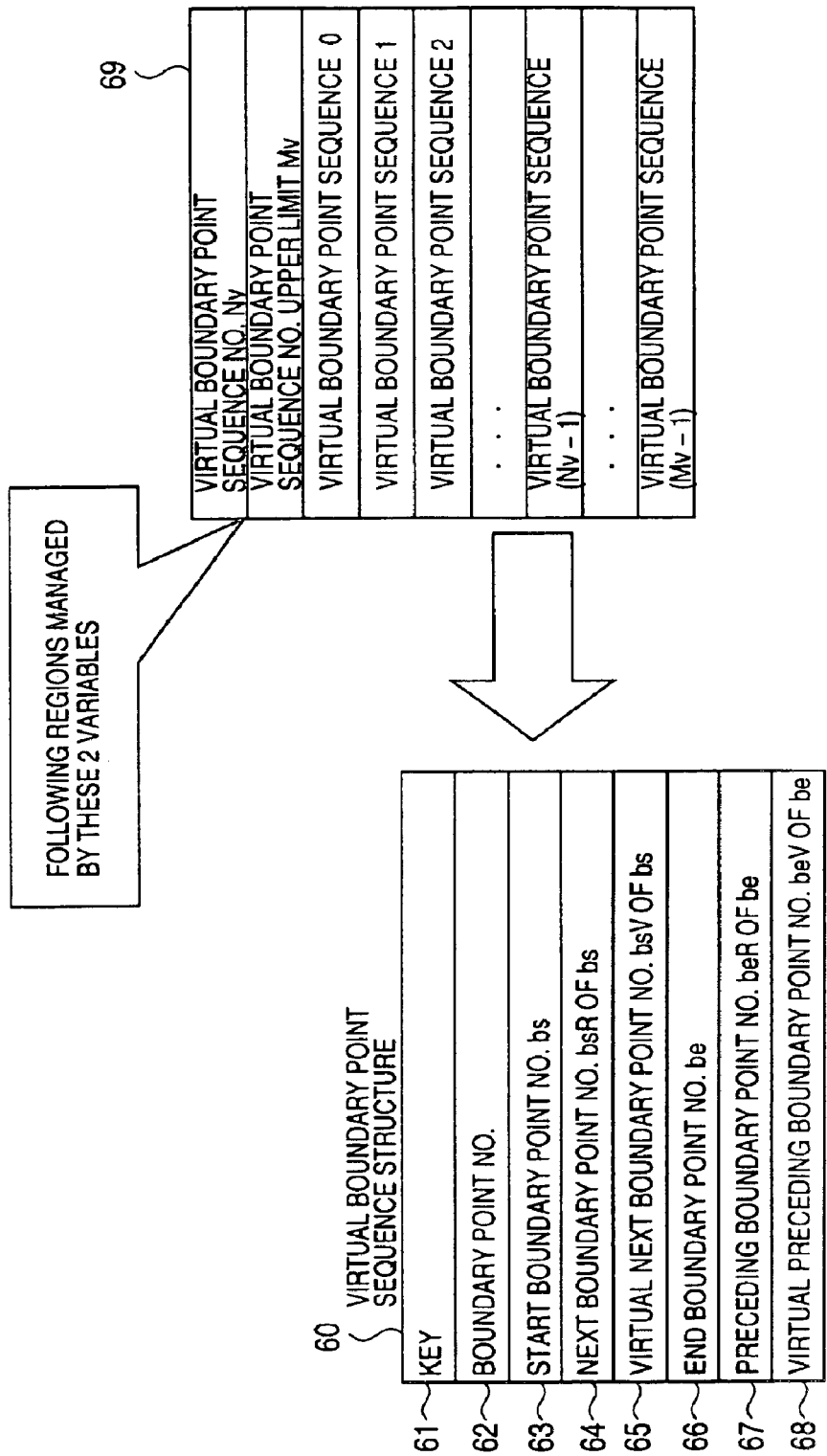
FIG. 22 is a diagram showing a representation format of virtual boundary point sequences.

The virtual boundary point sequence segment and switching information thereof, together, are referred to as a narrowly interpreted virtual boundary point sequence, and the virtual boundary point sequence is described by a representation format shown in FIG. 22. A virtual boundary point sequence structure may be managed by a method similar to the method described above in conjunction with FIGS. 16 through 20.

FIG. 22 is a diagram showing a representation format of the virtual boundary point sequences. A virtual boundary point sequence structure 60 includes a key 61 shown in FIG. 23 which will be described later, a number 62 of boundary points, a number 63 of the start boundary point bs, a number 64 of the next boundary point bsR next to the boundary point bs, a number 65 of the virtual next boundary point bsV next to the boundary point bs, a number 66 of the end boundary point be, a number 67 of the preceding boundary point beR preceding the end boundary point be, and a number 68 of the virtual preceding boundary point beV preceding the end boundary point be which are shown in FIG. 21. The three numbers 63, 64 and 65 correspond to the connection switching information of the start boundary point bs. On the other hand, the three numbers 66, 67 and 68 correspond to the connection switching information of the end boundary point be.

Figure 23:
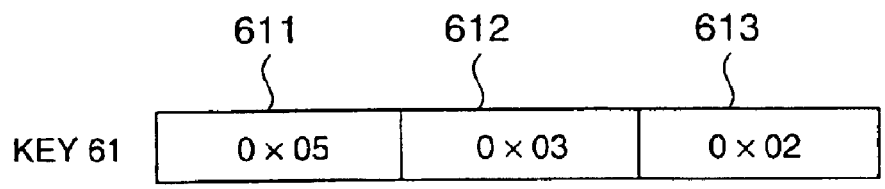
FIG. 23 is a diagram for explaining a connecting pattern of the singular region.

The key 61 indicates information used for later searching the obtained virtual boundary point sequence. FIG. 23 is a diagram for explaining a connecting pattern of the singular region. As shown in FIG. 23, a format of the key 62 includes a singular region number 611, a reference number 612 of the cross section sequence having the start boundary point (bs), and a reference number 613 of the cross section sequence having the end boundary point (be), and represents the connecting pattern of the singular region. The key 61 may be omitted when dynamically obtaining the virtual boundary point sequence.

Figure 24:
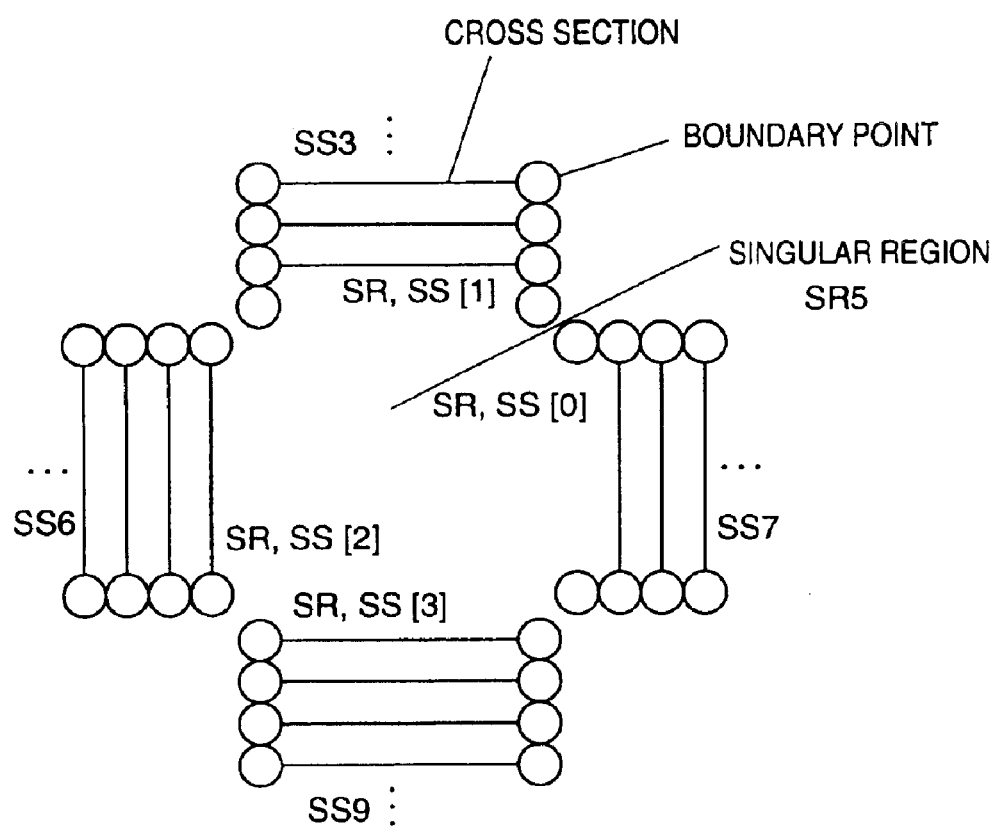
FIG. 24 is a diagram for explaining a state of connection of the singular region.

The connecting pattern shown in FIG. 23 is for a singular region (SR5) shown in FIG. 24. FIG. 24 is a diagram for explaining a state of connection of the singular region. For the sake of convenience, a connecting pattern will be considered for a case where the singular region SR5, a lower cross section sequence SS9 and a left cross section sequence SS6 are specified. When referring to two cross section sequences from the singular region SR5, a reference is first made to the singular region structure 50 shown in FIG. 20 of the singular region number of the singular region SR5, and a reference is then made to the data of the array 53. The data of the array 53, that is, the array data, are preset so as to be in a counterclockwise order. In other words, if the cross section sequence SS6 is set second and the cross section sequence SS9 is set third in the array, for example, the representation of the connecting pattern becomes as shown in FIG. 23.

A problem occurs when the cross section sequences form a loop and connect to the same singular region. In other words, in the particular case shown in FIG. 24, if the other of the cross section sequence SS9 exists in place of the cross section sequence SS6, for example, it becomes impossible to specify which of the four boundary points are to be used as the start boundary point and the end boundary point by merely specifying only the cross section sequence number.

Accordingly, a description will now be given of a method of specifying the start boundary point and the end boundary point of the virtual boundary point sequence segment.

In the particular case shown in FIG. 24, four cross section sequences {SS3, SS6, SS7 and SS)} connect to the singular region SR5.

Information used to make a reference to the cross section sequence from the singular region SR5 corresponds to the data in the array 53 shown in FIG. 20. This information is indicated by SR5.SS[i] (i=0, ..., 3). As described above, it is assumed that the order of this information matches the order in which the cross section sequences are arranged counterclockwise when viewing the singular region SR5 to the left.

In other words, the following representations stand in the case shown in FIG. 24.

SR5.SS[0]=SS7
SR5.SS[0]=SS3
SR5.SS[2]=SS6
SR5.SS[3]=SS9

Since the specified cross section sequences are SS9 and SS6, the following representations can be made.

SR5.SS[0]: Including
SR5.SS[1]: Non-Including
SR5.SS[2]: Including
SR5.SS[3]: Including When these sequences are used cyclically, since the locations where the virtual boundary point sequence segment is to be generated is from SR5.SS[3]=SS9 to SR5.SS[2]=SS6, it may be seen that the locations match those of the cross section sequences sandwiching a continuous section of "Non-Including" cross section sequences.

In the particular case described above, a section from SR5.SS[0] to SR5.SS[1] is the continuous section of "Non-Including" cross section sequences, and one of the cross section sequences sandwiching this continuous section of "Non-Including" cross section sequences is SR5.SS[3]=SS9 while the other is SR5.SS[2]=SS6.

Accordingly, instead of using the SS number as it is, a general rule becomes "When arranging in order cross section sequences (SSs) which are referred to from a singular region (SR) and using the SSs cyclically, the SS preceding a continuous section of "Non-Including" SSs is located on a start side, and the SS subsequent to this continuous section of "Non-Including" SSs is located on an end side."

Furthermore, a rule stating that "With respect to the start side, of the cross section closest to the SR, a boundary point on the right (last) towards the SR is regarded as a start boundary point, and with respect to the end side, of the cross section closest to the SR, a boundary point on the left (first) towards the SR is regarded as an end boundary point." is added.

When one SR, the start side SS and the end side SS are specified, these rules determine the connecting pattern, and specify the start boundary point and the end boundary point. When the start side SS and the end side SS are interchanged, the other virtual boundary point sequence segment is selected.

When three or more SSs connect to the SR, it is possible to carry out a correct process by applying the above described rules after replacing the above by a combination of pairs. In addition, when SR5.SS[3] and SR5.SS[0] shown in FIG. 24 are specified in this order, no missing SS exists therebetween, and this real boundary point sequence may be used as it is. On the other hand, when SR5.SS[i] and SR5.SS[i] are specified, that is, two identical SSs are specified, the process corresponds to end point processing, but it is possible to process this case similarly as described above without exception.

Next, a description will be given of a method of generating the virtual boundary point sequence between two boundary points which are specified as described above.

A simplest method is to obtain coordinate values which are passed when linearly connecting two boundary points, and to generate virtual boundary points having these coordinate values. But according to this method, the smoothness of the curve is lost, and an unwanted corner is generated at the connecting part, thereby increasing the possibility of deteriorating the recognition accuracy.

Accordingly, the present invention does not linearly connect two boundary points, but instead employs a curve generation method which is often used in fields such as computer graphics (CG) and font generation. More particularly, it is possible to employ the Ferguson method or the like because it is possible to obtain coordinate values P0 and P1 of the two points and estimated values of tangential directions P0' and P1' of the respective coordinate values P0 and P1. The Ferguson method is a known parametric method of generating a curve, which integrates four vectors by a third order polynomial. Of course, the present invention is not limited to the use of the Ferguson method, and it is possible to employ other curve generating methods.

Because the present invention can generate the virtual boundary point sequence employing the curve generating method described above, the recognition accuracy can effectively be improved.

In a case where the line width is extremely small, the length of the virtual boundary point sequence segment becomes short. Hence, in this case, the accuracy of the character recognition may virtually be unaffected by the accuracy of the interpolation. In addition, the same holds true for a case where the boundary points on both ends are extremely close to each other. Hence, in such cases, there is no need to generate the virtual boundary point, and the boundary points on both ends may be directly connected logically. More particularly, only the connecting information of the boundary points need to be changed. As a result, the amount of the required processing can be reduced.

As described above, what is important about the virtual boundary point sequence used in the present invention is that "the virtual boundary point sequence is not plotted on an image plane, but is realized by a feature representation called a cross section sequence graph".

[Representation Format of Tags]

Figure 25:
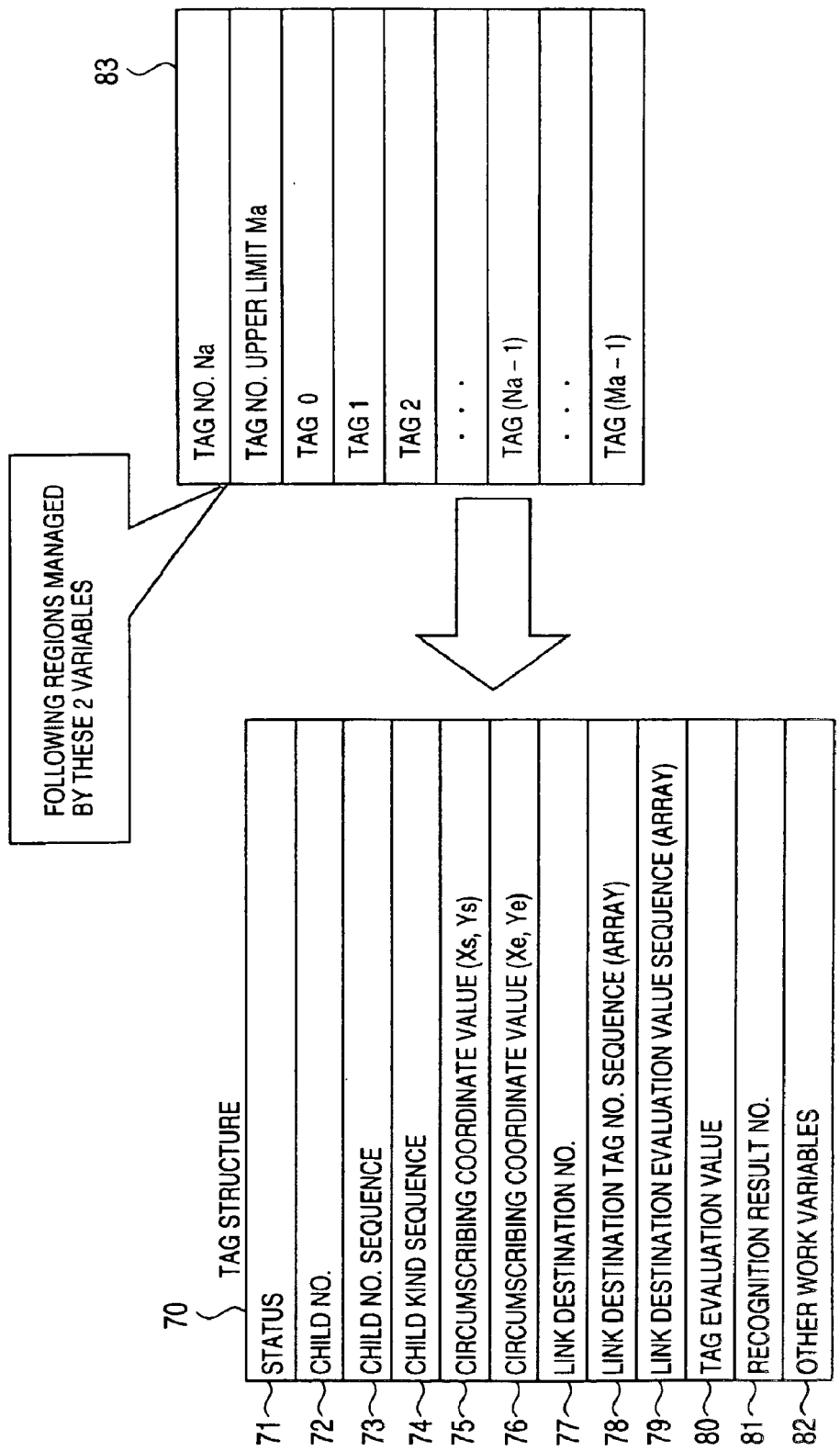
FIG. 25 is a diagram showing a representation format of tags.

The process of the present invention uses logical structural elements called tags. FIG. 25 is a diagram showing a representation format of the tags. A tag structure 70 includes a status 71, a number 72 of children, a number sequence 73 of children, a kind sequence 74 of children, a circumscribing coordinate value (Xs, Ys) 75, a circumscribing coordinate value (Xe, Ye) 76, a number 77 of link destinations, a sequence 78 of tag numbers of link destinations, a sequence 79 of evaluation values of link destinations, evaluation values 80 of tags, a recognition result number 81, and other work variables 82. The status 71 indicate a valid/invalid flag, an integration enable/disable flag, and a flag indicating the kind of flag. The number 72 of children indicates an effective number of next two arrays. The number sequence 74 and the kind sequence 74 are mutually corresponding arrays. The number 77 of link destinations indicates an effective number of net two arrays. The sequence 79 of the tag numbers of the link destinations and the sequence 79 of the evaluation values of the link destinations are mutually corresponding arrays. The other work variables 82 include a variable indicating a connecting pattern of the singular region, and a variable group of variables which are temporarily used, such as a number of corresponding boundary points and a work flag.

The tag structure 70 includes two kinds of array pairs, as described above. The first pair of the number sequence 73 and the kind sequence 74 is used to manage children. Other tags or structural elements of the cross section sequence graph can be uniformly managed by use of the first pair. Generally, the first pair represents a vertical connection between the tag and the structural element of the cross section sequence graph.

On the other hand, the second pair of the sequences 78 and 79 is used to manage link destination tags. Generally, the second pair represents a connection in a direction of the character string (hereinafter referred to as a character string direction).

The tag structure 70 is managed as a continuous region of the memory, similarly as in the case of the cross section sequence graph described above.

The tags are categorized into a plurality of kinds depending on contents of tags which become children. An element tag has as a child thereof a structural element of a black component and not a while background. In the following description, only three kinds of tags are described for the sake of convenience in combination with the cross section sequence graph, but the number of kinds of the tags is of course not limited to three. The following description is easier to understand by referring to FIG. 2 which is a diagram for explaining a hierarchical structure of the tags used in the present invention.

A first kind of element tag is called a SS tag, and has the cross section sequence (SS) as its child. A second kind of element tag is called a SR tag, and has the singular region (SR) as its child. A third kind of element tag is called a BCC tag, and has the boundary point sequence (C) as its child, where BCC is an abbreviation for Black Connected Component. However, as will be described later, the black connected component is not actually obtained. In addition, in a case where a portion of the boundary point sequence (C) is a virtual boundary point sequence (VC), a tag which has the virtual boundary point sequence as its child will be referred to as a VC tag, where VC is the abbreviation for Virtual Contour.

In the tag structure 70 shown in FIG. 25, it is possible to independently set the kind of child. For this reason, one tag may have different kinds of children. However, in order to simplify the description, such a tag will not be considered in the following description, and the tags will be referred to by the names described above.

A VS tag does not have a child, and is used to represent a blank region using the circumscribing coordinate values shown in FIG. 25, where VS is an abbreviation for Virtual Space. Tags respectively corresponding to a beginning end and a terminating end of the character string are called a R tag and a E tag, where R is an abbreviation for Root and E is an abbreviation for End.

A VCC tag has the element tag, such as the SS tag, the SR tag and the BCC tag, or the VS tag, as its child, where VCC is an abbreviation for Virtual Connected Component. The VCC tag represents one character candidate with respect to the extracting method, and becomes a processing target of the character recognition.

A path tag is a general term for the VCC tag and the VS tag, and is a target of a path generation and a path selection.

As described above, a link represents a connecting relationship between the tags in the character string direction, and is mainly used by the path tag.

A path is an ordered arrangement of the path tags via the links, and starts with the R tag and ends with the E tag. The path represents one interpretation candidate with respect to the character string.

Generally, the tags are also described hierarchically. In the hierarchical structure of the tags, a lower layer include the element tags and the VS tag, and a higher layer includes the path tags (VCC tag and VS tag), for example. The VS tag spans both the lower and higher layers of the hierarchical structure of the tags. This is in order to cope with the two kinds of blanks, because with respect to the blank, there is the blank between the characters and the blank within the character.

The elements tags may further be divided into two hierarchical layers, such that a higher layer includes the BCC tag and a lower layer includes the SS tag and the SR tag.

The cross section sequence graph forms a layer lower than that of the element tags. However, in the cross section sequence graph, the BCC tag forms the lower layer and the SS tag and the SR tag form the higher layer, while in the hierarchical structure of the element tags, the SS tag and the SR tag form the lower layer and the BCC tag forms the higher layer. Such a layer structure is employed because, when a plurality of boundary point sequences which are collected and corresponding to the black connected component is regarded as the BCC tag, it may be regarded as a more coarse representation.

The tags have two functions. One function of the tags is to link a character element (structural element) and the character recognition means. This function may be realized by an access from the VCC tag to the structural element via the element tag. This function is effective when realizing "a combination of feature elements". In addition, it is possible to absorb the differences in the kinds of structural elements by introducing the element tags.

The other function of the tags is to act as an operating target of the character string recognition such as the path selection. In other words, the tags are characterized by having both of these two functions. Since a common representation format is used for the processing target by the use of the tags, it is possible to carry out various processes using the tags. Hence, it is possible to simplify the means for realizing such various processes.

Figure 26:
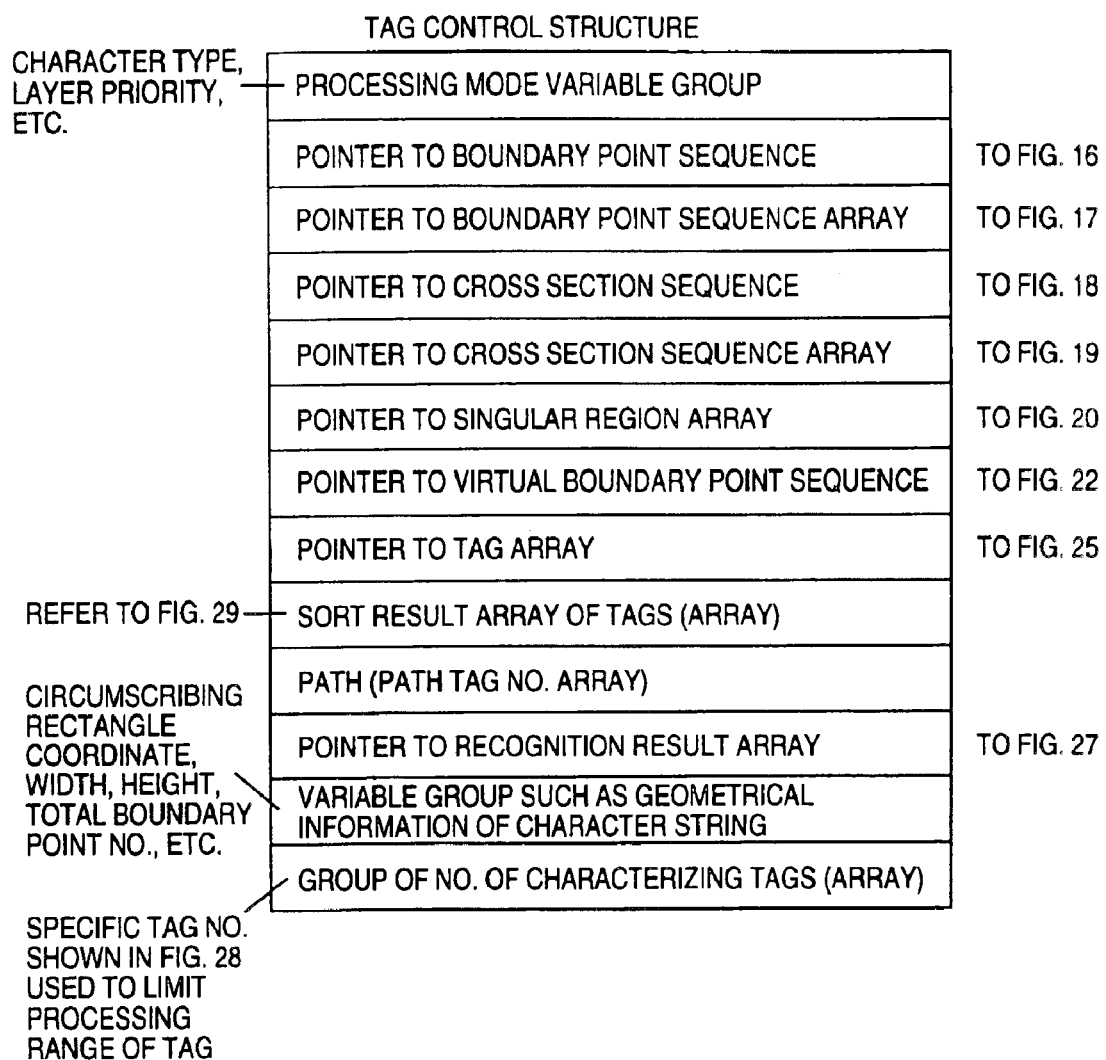
FIG. 26 is a diagram showing a tag control structure.

FIG. 26 is a diagram showing a tag control structure for carrying out a general control using the tags. In the tag control structure shown in FIG. 26, a processing mode variable group includes information indicating a character type of function (single character recognition/character string recognition function) specified by the user, and a layer priority. The layer priority includes information related to the layer to which the cross section sequence graph is to be obtained, and the layers of the element tags to be processed with priority other layers.

In the tag control structure, a pointer group including pointers to the structural elements of the cross section sequence graph, a pointer to the virtual boundary point sequence, and a pointer to a tag array follows the processing mode variable group.

In the tag control structure, a sort result array of the tags follows the pointer to the tag array. FIG. 29 is a diagram showing a state of the tag array and the sort result array. In the sort result array, the tags are not rearranged directly, but instead, numbers are assigned to the tags and the assigned numbers are rearranged. An upper limit length of the sort result array is fixed, but an effective number of tags in the sort result array changes during the process.

In the tag control structure, an array representing the path, a pointer to a recognition result array, and a variable group of geometrical information or the like of the character string follow the sort result array of the tags. A group of numbers of characterizing tags is provided, as an array, at the last position in the tag control structure. FIG. 28 is a diagram showing a state where the tag array is used. Since the tags of the tag array are used in order from the start, the effective number of tags gradually increases during the process. But as shown in FIG. 28, it is possible to store the numbers of the characterizing tags, so that the range of the tags which become the processing target can be restricted during each step using the stored numbers of the characterizing tags.

For example, the element tag may be from the start to immediately before the first R tag. The VS tag may be from the R tag to the E tag. The tag of the lower layer may be from the start to the E tag, that is, the element tag plus the VS tag. The VCC tag may be from the beginning of the VCC tag to immediately before the VC tag. The tag of the higher layer may be from the R tag to immediately before the VC tag, that is, the VC tag plus the VCC tag.

By using both the characterizing tags and the sort result array of the tags, it is possible to limit the processing range while avoiding rearrangement of the tags.

Figure 2:
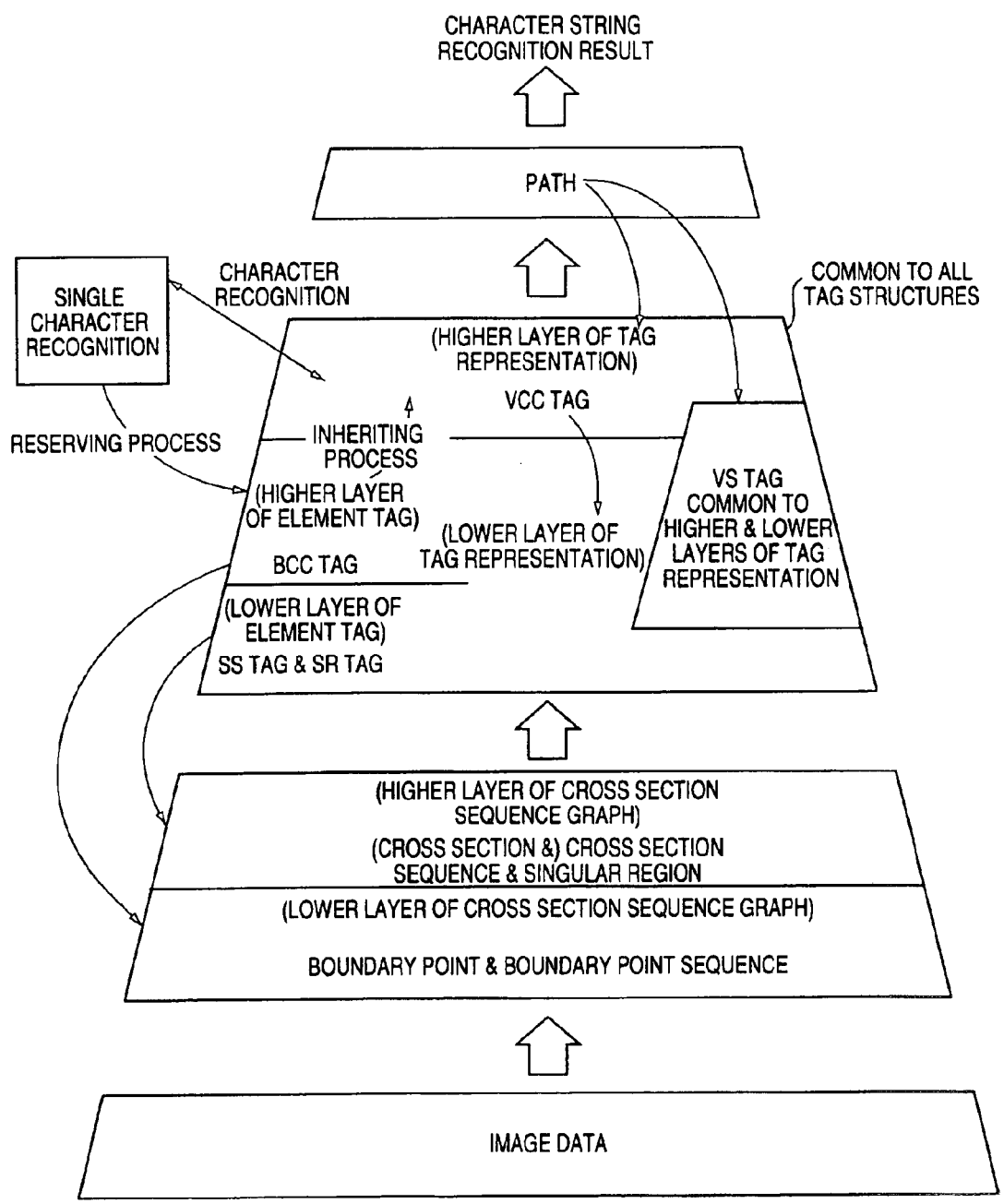
FIG. 2 is a diagram for explaining a hierarchical structure of tags used in the present invention.

Next, a description will be given of an embodiment of the present invention. FIG. 1 is a flow chart for explaining the general operation of this embodiment of the present invention, and FIG. 2 is a diagram for explaining the hierarchical structure of the tags used in the present invention. The general operation of this embodiment will be described with reference to FIGS. 1 and 2.

In FIG. 1, a step 101 inputs image data, and a step 102 extracts a cross section sequence graph from the input image data. A step 103 generates element tags for managing the cross section sequence graph. The BCC tag of the higher layer of the element tags manages the lower layer of the cross section sequence graph. The SS tag and the SR tag in the lower layer of the element tags manage the higher layer of the cross section sequence graph.

Then, a step 104 generates a virtual boundary point sequence with respect to the singular region of the cross section sequence. In addition, a step 105 generates character candidates by combining the element tags. The character candidates are managed by the VCC tag.

Next, a step 106 recognizes a single character after supplying the virtual-boundary point sequence necessary for the character candidates, and a step 107 generates a link among the character candidates of the single character recognition. A step 108 generates paths by tracing the link, and selects an optimum path. Further, a step 109 outputs a recognition result of the character string, and the process ends.

Figure 3:
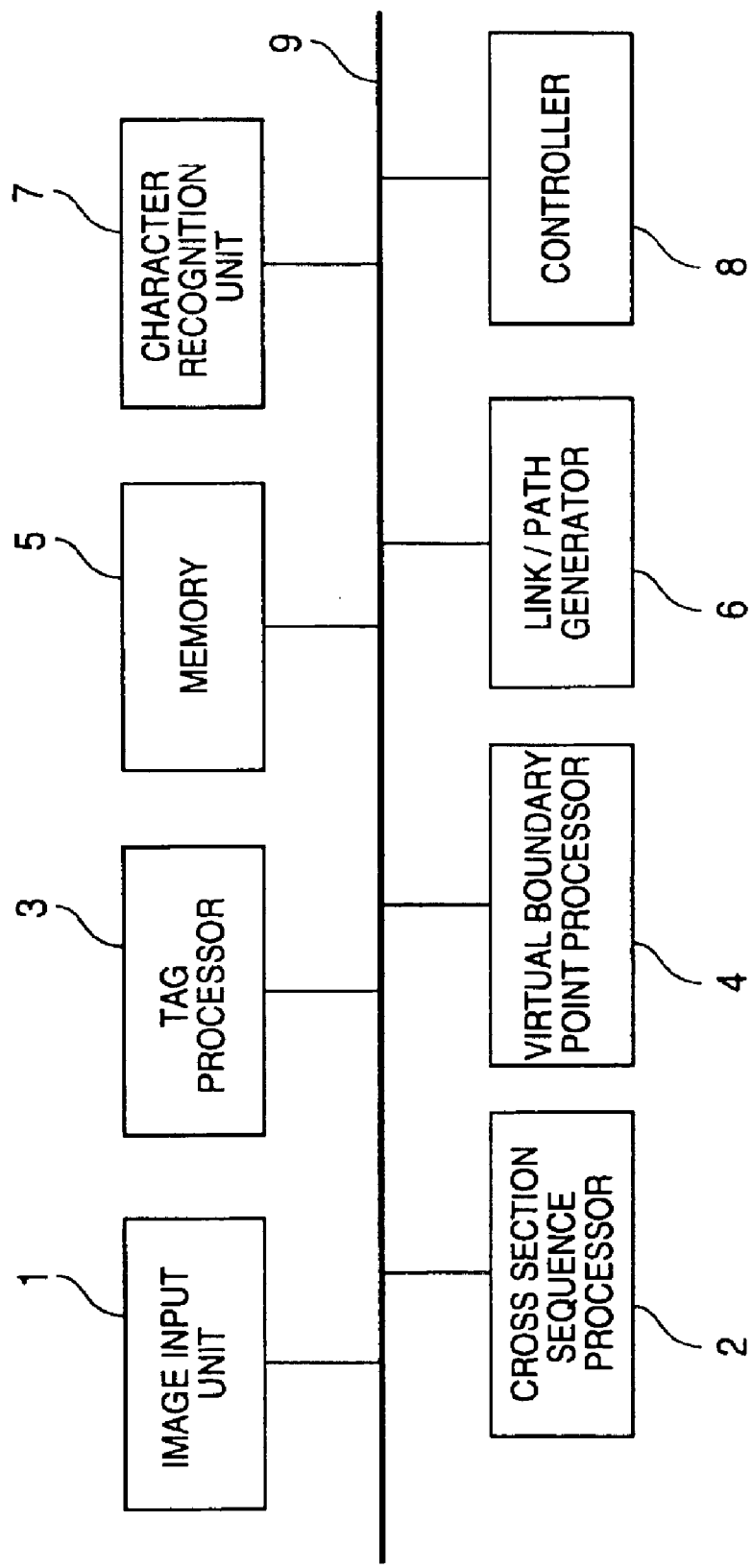
FIG. 3 is a system block diagram showing the structure of the embodiment of the present invention.

FIG. 3 is a system block diagram showing the structure of this embodiment of the present invention. A character recognition apparatus shown in FIG. 3 includes an image input unit 1, a cross section sequence processor 2, a tag processor 3, a virtual boundary point processor 4, a memory 5, a link/path generator 6, a character recognition unit 7, and a controller 8 which are connected via a bus 9.

The image input unit 1 inputs the image data, and the cross section sequence processor 2 extract the cross section sequence graph from the image data. The tag processor 3 generates and manages the tags. The virtual boundary point processor 4 generates the virtual boundary points. The memory 5 stores various structures and the like. The link/path generator 6 generates the links and the paths. The character recognition unit 7 carries out a character recognition process. The controller 8 controls the general operation of the character recognition apparatus. The image data input by the image input unit 1 may be binary data or multi-valued data. In the case of the multi-valued image data, the process is carried out while judging black information and white information of the image using a predetermined threshold value.

Figure 4:
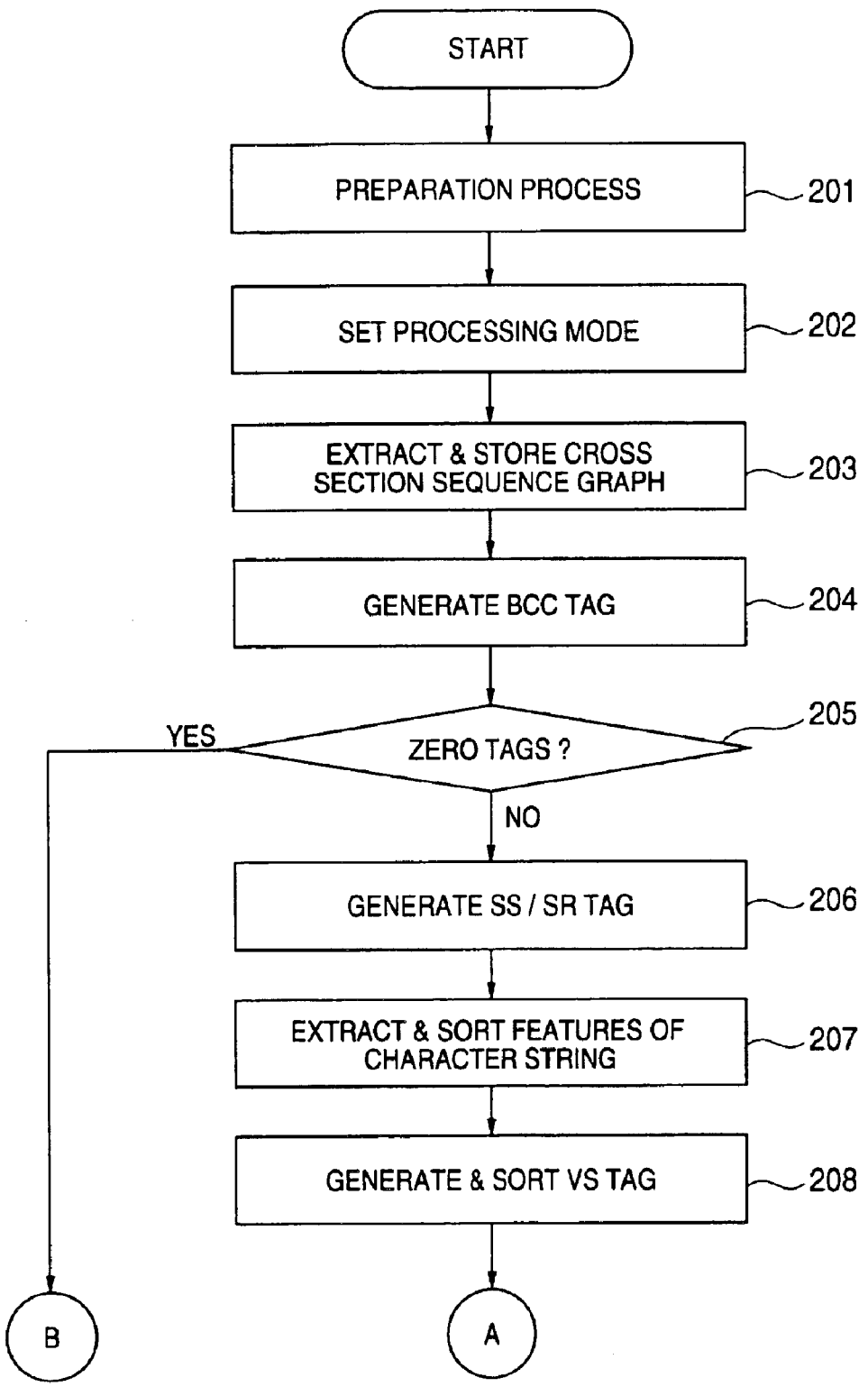
FIG. 4 is a flow chart for explaining the overall operation of the embodiment of the present invention.
Figure 5:
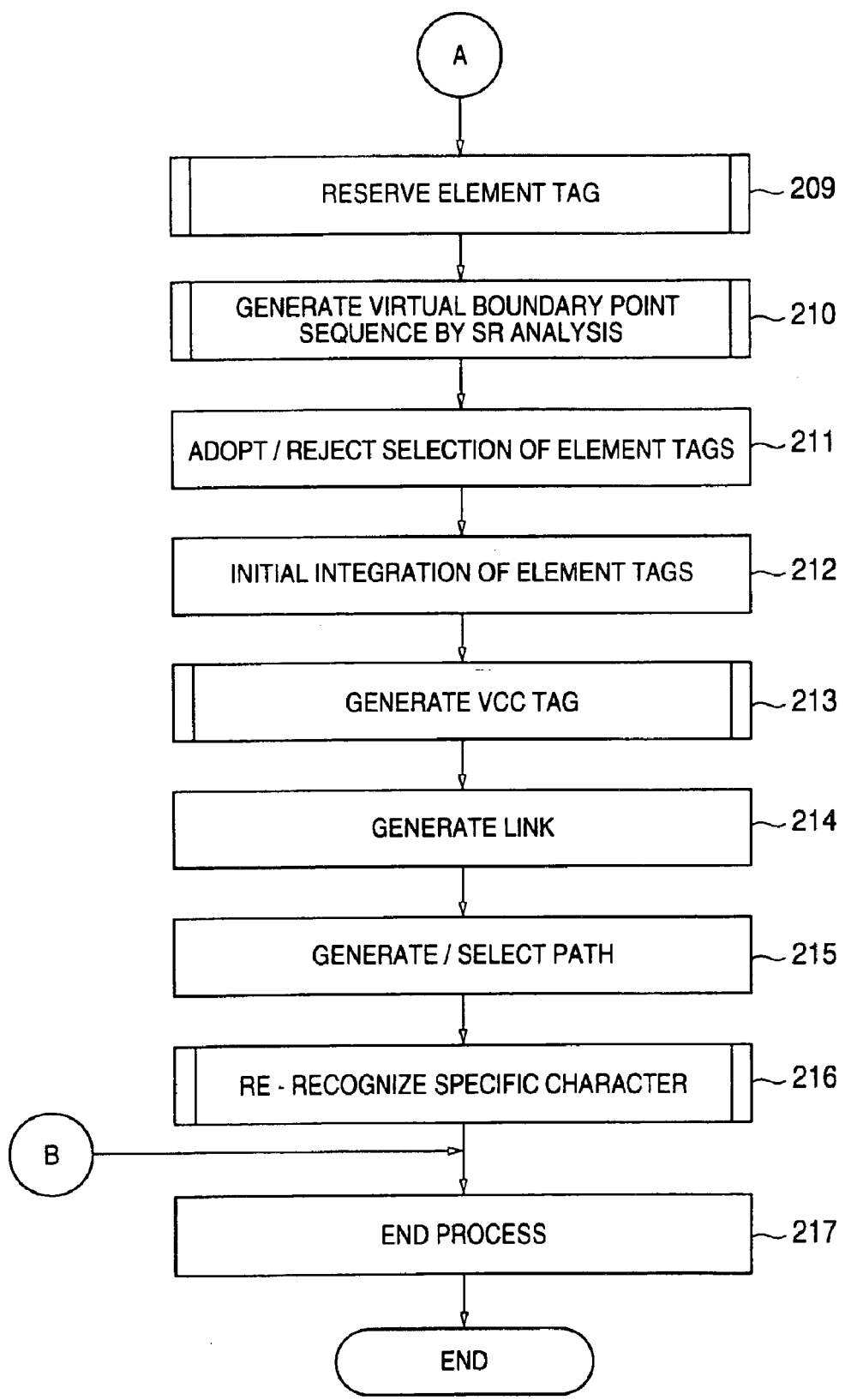
FIG. 5 is a flow chart for explaining the overall operation of the embodiment of the present invention.

FIGS. 4 and 5 are flow charts for explaining the overall operation of this embodiment of the present invention.

Figure 30:
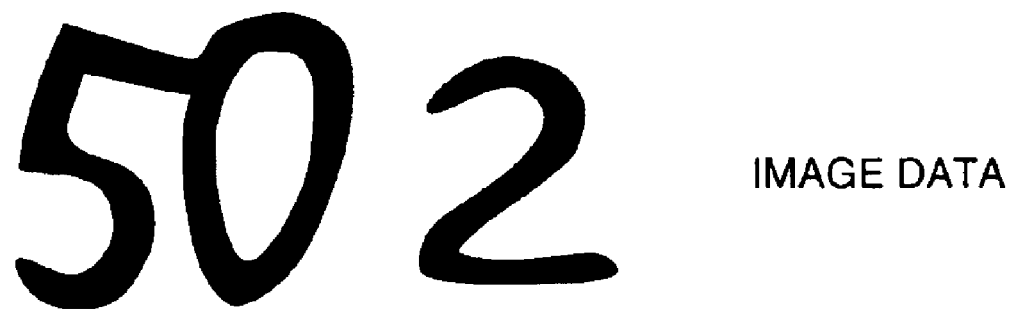

In FIG. 4, a step 201 carries out a preparation process to acquire information necessary for the following processes. More particularly, the character string image which is the processing target is input from the image input unit 1. FIG. 30 is a diagram showing the character string image which is the processing target in this particular case. User specifying information is also input. The user specifying information specifies the character type and function (information indicating single character recognition or character string recognition), or the like.

In a step 202, the controller 8 sets the acquired information to a processing mode of the tag control structure within the memory 5, and sets the layer priority based on the contents thereof. The tag control structure is shown in FIG. 26 described above.

Figure 31:
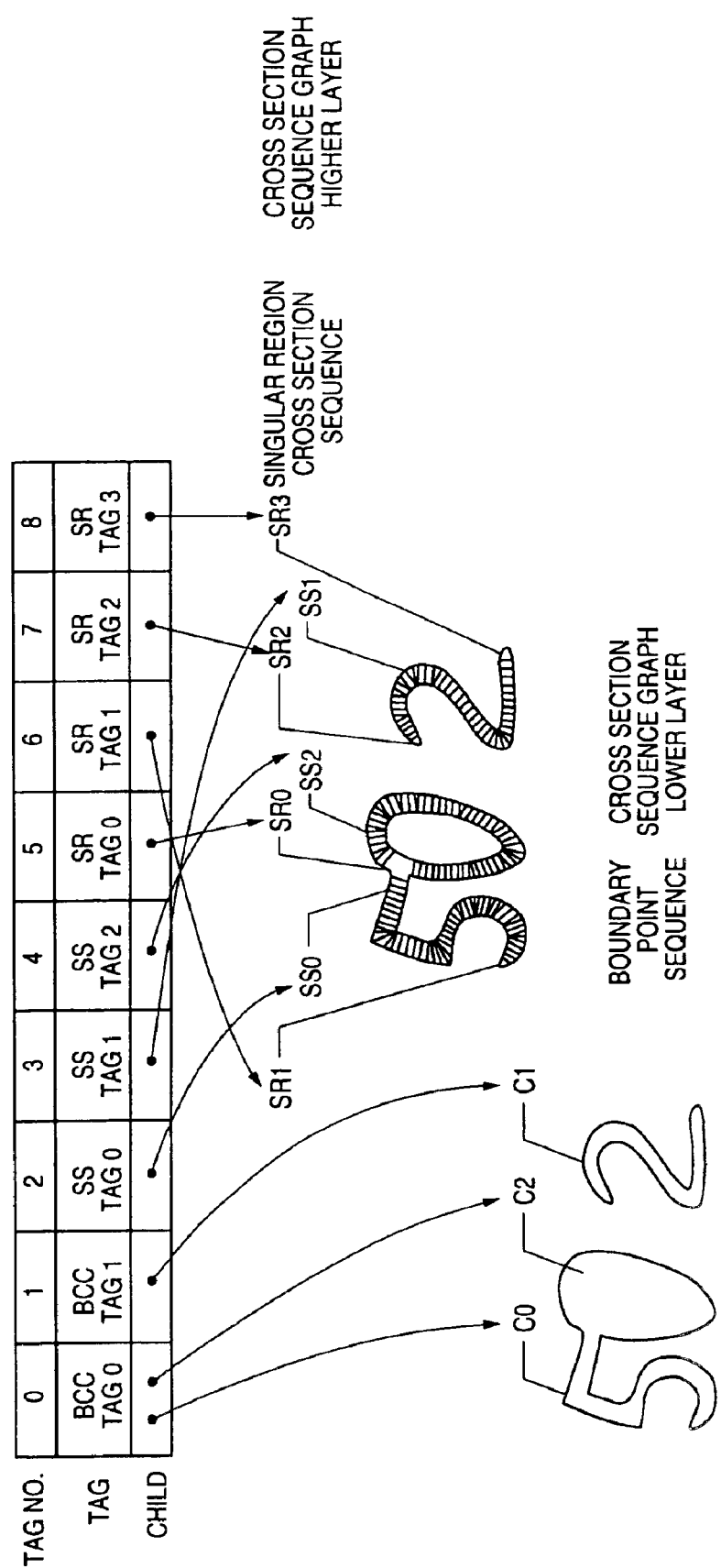
FIG. 31 is a diagram showing a model of a tag structure.

In a step 203, the cross section sequence processor 2 extracts the cross section sequence graph depending on the set processing mode, and stores the extracted cross section sequence graph within the memory 5 with the formats shown in FIGS. 16 through 20. The lower layer (boundary point sequence) of the cross section sequence graph and the higher layer (cross section sequence (SS) and the singular region (SR)) of the cross section sequence graph are shown in FIG. 31. FIG. 31 is a diagram showing a model of the tag structure.

If the BC tag has the priority over others, there is no need to obtain the higher layer (SS and SR) of the cross section sequence graph, and the process of obtaining the higher layer (SS and SR) can be omitted in such a case.

In a step 204, the tag processor 3 obtains the BCC tag based on the boundary point sequences in the lower layer of the cross section sequence graph. A description will be given of this process of the step 204, by referring to FIG. 31 for the boundary point sequences (C0 to C2).

First, corresponding tags are created with respect to the outer boundary point sequences C0 and C1, and registered in the memory 5 as a BCC tag 0 and a BCC tag 1 (FIG. 25). The corresponding outer boundary point sequences C0 and C1 are registered in the memory 5 as children of the BCC tag (FIG. 17). In this state, a outer boundary point sequence having a number of boundary points less than or equal to a predetermined threshold value has a high possibility of being noise, and is excluded from the target of the BCC tag creation.

Then, with respect to the inner boundary point sequence C2, a new BCC tag is not created, and instead, a corresponding BCC tag is obtained from the above described BCC tags and registered as a child of the BCC tag 0. More particularly, a corresponding relationship of the boundary point sequences is obtained on the cross section sequence graph, and the corresponding relationship which is obtained as a result is reflected to the tag. In other words, under a precondition that the boundary points are extracted in the order in which the image is scanned, one arbitrary boundary point is obtained from the inner boundary point sequence, the boundary point information is obtained in the reverse order to that at the time of the registration, and the first appearing boundary point (outer boundary point belonging to the outer boundary point sequence) is found. The tag which has as its child the outer boundary point sequence corresponding to this outer boundary point is the BCC tag which is to be obtained.

What is important about the BCC tag creating process described above is that the black connected component itself is not obtained. Instead, structuring information for obtaining the boundary point and the boundary point sequence of the black connected component is created depending on the needs.

In a step 205, the tag processor 3 checks the number of BCC tags obtained, to determine whether or not the number of tags obtained is zero. If the number of tags is zero and the decision result in the step 205 is YES, the controller 8 judges that the input character image is a blank, and the process advances to a step 217 shown in FIG. 5. In the step 217, the controller 8 carries out an ending process by setting a blank code, and the process ends. On the other hand, the process advances to a step 206 shown in FIG. 4 if the decision result in the step 205 is NO.

The character string recognition is carried out by the process of the steps 206 through 216. In the step 206, the tag processor 3 obtains the corresponding tags based on the higher layer (SS and SR) of the cross section sequence graph. In other words, the SR tag 1 is created in correspondence with the singular region SR1 shown in FIG. 31, and the SS tag 0 is created in correspondence with the cross section sequence SS0. Similarly, the SR tag 0 is created in correspondence with the singular region SR0, the SS tag 2 is created in correspondence with the cross section sequence SS2, the SR tag 2 is created in correspondence with the singular region SR2, the SS tag 1 is created in correspondence with the cross section sequence SS1, and the SR tag 3 is created in correspondence with the singular region SR3.

In a case where the higher layer of the cross section sequence graph is not obtained according to the layer priority of the processing mode in the step 203, the number of tags created in the step 206 is zero. However, it is possible to continue the following process described below because the BCC tags already obtained in the step 204 may be used as the element tags.

The process of the step 206 is in a corresponding relationship to the process of the step 204. At the time when the step 206 is carried out, all of the necessary element tags are obtained as shown in FIG. 31. The tag structure shown in FIG. 31 is stored in the tag control structure shown in FIG. 26.

The character elements represented by the BCC tag overlap the character elements represented by the SS tag and the SR tag. Accordingly, this overlap is eliminated by making an adopt/reject selection in a step 211 shown in FIG. 5 which will be described later.

Figure 32:
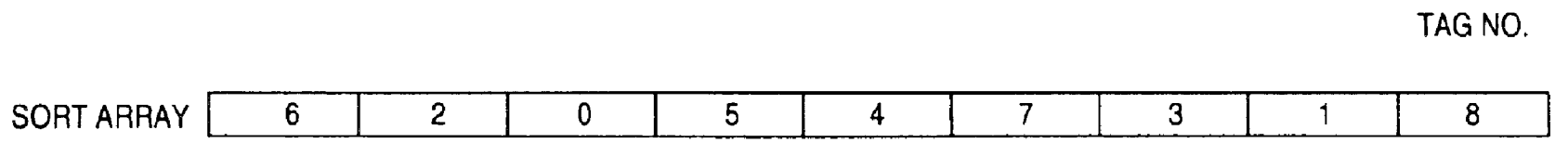

In a step 207, the controller 8 extracts the features (for example, the height of the character and the like) related to the entire character string based on the element tags. The extracted features are set as the contents of the variable group of geometrical information or the like of the character string, within the tag control structure shown in FIG. 26. As will be described layer, the extracted features are used in a step 213, for example, which evaluates the likelihood of the character. Further, in a step 207, the tag processor 3 sorts the element tags. FIG. 32 is a diagram showing sort results of the element tags shown in FIG. 31, that is, the tag numbers. The tag numbers are sorted by rearranging in the arranged order from the left of the higher layer (SS and SR) of the cross section sequence graph shown in FIG. 31. The numbers (0, 1) of the BCC tags are similarly arranged in the arranged order from the left, and inserted between the numbers of the SS and SR tags. The inserting positions are determined by taking into consideration the gravitational center positions of the circumscribing rectangles of the boundary point sequences C0 and C2 (positions in a horizontal direction of the character string), and a gravitational center position of the circumscribing rectangle of the boundary point sequence C1 (position in the horizontal direction of the character string).

The sort result at the time when the process of the step 207 is carried out becomes as shown in FIG. 29, where each range indicated by a pair of arrows indicates the range of the sorting target.

Figure 33:
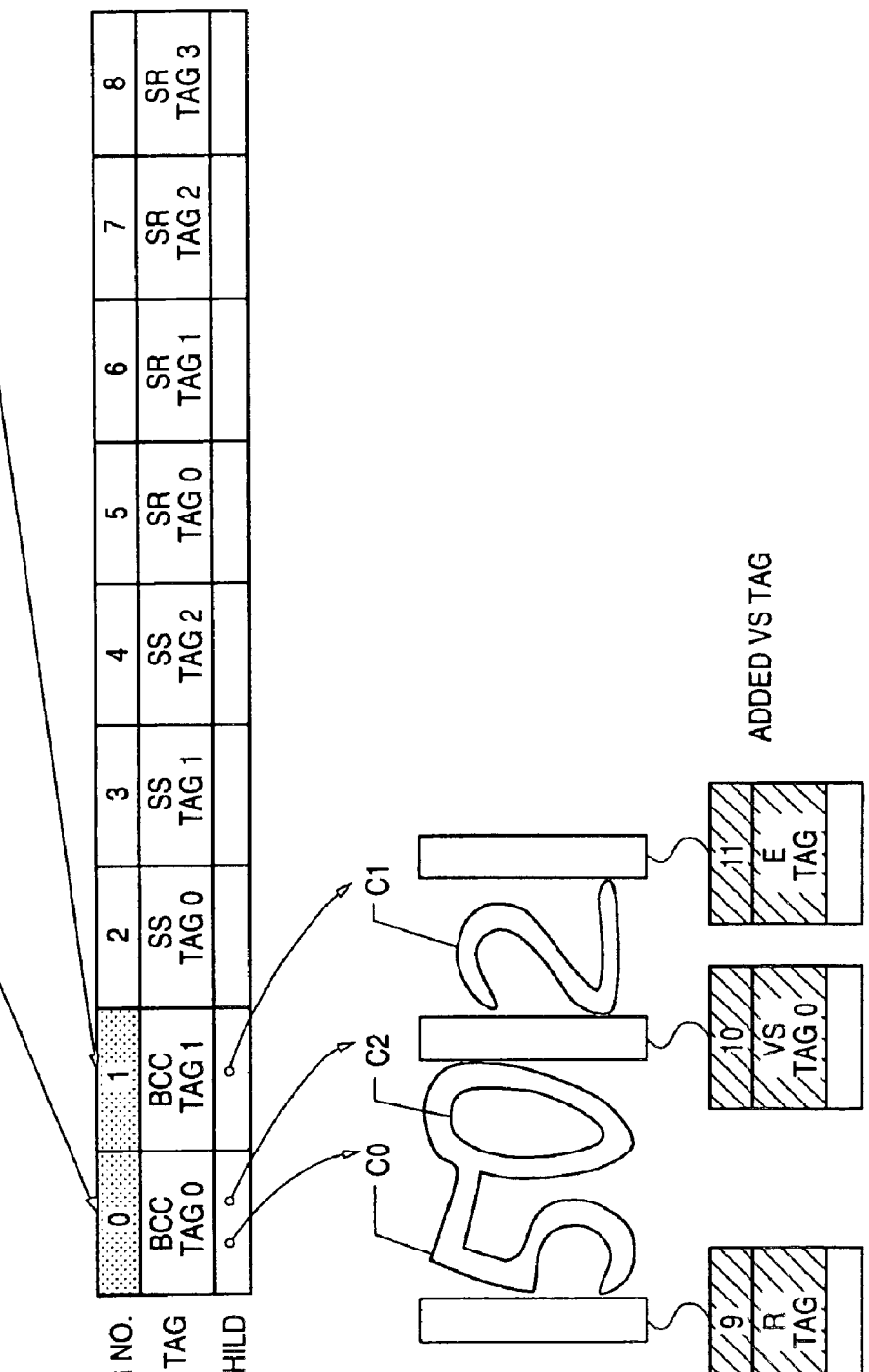
FIG. 33 is a diagram showing a lower layer of the cross section sequence graph and a VS tag which is added.

In a step 208, the tag processor 3 checks the adjacency for a case where transformations are made to the positions on the image plane, with respect to the combinations of the BCC tags, and obtains the VS tag corresponding to a gap (in the character string direction) between the mutually adjacent BCC tag pair. FIG. 33 is a diagram showing the lower layer (boundary point sequence) of the cross section sequence graph and the array of tag numbers. The VS tag 0 is also shown in FIG. 33.

Figure 34:
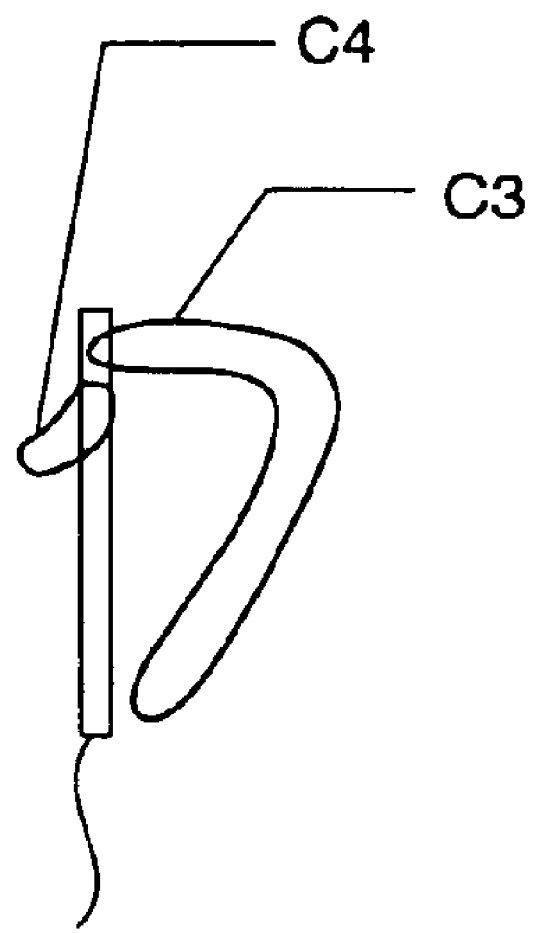
FIG. 34 is a diagram showing a negative blank.

As described above, the VS tag represents the (virtual) blank. Since the BCC tag substantially corresponds to the black connected component, a gap always exists between mutually adjacent BCC tags on the image plane. For example, the BCC tags having the tag numbers 0 and 1 in FIG. 33 are mutually adjacent. However, there is a first case where a complete blank region exists in a direction perpendicular to the character string direction as shown in FIG. 33, and a second case where no complete blank region exists in the direction perpendicular to the character string direction. In the second case, an inclined blank region or a complicated blank region exists, for example. Even in this second case, it is regarded that a virtual blank region exists, and the virtual blank region is registered as the VS tag. In the case of the inclined blank region or the complicated blank region, it may be seen by checking the coordinate values that character extracting frames overlap, and this state is referred to as a negative blank. FIG. 34 is a diagram showing the negative blank.

In addition, the tag processor 3 judges that the VS tag having a sufficient size in the character string direction is not the blank within the character, and sets "disable integration" in the status 71 of the tag structure 70 shown in FIG. 25. This status 71 is reflected to the process which is carried out in the step 213 which will be described later, and contributes to suppressing increase of the number of VCC tags.

Furthermore, the tag processor 3 judges that a virtual blank exists on both ends of the character string, and sets the R tag corresponding to the blank at the beginning end and the E tag corresponding to the blank at the terminating end. As already described above, the R tag and the E tag are VS tags. The R tag, the VS tag and the E tag are added in the element tags shown in FIG. 33.

In a step 208, the VS tag is added to the element tags, and the element tags are sorted. The sort result is shown in FIG. 35. FIG. 35 is a diagram showing the sort result obtained by adding the VS tag to the element tags. In the sort result obtained at this point in time, the range indicated by the arrow to the E tag as shown in FIG. 29 indicates the sort target.

By the above described processes, the element tags (BCC tag, SS tag and SR tag) and the VS tag are obtained. However, since the element tags are not path tags, the element tags cannot be used as they are as the structural elements of the path, that is, a part corresponding to one character. The VCC tag which becomes the structural element of the path represents various combinations of the element tags by a single tag, and is generated in the step 213 which will be described later.

In the step 209 shown in FIG. 5, the tag processor 3 carries out a reserving process with respect to the element tags. The reserving process has the following four functions.

First, the reserving process is carried out to recognize beforehand at this point in time a character which should be processed as an exception during the normal process carried out in a step 210 and the subsequent steps, such as a character having a special size such as punctuation marks. Special characters such as the punctuation marks are determined depending on the arranged state of the surrounding characters, and it is difficult to judge the special characters with a high accuracy by the single character recognition which is based on the shape and not the arrangement. But when the special characters are appropriately processed at this point in time, it becomes unnecessary to carry out a special process such as evaluating the size at a latter process.

Second, the reserving process is carried out to integrate the back-track approach and the hypothesis verifying (or path selecting) approach. The back-track approach is realized by a combination of the reserving process and an "adopt/reject selection of the element tags" carried out in the step 211 which will be described later. On the other hand, the hypothesis verifying (or path selecting) approach is realized by combining the step 215 and the subsequent steps. More particularly, a reservation is made with respect to the higher layer (BCC tag), the corresponding lower layer (SS and SR tags) is maintained only when not reserved, and the combinations of the remaining element tags are created in the step 213.

Third, the reserving process is carried out to effectively introduce a special character recognition method. If a high-quality character can be committed early at this point in time, it is possible to suppress the number of VCC tags and the number of paths.

Fourth, the reserving process is carried out to provide appropriate noise countermeasures. When uniformly applying a noise elimination with respect to the entire character string image, small character elements of characters such as the Japanese Katakana characters "ウシソツ, ホミン" may be lost by the noise elimination, and it is therefore not possible to carry out a strong noise elimination. Hence, the reserving process is used to realize the noise elimination by taking into consideration an adjacency relationship. A reservation indicating "possibility of being noise" is made at this point in time with respect to the character which does not reach a predetermined size. The reserving process is reflected to the status, and the result is inherited to the VCC tag in the step 213. The result is further reflected to the evaluation of the path in steps 214 and 215 which will be described later, so that it is possible to realize the noise elimination which takes into consideration the adjacency relationship.

Figure 6:
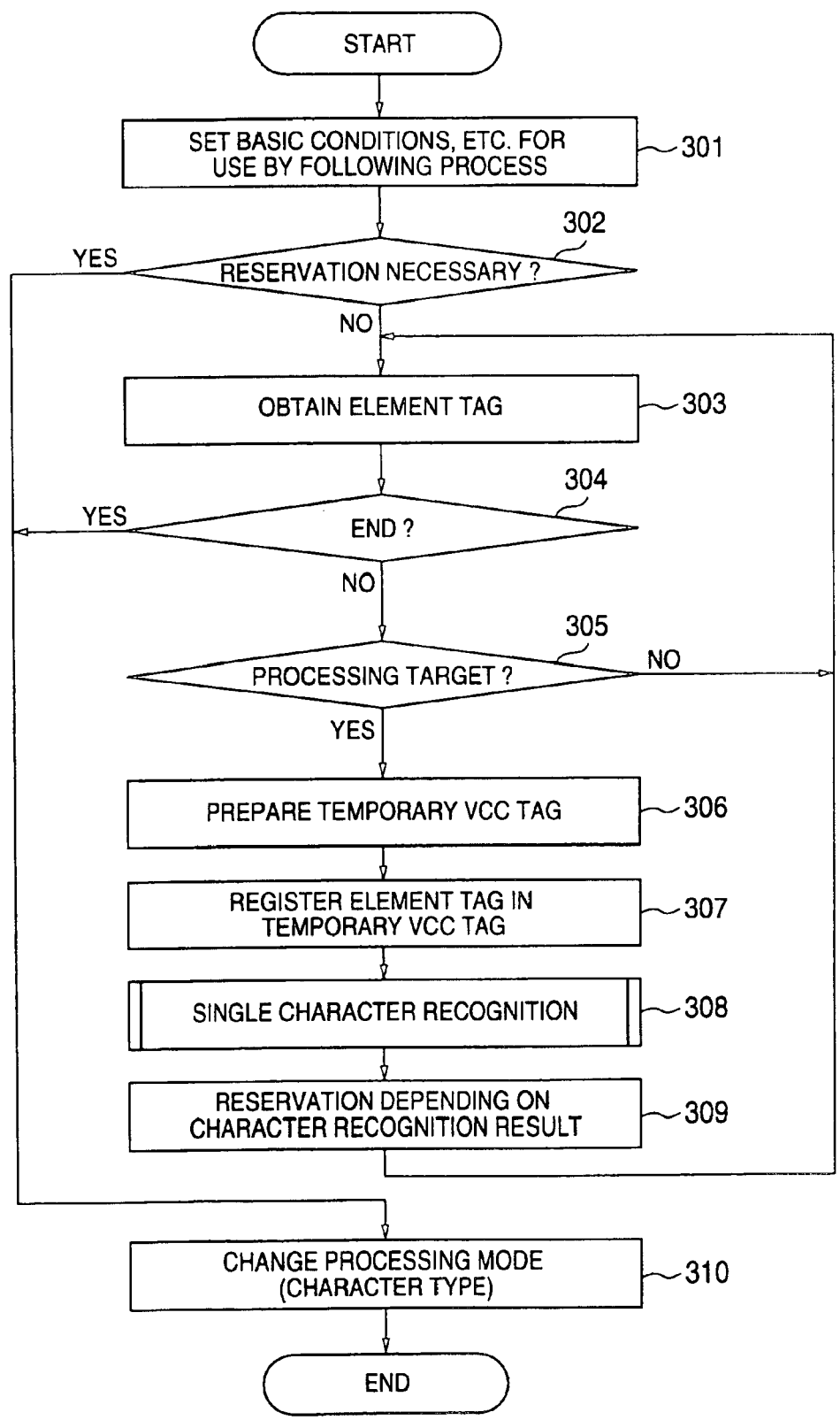
FIG. 6 is a flow chart for explaining an element tag reserving process in detail.

FIG. 6 is a flow chart for explaining the element tag reserving process in more detail. In FIG. 6, a step 301 interprets the processing mode, and sets basic conditions which are used by the reserving process. In other words, the reserving process is controlled based on character type conditions. For example, the character type conditions include information such as information which indicates whether or not a character type representing a small symbol is specified, and information indicating a character recognition method to be used of a plurality of character recognition methods. A step 302 decides whether or not the reservation is necessary, and the process advances to a step 310 if the decision result in the step 302 is YES. As will be described later, the step 310 changes the processing mode (character type). On the other hand, the process advances to a step 303 if the decision result in the step 302 is NO.

The step 303 obtains the element tag, and a step 304 decides whether or not the obtaining of the element tag is to be ended. The process advances to the step 310 if the decision result in the step 304 is YES, and the process advances to a step 305 if the decision result in the step 304 is NO. By the steps 303 and 304, a process is repeated to successively obtain the element tags, and the processing range is from the beginning to immediately before the R tag in FIG. 28.

The step 305 decides whether or not the obtained element tag is the processing target. In this particular case, the step 305 decides whether or not the element tag is the BCC tag. The process advances to a step 306 if the decision result in the step 305 is YES, and the process returns to the step 303 if the decision result in the step 305 is NO.

The step 306 prepares and initializes a temporary VCC tag, and a step 307 registers the obtained BCC tag as a child of the temporary VCC tag.

A step 308 carries out a single character recognition which will be described later, with respect to the temporary VCC tag.

A step 309 reflects the character recognition result to the BCC tag. Originally, the character recognition result is reflected to the VCC tag, but since the tag structures employ a common format, it is possible to reflect the character recognition result to the BCC tag.

The processing contents fall under one of the following three cases (a) through (c) depending on the character recognition result.

Case (a): The recognition result is rejected and not reflected to the BCC tag.

Case (b): The recognition result is maintained and reflected to the BCC tag.

Case (c): The recognition result is corrected and reflected to the BCC tag.

Figure 36:
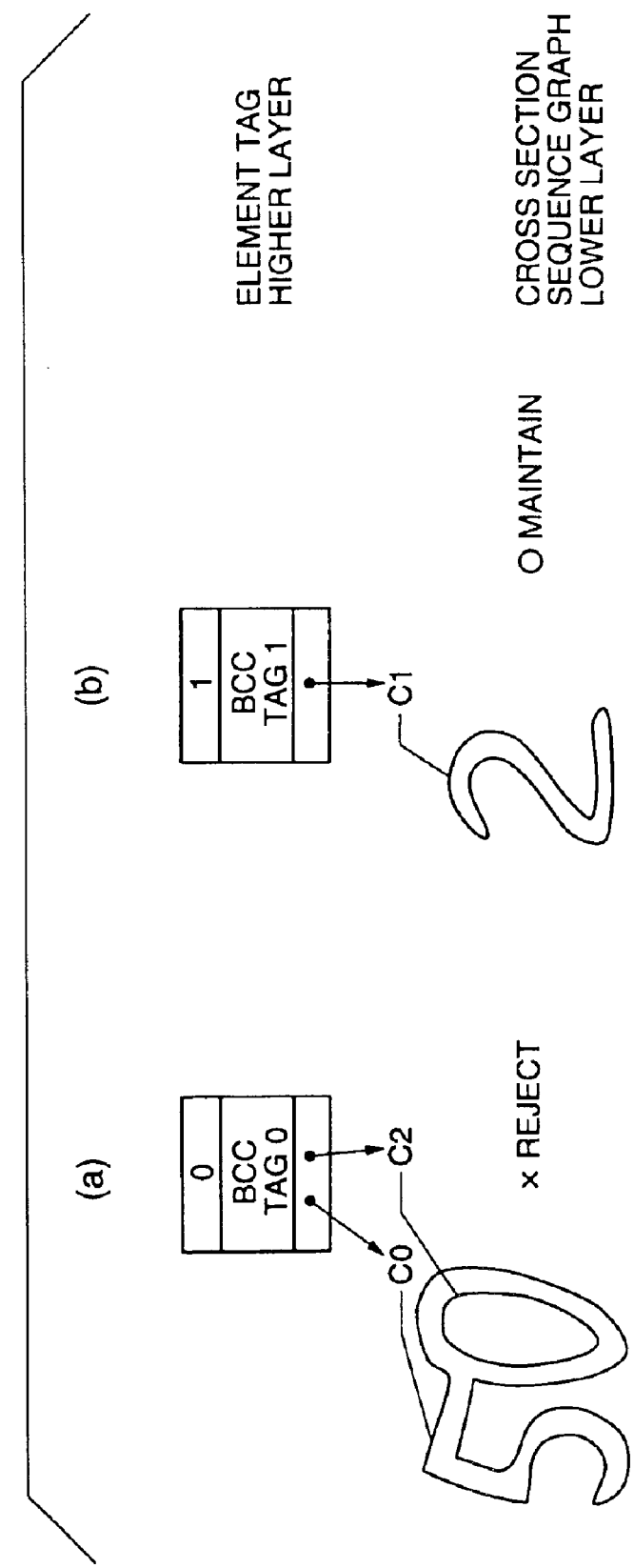
FIG. 36 is a diagram for explaining an element tag reserving process.

FIG. 36 is a diagram for explaining the element tag reserving process. More particularly, FIG. 36(*a*) shows a case where the recognition result is rejected and not reflected to the BCC tag 0, and FIG. 36(*b*) shows a case where the recognition result ("2") is maintained and reflected to the BCC tag 1.

Figure 27:
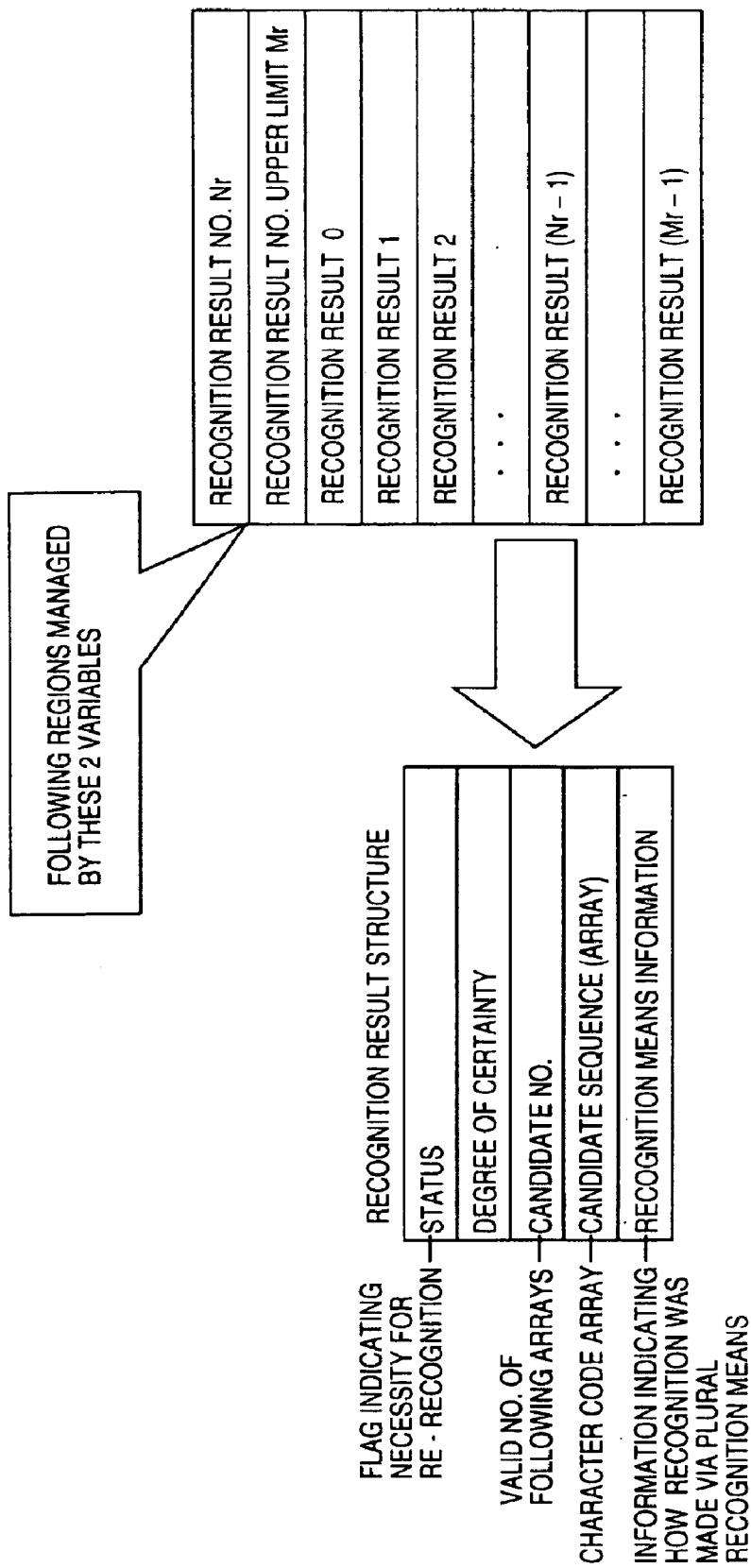
FIG. 27 is a diagram showing a representation format of a recognition result.

The Case (a) corresponds to cases such as when the recognition result is rejected or subjected to a similar process (including judgement using degree of certainty), and in such cases, a necessity to re-recognize is specified in the status of a recognition result structure shown in FIG. 27. FIG. 27 is a diagram showing a representation format of the recognition result. A majority of other cases where the position or size of the character is special or a first candidate of the character recognition result is not a special character also correspond to the Case (a).

On the other hand, when the position information of the tag is judged as being a special character by referring to the conditions set in the step 301, the contents of the first candidate of the character recognition result are checked. The Case (b) corresponds to a case where the first candidate matches the estimated result obtained from the position information.

In the case of a specific character code which is determined in advance, a character code of an appropriate special symbol is inserted to the first candidate of the character recognition result and reflected to the BCC tag, even though it is not a special character. Such a case corresponds to the Case (c). Hence, it is possible to realize a process such as inserting "," to the first candidate with respect to a character having a small tag which is located at a low position and is judged as being "ノ" in Japanese Katakana character.

Such a candidate insertion rule is determined in advance depending on the characteristics of the single character recognition means. In addition, another rule is determined in advance to ignore the recognition result or to maintain the recognition result to be reflected, depending on the combination of methods used to carry out the character recognition by the single character recognition means.

The step 309 shown in FIG. 6 carries out the reserving process depending on the character recognition result described above. In other words, the arrangement conditions including the position and size, the character type conditions, and the character recognition result including the means used for the character recognition are checked with respect to the tags, and the process of one of the Cases (a) through (c) is selected and carried out. When carrying out the process of the Case (b) of (c), the tag integration enable/disable is also set, and such information is set in the status 71 of the tag structure 70 shown in FIG. 25.

In other words, the tags not reserved as in the Case (a) or, reserved as in the Cases (b) and (c). Whether the tags are not reserved or reserved depends on controlling whether or not the contacting character is to be separated.

On the other hand, when reserving the tags, controlling whether or not to integrate the separated characters depends on the tag integration enable/disable.

Figure 8:
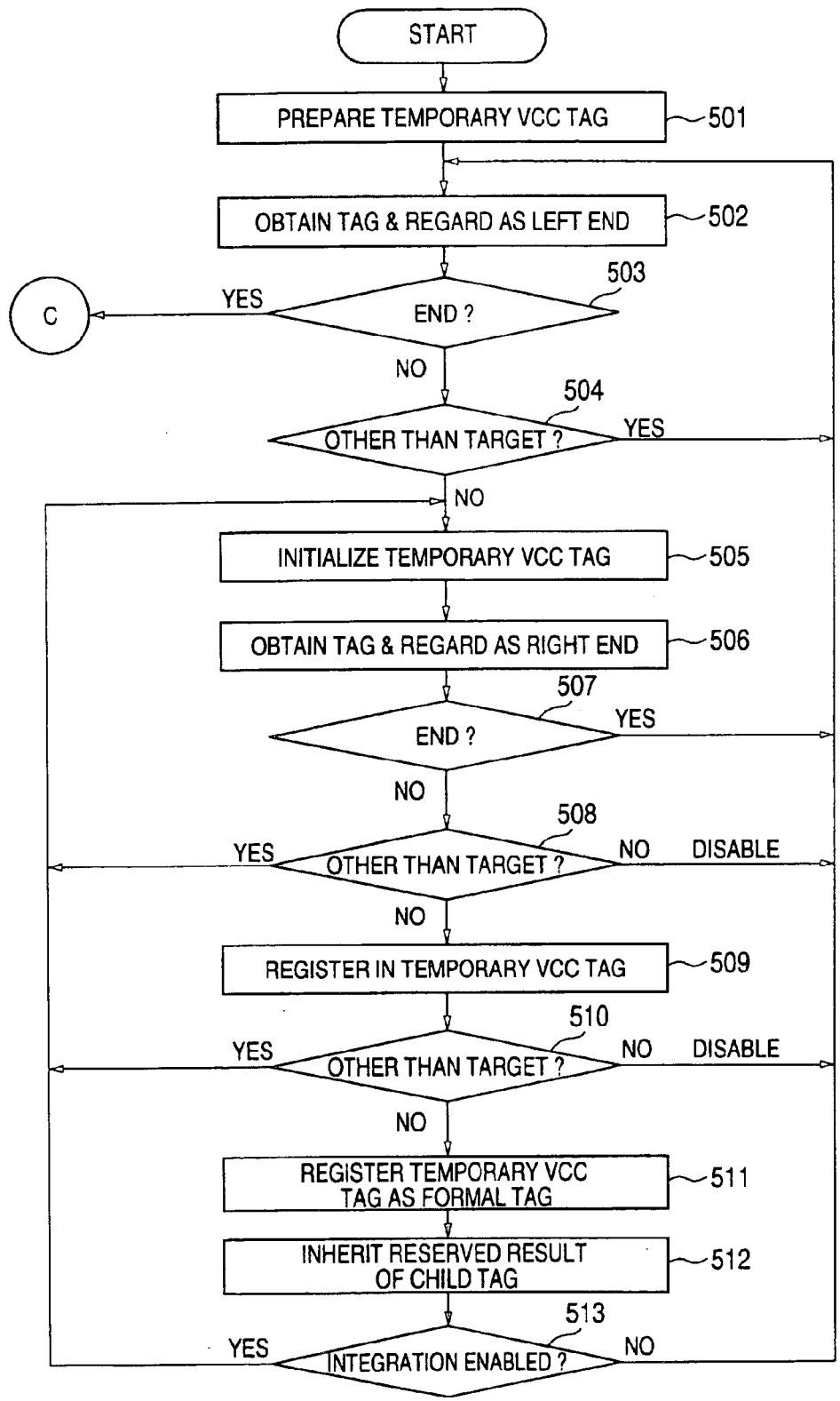
FIG. 8 is a flow chart for explaining a VCC tag generating process.

The information which is reflected to the BCC tag at this point in time is inherited to the VCC tag by a step 512 shown in FIG. 8 via the step 213 shown in FIG. 5.

When the reserving process with respect to all of the element tags is ended and the decision result in the step 304 shown in FIG. 6 becomes YES, the step 310 excludes the special symbols from the character type conditions of the processing mode.

Figure 7:
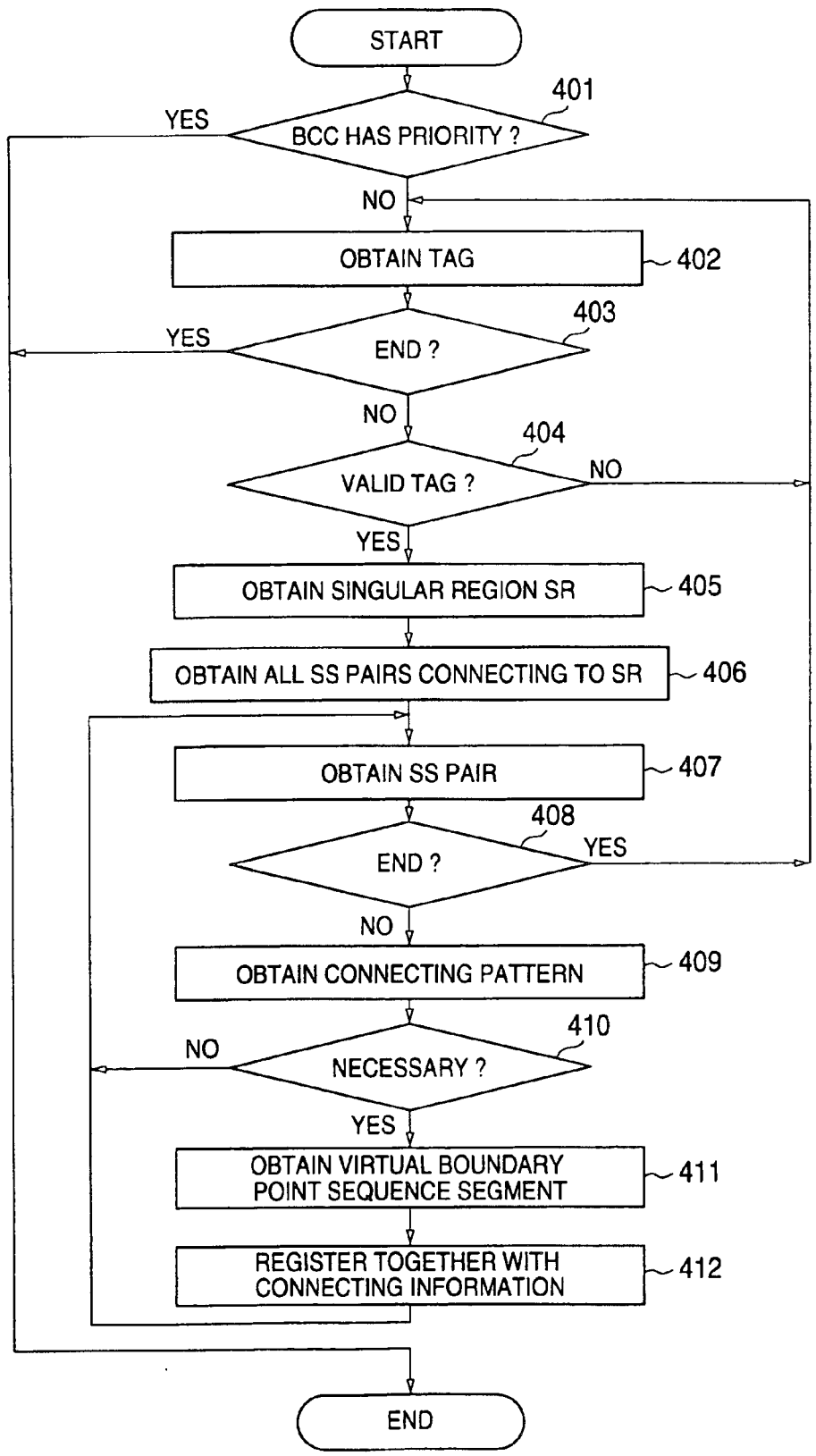
FIG. 7 is a flow chart for explaining a virtual boundary point sequence generating process using singular region (SR) analysis in detail.

Returning now to the description of FIG. 5, in the step 210, the virtual boundary point processor 4 analyzes the singular region (SR) and generates the virtual boundary point sequence. FIG. 7 is a flow chart for explaining a virtual boundary point sequence generating process using singular region (SR) analysis in detail.

A step 401 shown in FIG. 7 checks the layer priority set in the processing mode of the tag control structure shown in FIG. 26, and decides whether or not the BCC has priority. The process ends if the decision result in the step 401 is YES. On the other hand, the process advances to a step 402 if the decision result in the step 401 is NO.

The steps 402 through 404 carry out a loop process to obtain a valid SR tag. A processing target of this loop process is up to immediately before the R tag in FIG. 28. More particularly, the step 402 obtains the SR tag, and the step 403 decides whether or not the obtaining of the SR tag is ended. The process ends if the decision result in the step 403 is YES. If the decision result in the step 403 is NO, the step 404 decides whether or not obtained SR tag is a valid SR tag, and the process returns to the step 402 if the decision result in the step 404 is NO. The process advances to a step 405 if the decision result in the step 404 is YES.

The step 405 obtains the singular region (SR) from the SR tag. A step 406 obtains all SS pairs connecting to the singular region (SR). In FIG. 24, four SSs connect to the SR, and in this case, the number of SS pairs is $4^2=16$.

Steps 407 and 408 carry out a loop process to successively obtain the SS pairs. More particularly, the step 407 obtains the SS pair, and the step 408 decides whether or not obtaining of the SS pair is ended. The process returns to the step 402 if the decision result in the step 408 is YES. On the other hand, the process advances to a step 409 if the decision result in the step 408 is NO. The step 409 obtains the connecting pattern of the singular region as shown in FIG. 23. A step 410 decides whether or not the narrowly interpreted virtual boundary point sequence is necessary, depending on the connecting pattern. It is judged that the narrowly interpreted virtual boundary point sequence is unnecessary if substitutable by the real boundary points. The process returns to the step 407 if the decision result in the step 410 is NO, and the process advances to a step 411 if the decision result in the step 410 is YES.

For example, in a case where the cross section sequence SS3 shown in FIG. 24 forms a portion of the character, the connecting pattern slices between the cross section sequence SS3 and the cross section sequences SS6 and SS7 to upper and lower parts so that the cross section sequences SS6, SS7 and SS8 form portions of the character, and the character string direction is the horizontal direction, the cross section sequence SS3 cannot possibly form a portion of the character on the right side. Furthermore, the cross section sequences SS6, SS7 and SS9 cannot possibly form portions of the character on the left side. Accordingly, the narrowly interpreted virtual boundary point sequence is not generated with respect to this connecting pattern. In other words, the virtual boundary point sequence is not generated between cross section sequences which appear unnatural when viewed from the character string direction.

A step 411 obtains the virtual boundary point sequence segment based on the connecting pattern obtained by the step 409. In this case, it is possible to obtain an appropriate virtual boundary point sequence segment using the method described above.

A step 412 registers the virtual boundary point sequence with the format shown in FIG. 22 together with the virtual boundary point sequence segment and the connecting information, and the process returns to the step 407.

Returning now to the description of FIG. 5, in a step 211, the tag processor 3 carries out an element tag adopt/reject selection. The adopt/reject selection becomes necessary only in a case where the BCC tag and the SS or SR tag are correctly obtained and the priority is set for the SS or SR tag in the processing mode. In this case, there is an overlap between the BCC tag and the SS or SR tag, and the overlap needs to be eliminated.

First, the layer priority is determined. The most simple method of determining the layer priority is for the user to specify the layer priority. This may be achieved by making a processing request such as "give priority to the recognition accuracy" and "give priority to the processing speed" depending on the using environment and the purpose of the user.

As another method, it is possible to predefine the layer priority depending on the combinations of the character types, and to automatically select the layer priority depending on the character type information specified by the user. According to this other method, it is possible to reduce the load on the user.

However, although the two methods described above can determine the layer priority by a simple process, only one of the layers is used, and it is difficult to balance the processing accuracy and the amount of processing.

Therefore, the present invention employs a method of automatically determining the layer priority, in order to balance the processing accuracy and the amount of processing. One method uses the result of the reserving process carried out in the step 209 shown in FIG. 5, and a description will now be given of this one method.

The element tags are successively obtained based on the result of the reserving process of the step 209, and if the obtained element tag is the SS tag or the SR tag, an overlapping BCC tag is obtained. If this BCC tag is already reserved in the step 209, the BCC tag is maintained, and the status of the SS or SR tag is set to a removed state. Otherwise, the status of the BCC tag is set to the removed state, and the SS or SR tag is maintained. By carrying out such a process, there is no overlap among the remaining element tags at the point in time when the step 211 shown in FIG. 5 ends.

Figure 37:
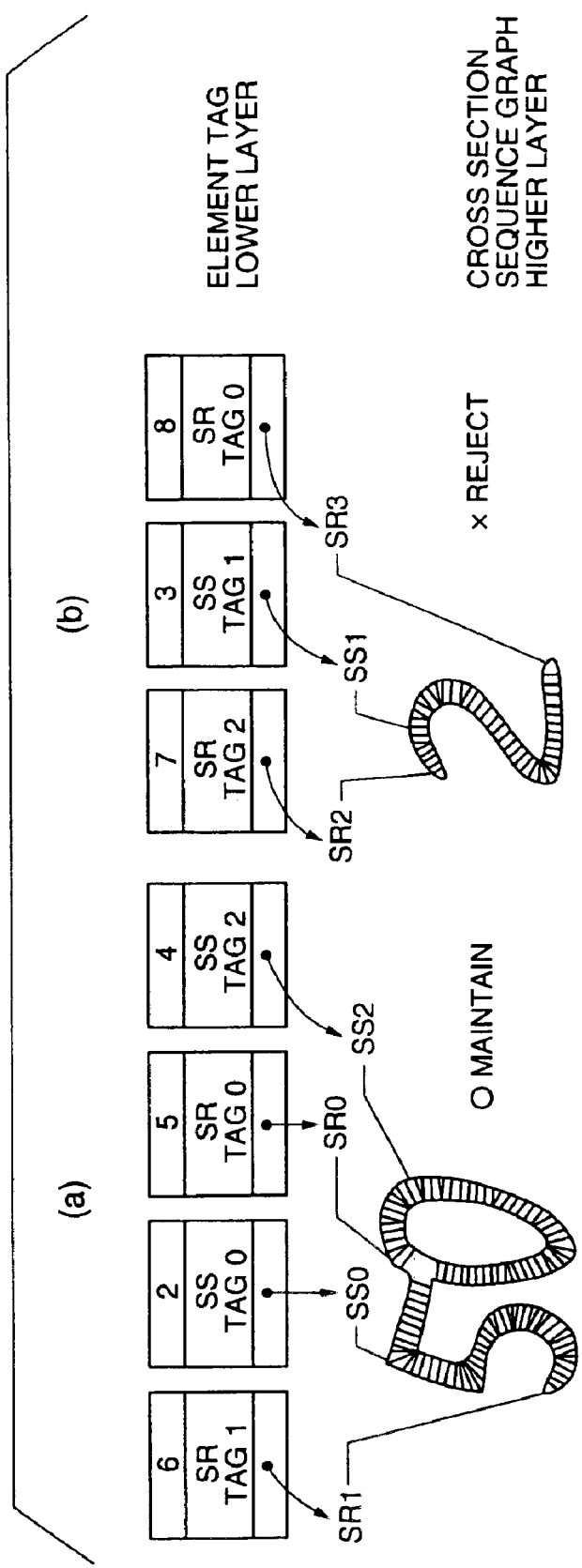
FIG. 37 is a diagram for explaining an element tag adopt/reject selection.

FIG. 37 is a diagram for explaining the element tag adopt/reject selection. FIG. 37(a) shows a case where the SS tag 0, the SS tag 2, the SR tag 0 and the SR tag 1 are maintained because the BCC tag is removed in the step 209. FIG. 37(b) shows a case where the SS tag 1, the SR tag 2 and the SR tag 3 are removed because the BCC tag is already reserved in the step 209. In addition, FIG. 38 is a diagram showing a result of the element tag adopt/reject selection.

A step 212 shown in FIG. 5 carries out an initial integration of the remaining element tags. With respect to a combination of the element tags of the same kind, the initial integration integrates the element tags if the overlap of the element tags is large in the character string direction. For example, in a case where the character string direction is the horizontal direction, the left-hand radical and the body of the Japanese Kanji character are likely to be integrated. The integration is realized by copying the child tag of one element tag to the child tag of the other element tag to update the number of children, and setting the status of the one element tag to the removed state.

Figure 39:
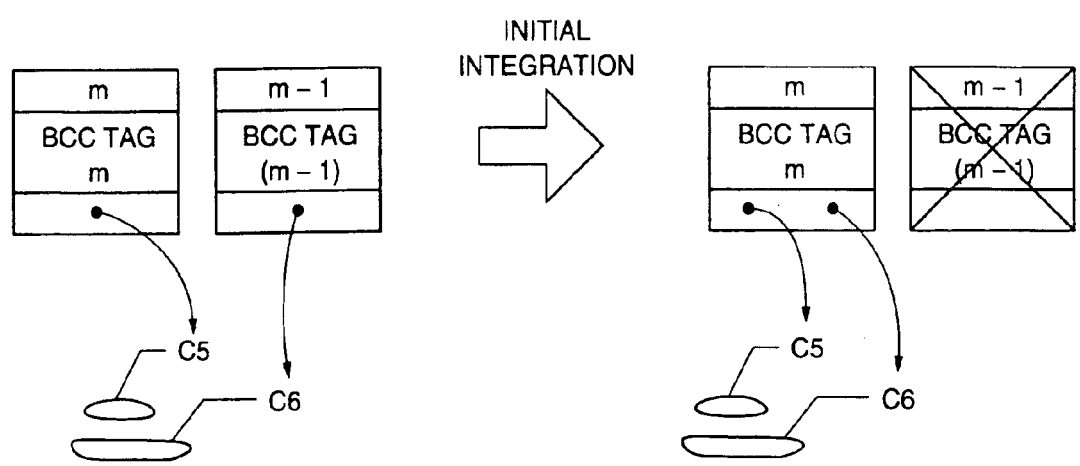
FIG. 39 is a diagram for explaining an initial integration of element tags.

FIG. 39 is a diagram for explaining the initial integration of the element tags. Since boundary point sequences C5 and C6 overlap in the character string direction in FIG. 39, the BCC tags respectively having the boundary point sequences C5 and C6 as its child are integrated.

The integration process of the step 212 is not carried out for the element tag which is set with "disable integration" as a result of the reserving process of the step 209. In addition, the step 212 resorts the element tags and the VS tag together in the character string direction.

In the step 213, the tag processor 3 generates the VCC tag by combining the element tags. The VCC tag indicates "possible candidate of a single character" when viewed from the character extracting process, and is represented by one or more combinations of the element tags. In other words, the element tag and the VS tag become children of the VCC tag.

Figure 9:
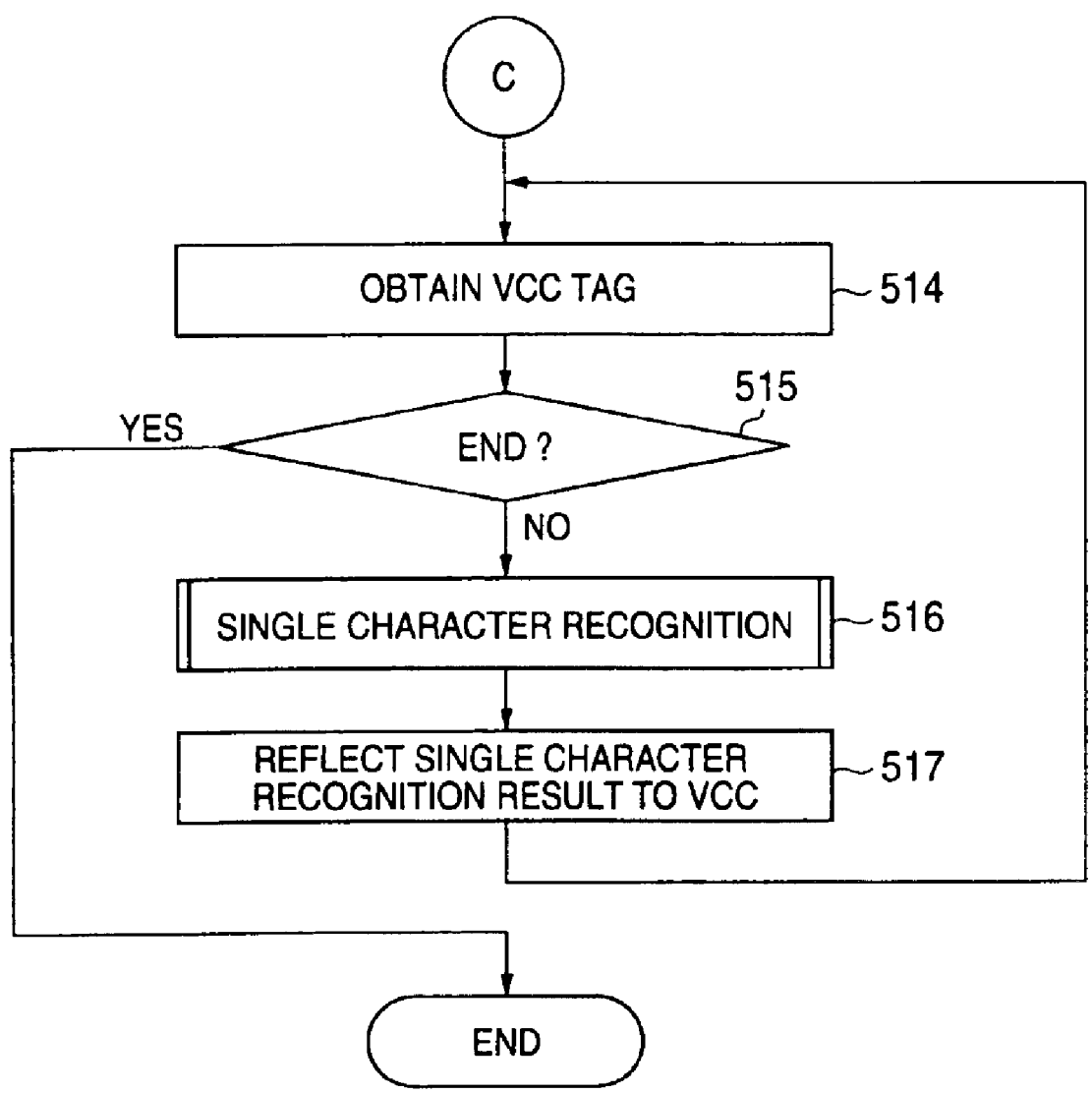
FIG. 9 is a flow chart for explaining the VCC tag generating process.
Figure 40:
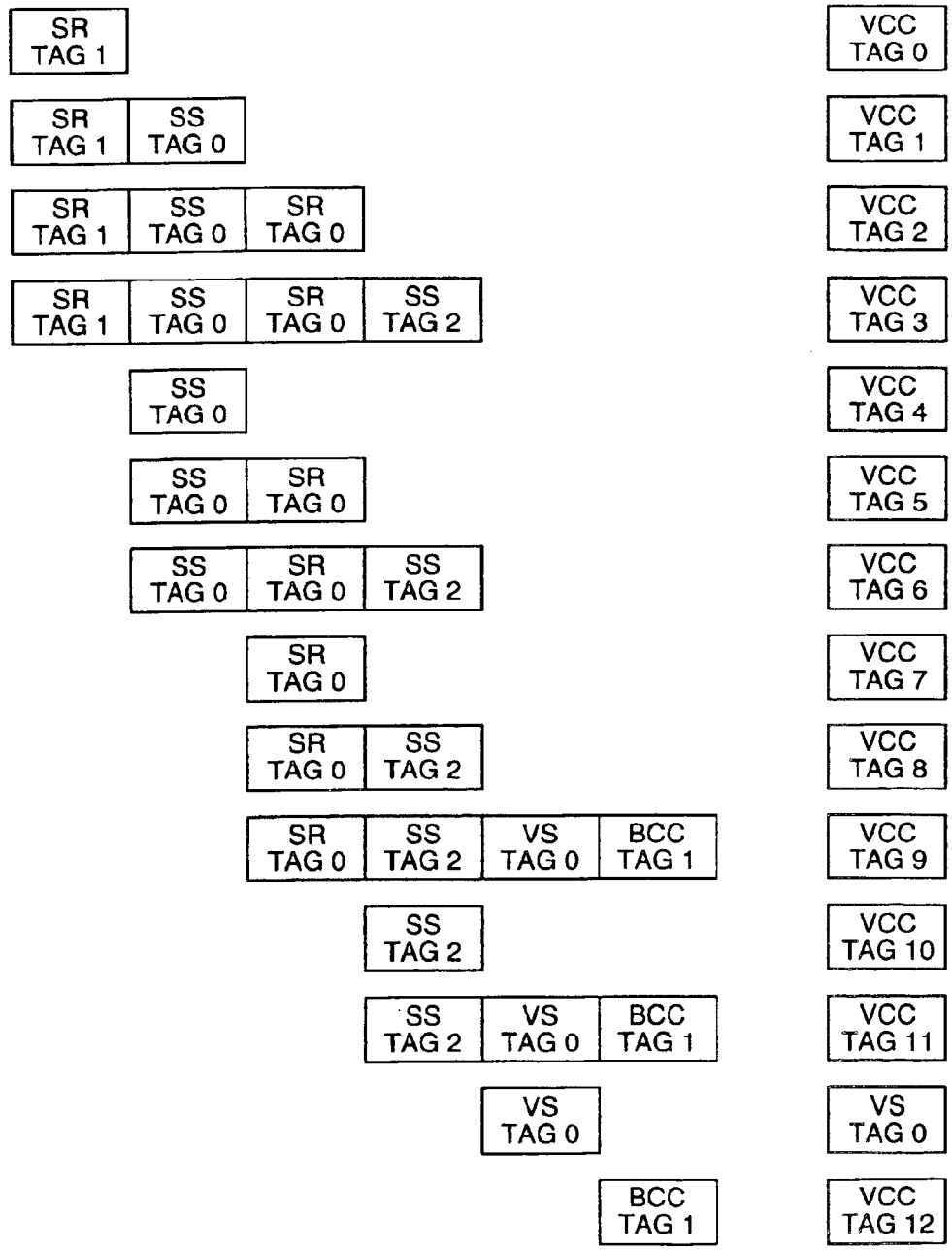
FIG. 40 is a diagram showing a VCC tag generating process.

FIGS. 8 and 9 are flow charts for explaining a VCC tag generating process of the step 213. In FIGS. 8 and 9, it is assumed for the sake of convenience that the character string direction is the horizontal direction from the left to right, but it is of course possible to carry out the VCC tag generating process when the character string direction is a vertical direction. FIG. 40 is a diagram showing the VCC tag generating process.

A step 501 shown in FIG. 8 prepares a VCC tag to be used temporarily in the following processes. Steps 502 through 504 form a loop process which successively obtains the tag (element tag or the VS tag) which becomes the processing target and regards the tag as being the left end. More particularly, the step 502 obtains the tag and regards the tag as being the left end. The step 503 decides whether or not the obtaining of the tag ended, and the process advances to a step 514 shown in FIG. 9 if the decision result in the step 503 is YES. On the other hand, if the decision result in the step 503 is NO, the step 504 decides whether or not the tag is other than the processing target, and the process returns to the step 502 if the decision result in the step 504 is YES. The process advances to a step 505 if the decision result in the step 504 is NO. The step 505 initializes the temporary VCC tag.

Steps 506 through 508 form a loop process which successively obtains the tag (element tag or the VS tag) which becomes the processing target and regards the tag as being the right end. It is assumed for the sake of convenience that the loop process which obtains the right end is started from the same element tag as the loop process which obtains the left end. More particularly, the step 506 obtains the tag and regards the tag as being the right end. The step 507 decides whether or not the obtaining of the tag ended, and the process returns to the step 502 if the decision result in the step 507 is YES. On the other hand, if the decision result in the step 507 is NO, the step 508 decides whether or not the tag is other than the processing target, and the process returns to the step 505 if the decision result in the step 508 is YES. The process advances to a step 509 if the decision result in the step 508 is NO.

By the above described process, all combinations of the tags which are arranged consecutively at the time of the sort in the step 212 are created. Since the tags are combined using the continuity as the condition, it is possible to reduce the number of VCC tags as compared to a case where all combinations of the tags are obtained.

The VS tag is not used on either end of the element tag, and is used only when sandwiched between the element tags, as may be seen from the VCC tags 9 and 11 in FIG. 40. In addition, when the obtained tag is the VS tag and the status thereof indicates "disable integration" in the step 508, the process returns to the step 502.

The step 509 registers the element tag of the right end obtained by the loop process of the steps 506 through 508 as a child tag of the VCC tag. A step 510 decides whether or not the VCC tag is other than the processing target, by referring to a predetermined condition, such as the geometrical condition of the character. If the VCC tag matches the predetermined condition (for example, the right end is the VS tag), it is judged that the VCC tag is not to remain, and the decision result of the step 510 is YES. In this case, the process returns to the step 505. For example, the size in the character string direction may be added to the predetermined condition. On the other hand, if the VCC tag does not match the predetermined condition and the status indicates "disable integration", the process returns to the step 502 from the step 501.

If the decision result in the step 510 is NO, a step 511 obtains one formal VCC tag, and copies (registers) the contents of the temporary VCC tag. In other words, the VCC tag is added to the element tag as shown in FIG. 40.

A step 512 checks whether or not the added child tag, that is, the element tag of the right end, is already reserved, and inherits the contents related to the single character recognition result if reserved. In other words, when the BCC tag which is the child tag of the VCC tag holds (that is, reserved) the character recognition result as shown in FIG. 36(b), the character recognition result is supplied to the VCC. A step 513 decides whether or not the integration is enabled. If the status indicates "disable integration" as a result of the reservation, the right end can no longer advance, and thus, the decision result in the step 513 is NO and the process returns to the step 502. In the case of "enable integration" or when reserved, the decision result in the step 513 is YES, and the process returns to the step 505 to further advance the right end.

When all of the element tags are obtained for both the left and right ends, the decision result in the step 503 becomes YES, and the step 514 shown in FIG. 9 is carried out.

The steps 514 and 515 form a lop process for successively obtaining the VCC tags. The step 514 obtains the VCC tag, and the step 515 decides whether or not the obtaining of the VCC tag ended. If the decision result in the step 515 is NO, a step 516 carries out a single character recognition which will be described later. A step 517 reflects the result of the single character recognition to the VCC tag, and the process returns to the step 514. In other words, the step 517 sets the character recognition result to the recognition result number 81 of the VCC shown in FIG. 25. When the single character recognition is ended for all of the VCC tags, the decision result in the step 515 becomes YES, ad the process ends so as to return to the step 214 shown in FIG. 5.

Figure 41:
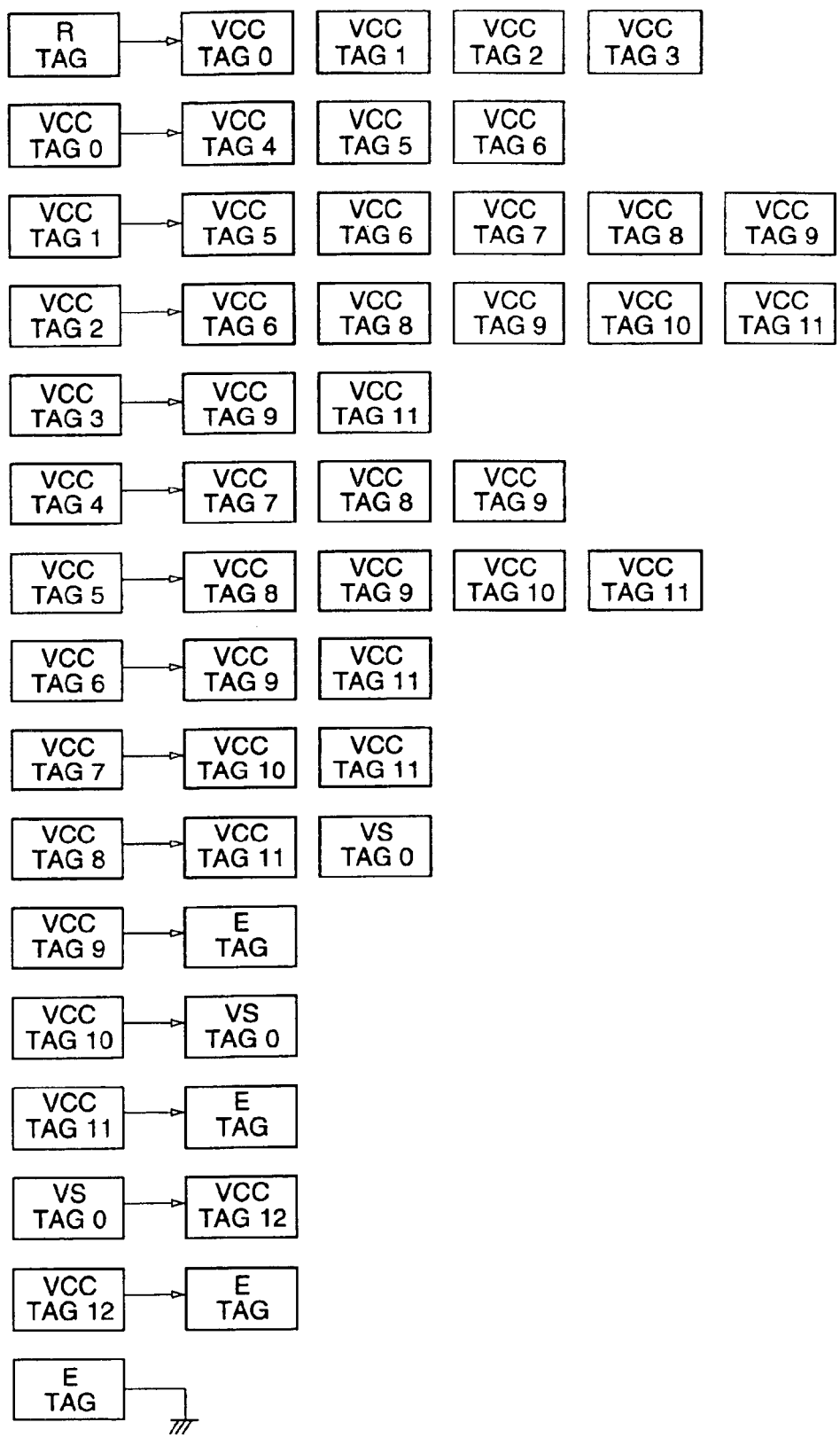
FIG. 41 is a diagram showing generated links.

Returning now to the description of FIG. 5, in the step 214, the link/path generator 6 generates the link with respect to the path tag (VCC tag and VS tag), in order to determine a local adjacency relationship for generating the path. FIG. 41 is a diagram showing generated links.

Figure 42:
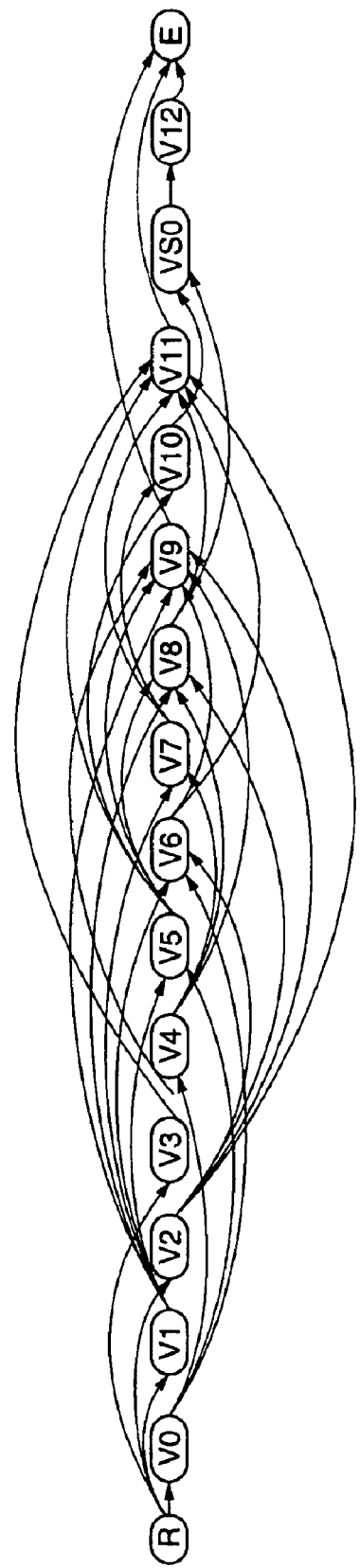
FIG. 42 is a diagram showing generated paths.
Figure 43:
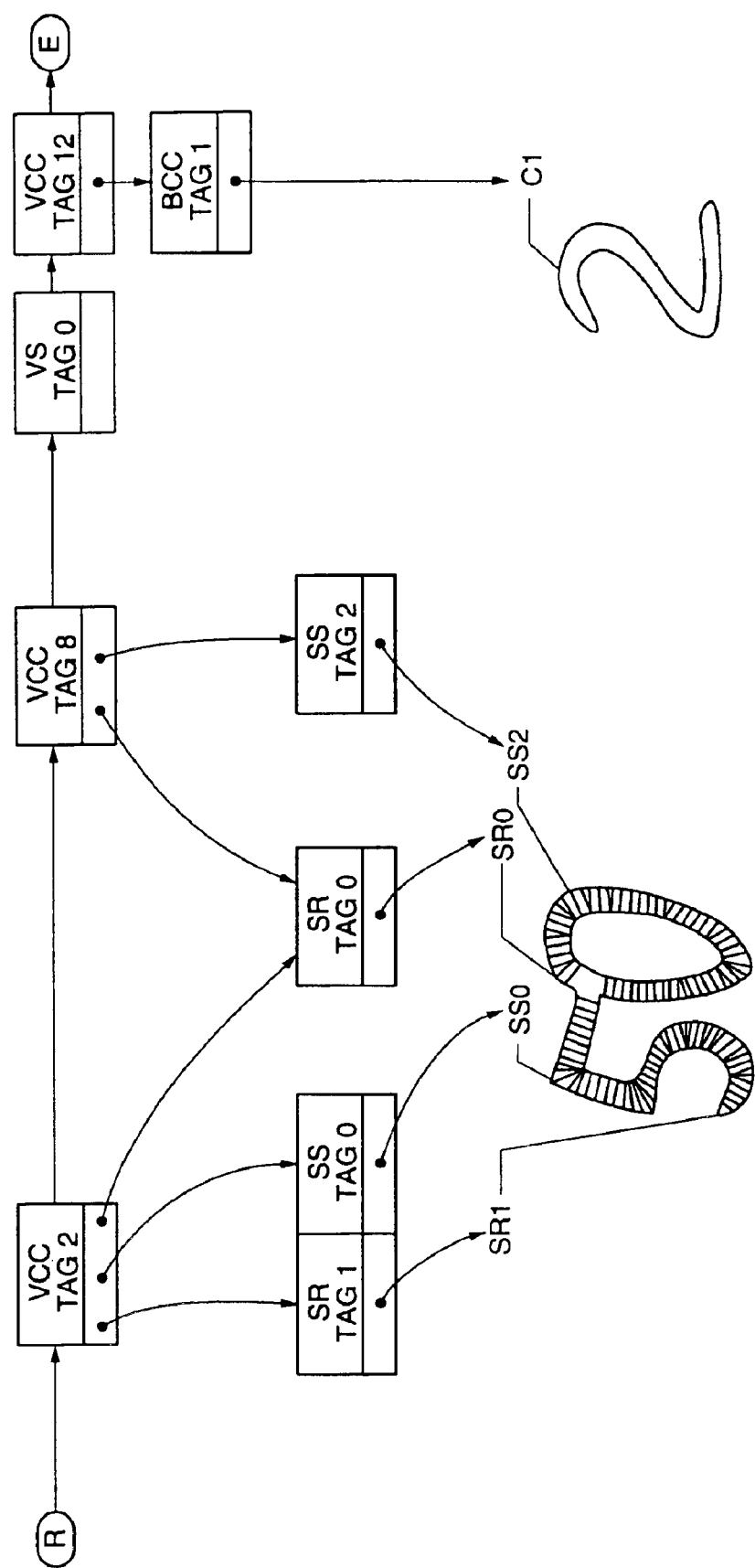
FIG. 43 is a diagram showing selected paths.

In the step 215, the path tag and its link are used to generate paths such as a path R->V0->V4->V7->V11->E shown in FIG. 42, for example, where the VCC tag 0 is indicated as V0, the VCC tag 1 is indicated as V1, . . . in FIG. 42, and an optimum path is selected. FIG. 43 is a diagram showing the selected path. Since the paths and the links form a tree structure, it is possible to select the optimum path by applying a DP matching or the like.

In a step 216, a re-recognition process is carried out on a specific character, with respect to the optimum path selected by the step 215. The contents of the specific character re-recognition process correspond to the expansion of the single character recognition process to the character string, and a large part of the process may be used in common therebetween.

Figure 10:
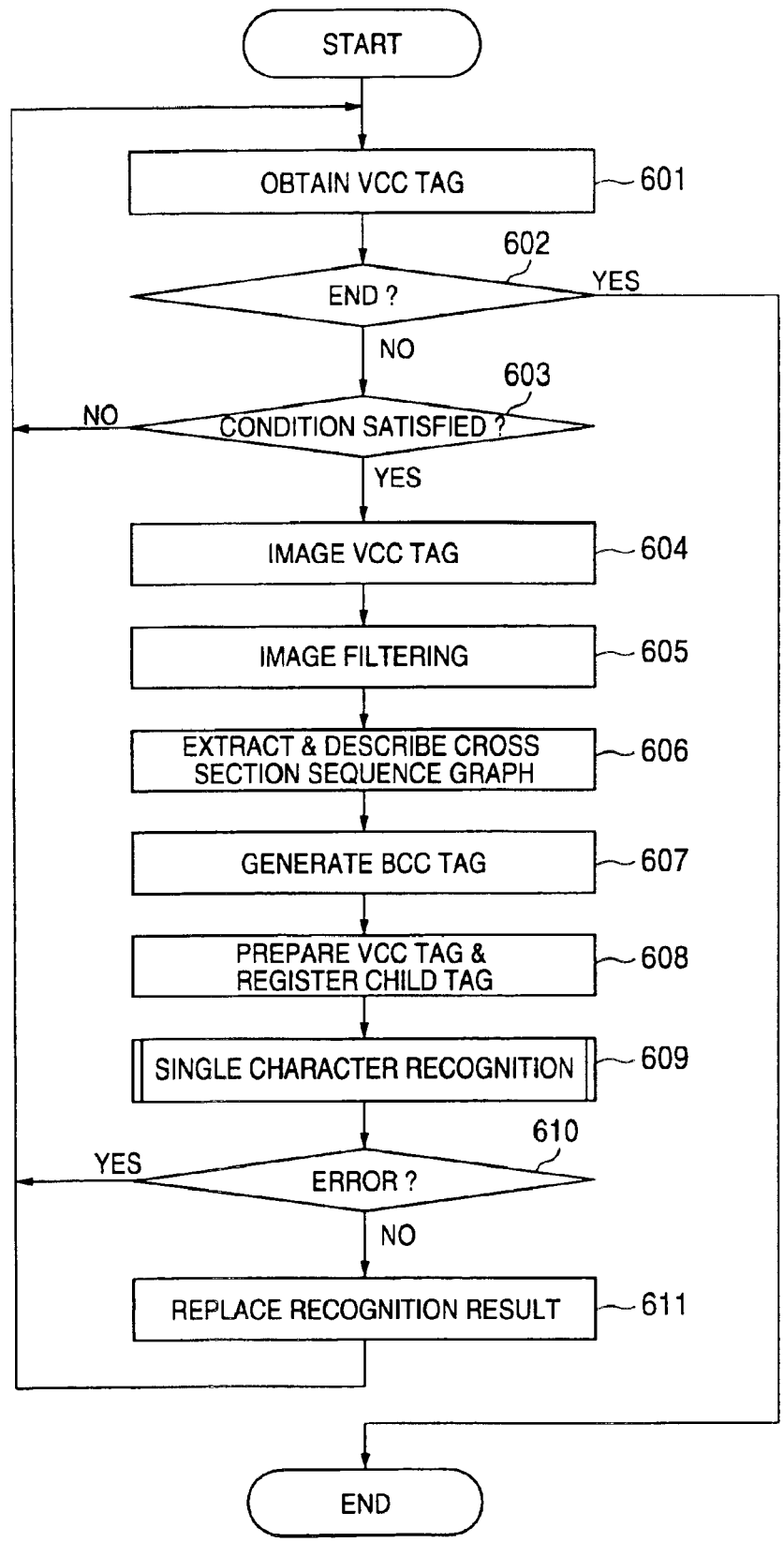
FIG. 10 is a flow chart for explaining a specific character re-recognition process in detail.

FIG. 10 is a flow chart for explaining a specific character re-recognition process in detail, which is carried out by the step 216. In FIG. 10, steps 601 through 603 form a loop process which successively obtains the VCC tag from the optimum path. The step 601 obtains the VCC tag, and the step 602 decides whether or not the obtaining of the VCC tag is ended. The process ends if the decision result in the step 602 is YES. On the other hand, if the decision result in the step 602 is NO, the step 603 decides whether or not a predetermined condition is satisfied. More particularly, the step 603 obtains the recognition result from the VCC tag, and determines whether or not it is the target of the subsequence processes. In the present invention, if the status of the recognition result structure shown in FIG. 27 indicates the necessity for the re-recognition, the decision result in the step 603 is YES, and the process advances to a step 604. The process returns to the step 601 if the decision result in the step 603 is NO.

The step 604 restructures only the necessary image from the VCC tag. The step 604 may be realized by a known method which is often used when making a font display. For example, it is possible to restructure the image by obtaining the boundary points from the VCC tag via the element tags, plotting the boundary points on the initialized image data, and filling black pixels between the plotted black pixels.

A step 605 carries out an adaptive filtering with respect to the character image. Black pixels are increased in a vicinity of the boundary points if the line width is narrow, and black pixels are removed in the vicinity of the boundary points if the line width is wide, by carrying out such an adaptive filtering.

A step 606 extracts and describes a cross section sequence graph from the filtered image. The process carried out by the step 606 is the same as that of the step 203 shown in FIG. 4.

A step 607 creates the BCC tag based on the newly obtained cross section sequence graph. The process carried out by the step 606 is the same as that of the step 204 shown in FIG. 4.

A step 608 prepares one temporary VCC tag, and registers this temporary VCC tag as a child of the newly obtained BCC tag. A step 609 carries out the single character recognition which will be described later with respect to the VCC tag having the BCC tag as its child.

A step 610 checks whether or not an error exists as a result of the processes carried out by the steps 605 through 609. The process returns to the step 601 if the decision result in the step 610 is YES. If the decision result in the step 610 is NO, a step 611 replaces the recognition result of the VCC tag, and the process returns to the step 601.

An access to the image data occurs during the processes of the steps 604 through 606, but the access only amounts to a few percent of the entire process. Accordingly, the importance of managing the higher layer and the lower layer of the cross section sequence graph by the tags having the same representation format will not be lost by the access.

Figure 11:
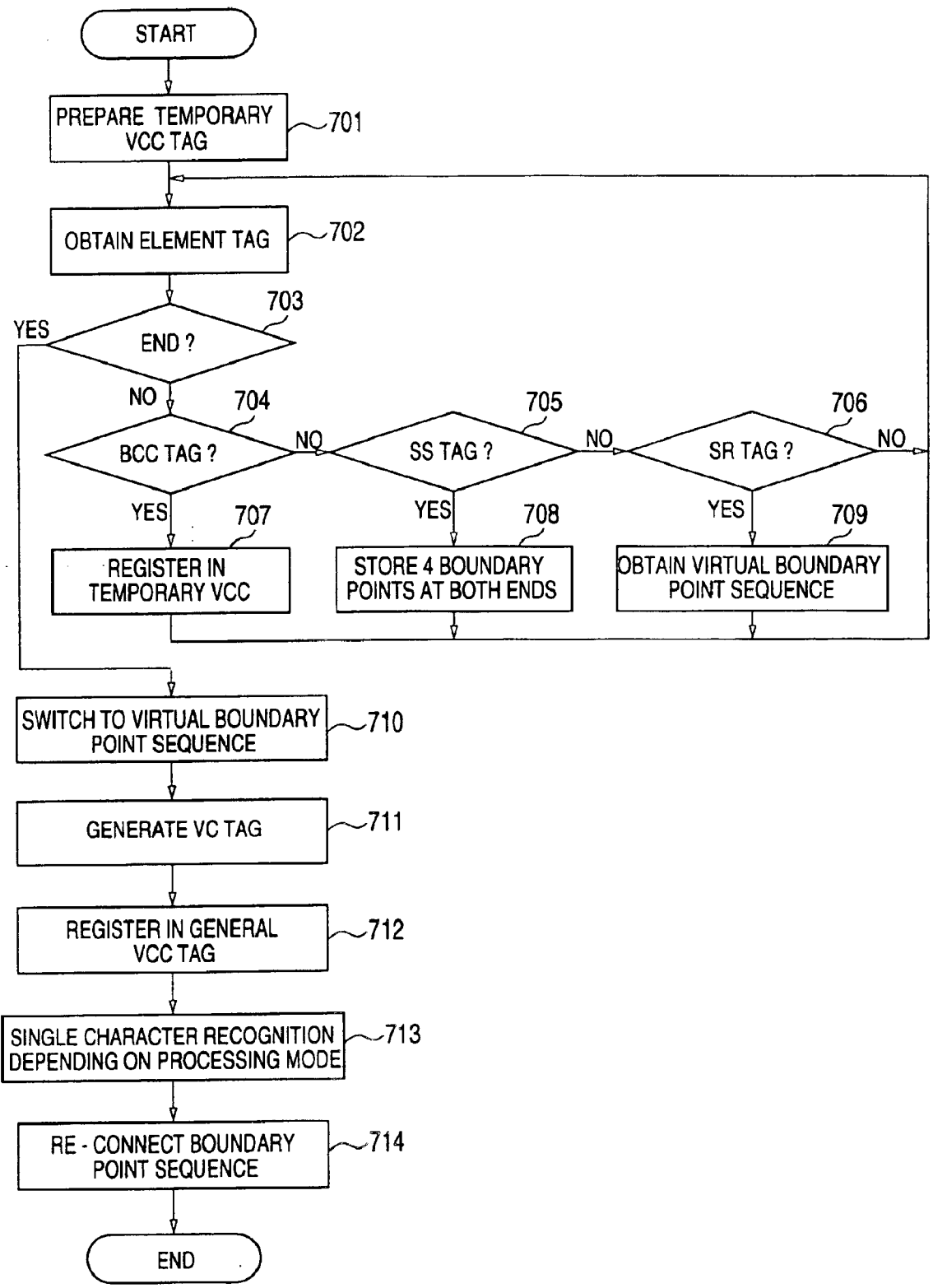
FIG. 11 is a flow chart for explaining a single character recognition process in detail.

On the other hand, in the conventional method which does not employ the concept of combining the feature elements as in the present invention, a process identical to the step 604 must be repeated between steps 710 and 711 of the single character recognition shown in FIG. 11, for example. In the case of this conventional method, the access to the image data amounts to 100% of the process.

Therefore, it may be seen that the present invention can effectively and considerably suppress the increase of the amount of processing that is required.

Returning now to the description of FIG. 5, a step 217 sets the recognition result which is obtained by the above described process, and the entire process ends.

Next, a description will be given of the single character recognition process carried out by the character recognition unit 7. FIG. 11 is a flow chart for explaining the single character recognition process in detail. The single character recognition process shown in FIG. 11 is carried out by the step 308 shown in FIG. 6, the step 516 shown in FIG. 9, and the step 609 shown in FIG. 10.

The single character recognition process shown in FIG. 11 is characterized in that the single character recognition is actually carried out while absorbing the differences in the kinds of element tags. In addition, the basic concept is to unify the recognition results to the boundary point sequence representation, and if necessary, the narrowly interpreted virtual boundary point sequence is used to temporarily switch the connection of the boundary point sequences. A plurality of character recognition techniques are used at the same time as the recognition technique, but the features used for the recognition are not obtained from the image. The features used for the recognition are obtained from the cross section sequence graph and the virtual boundary point sequences via the tags. As a result, it is possible to realize the concept of the present invention which uses the "combination of feature elements".

In FIG. 11, a step 701 prepares the temporary VCC tag (empty VCC tag) and initializes the VCC tag.

A step 702 obtains the element tag, and a step 703 decides whether or not the obtaining of the element tag is ended. The process advances to a step 704 if the decision result in the step 703 is NO, and the process advances to a step 710 if the decision result in the step 703 is YES. The steps 702 and 703 form a repeating process which successively obtains all of the element tags from the VCC tag which is the processing target.

Figure 44:
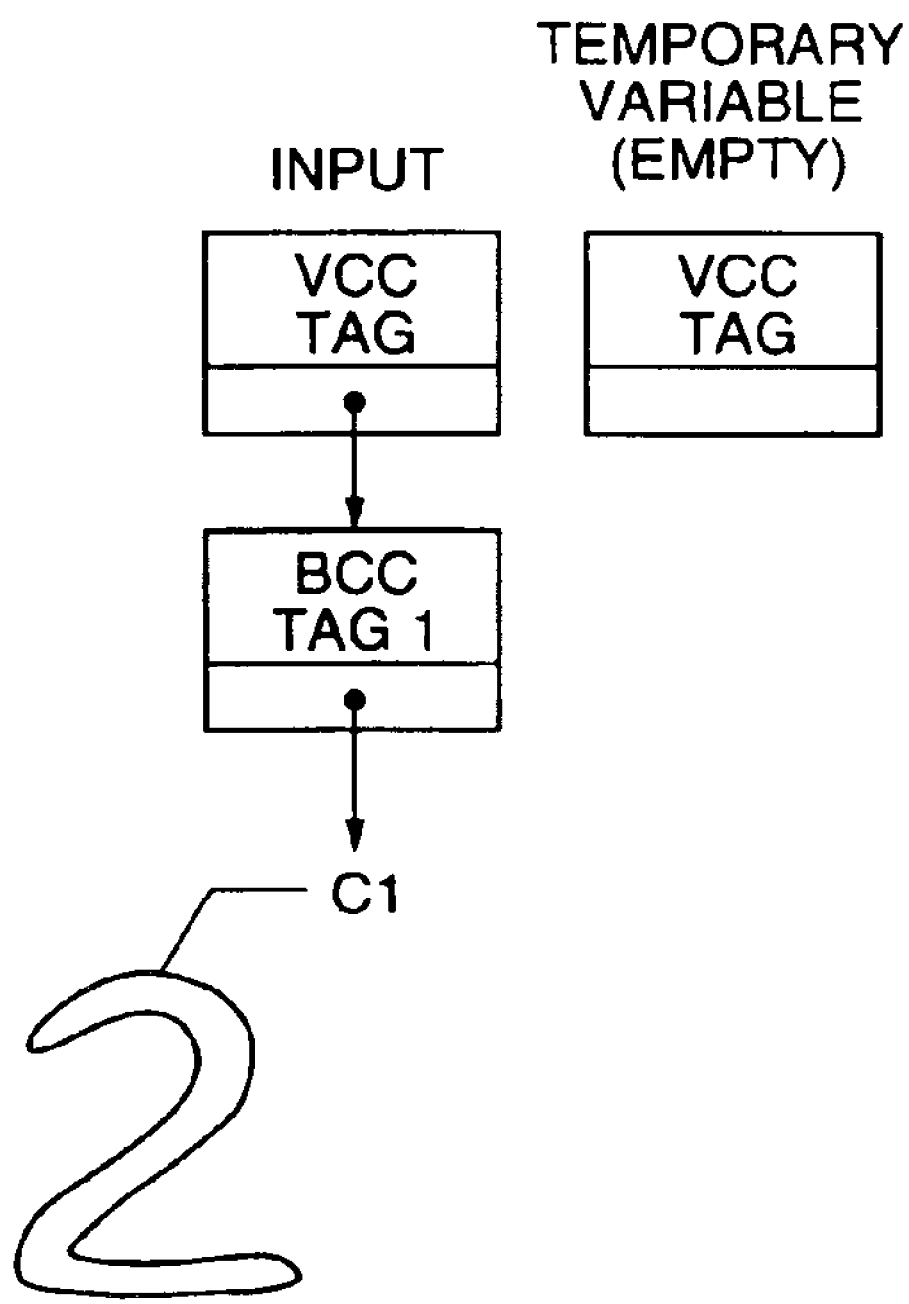
FIG. 44 is a diagram showing a case where a child of the VCC tag is a BCC tag.

The step 704 decides whether or not the obtained element tag is the BCC tag, and a step 707 registers the BCC tag as a child of the temporary VCC tag if the decision result in the step 704 is YES. The process returns to the step 702 after the step 707. FIG. 44 is a diagram showing a case where the BCC tag is the child of the VCC tag. In addition, FIG. 45 is a diagram showing a case where the BCC tag is registered as the child of the temporary VCC tag.

Figure 45:
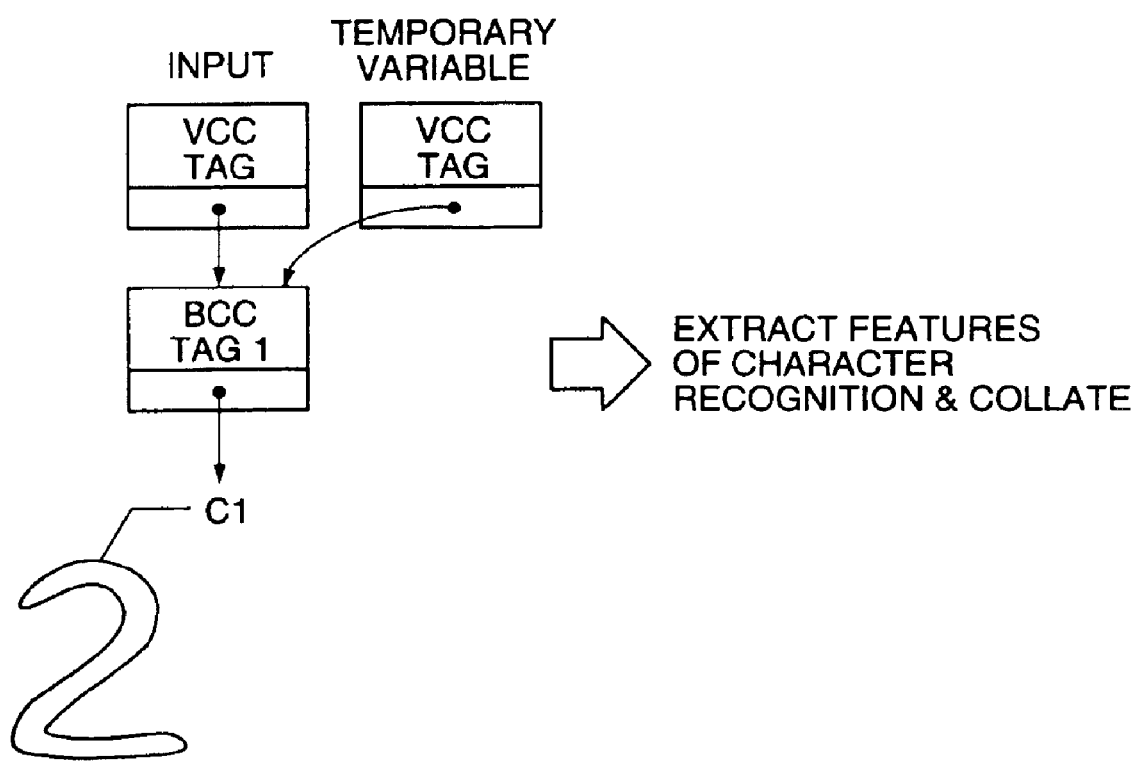
FIG. 45 is a diagram showing a case where the BCC tag is temporarily registered as the child of the VCC tag.

In the case shown in FIG. 45, the number of BCC tags is one, and thus, the process advances from the step 703 to the step 710. Since the child of the BCC tag is the boundary point sequence C1, the steps 710, 711 and 712 do not carry out any processing, and the process advances to a step 713.

The step 713 carries out a character recognition with respect to the boundary point sequence C1 depending on the processing mode, and stores the recognition result in the BCC tag. In this case, the matching technique proposed in a Japanese Laid-Open Patent Application No.3-108079 (now Japanese Patent No.2719202) may be employed, by preparing a plurality of character recognition methods, carrying out the character recognition by combining predetermined recognition methods depending on the processing mode, and integrating the recognition results to obtain the recognition result of the step 713. The details of such a technique is not directly related to the subject matter of the present invention, and a description thereof will therefore be omitted in this specification. The important point to be noted about this step 713 is the features which are used for the character recognition methods. In other words, the features based on the density inclination direction of the boundary point, the graph representation of the boundary point sequence, and the graph representation of the frame make a very good matching with the cross section sequence graph, and the features are not obtained directly from the image plane but from the cross section sequence graph via the tags.

In the particular case shown in FIG. 45, a step 714 does not carry out any processing, and the process ends.

Figure 46:
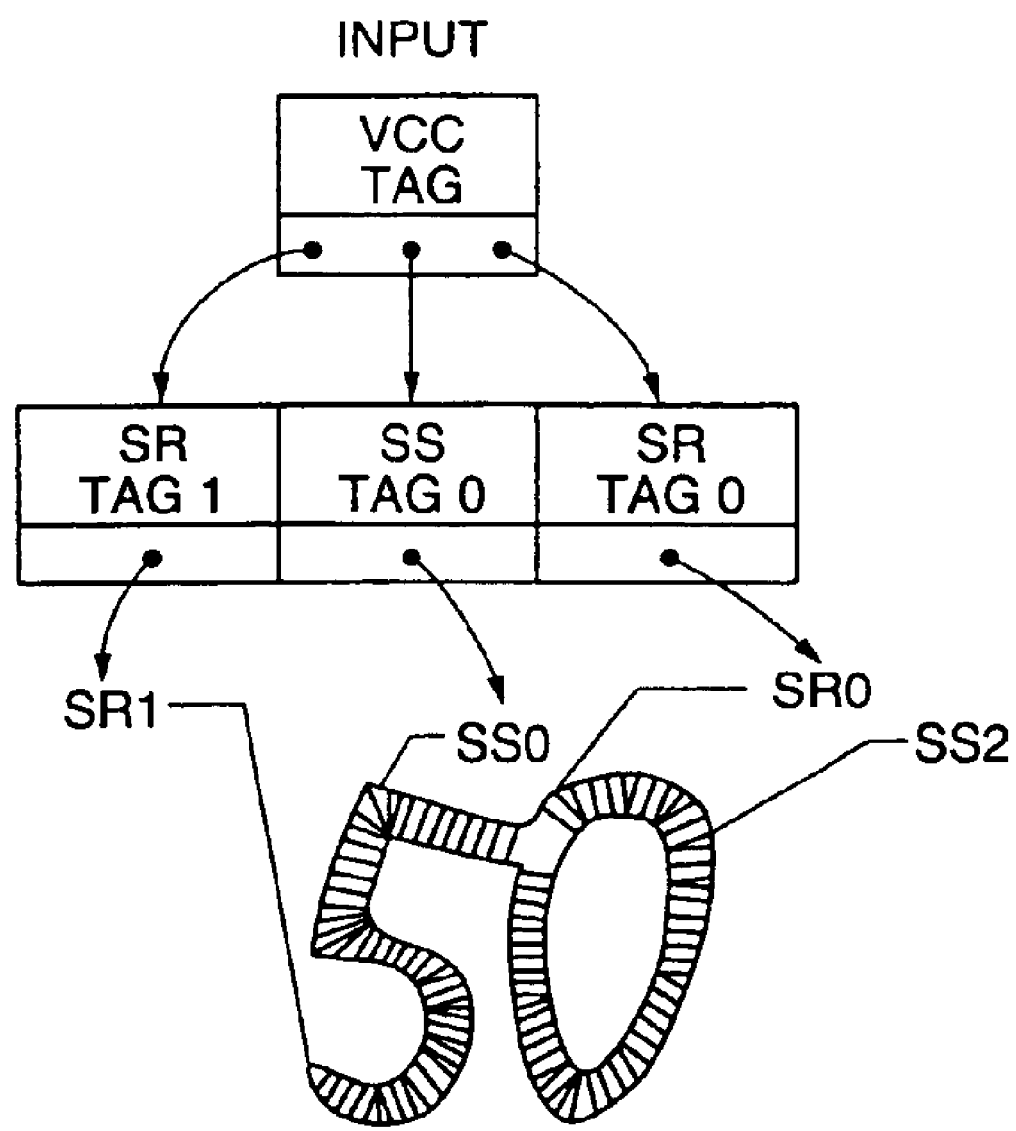
FIG. 46 is a diagram showing a case where a child of the VCC tag is a SS/SR tag.

Next, a description will be given of a case where the element tag obtained by the step 702 is the SS or SR tag, by referring to FIG. 46. FIG. 46 is a diagram showing a case where a child of the VCC tag is a SS/SR tag. In FIG. 46, there are three element tags, namely, the SR tag 1, the SS tag 0 and the SR tag 0.

In FIG. 11, if the decision result in the step 704 is NO, a step 705 decides whether or not the obtained element tag is the SS tag, and the process advances to a step 708 and then returns to the step 702 if the decision result in the step 705 is YES. If the decision result in the step 705 is NO, a step 706 decides whether or not the obtained element tag is the SR tag. If the decision result in the step 706 is YES, the process advances to a step 709 and then returns to the step 702. On the other hand, the process returns to the step 702 if the decision result in the step 706 is NO.

Figure 47:
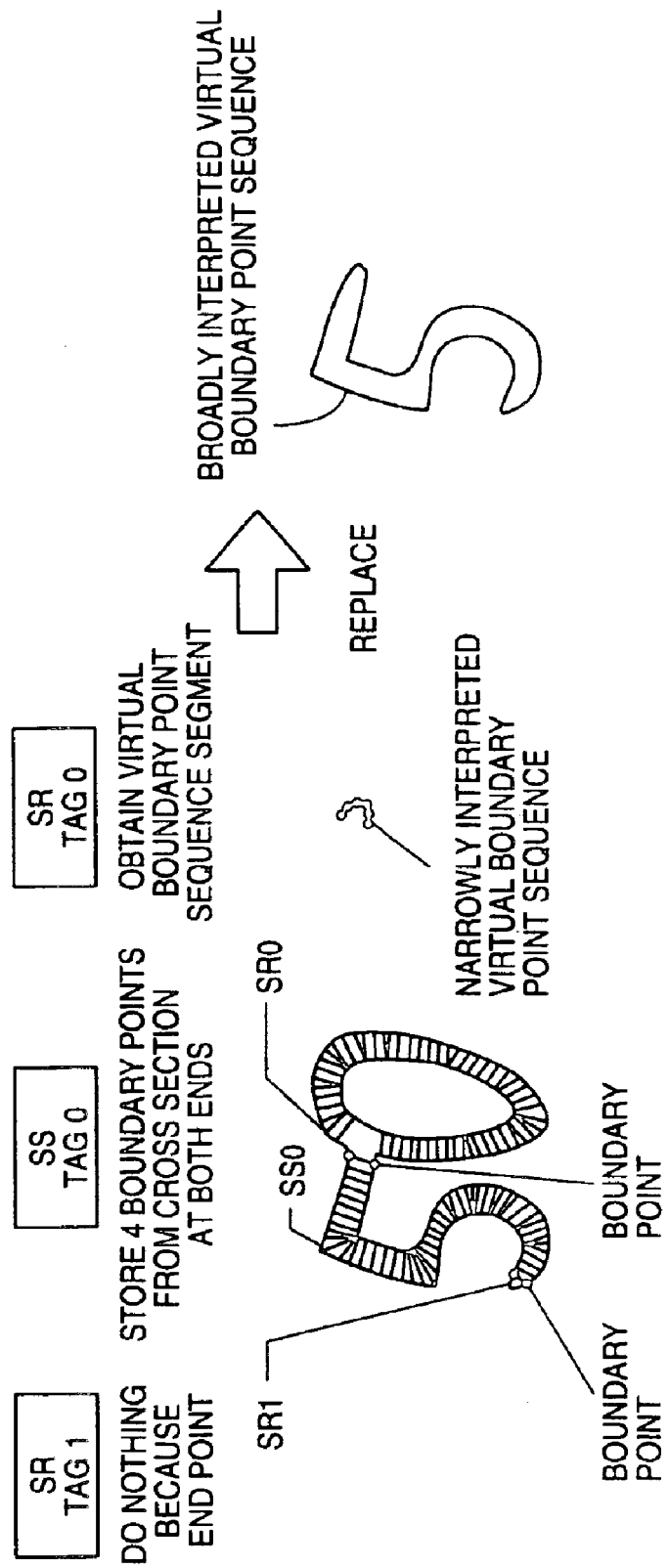
FIG. 47 is a diagram for explaining processing of the SS and SR tags.

When the first SR tag 1 shown in FIG. 46 is obtained, the decision result in the step 706 becomes YES but the step 709 does not carry out any processing since the SR tag 1 is an end point. Hence, the next SS tag 0 is obtained, and in this case, the decision result in the step 705 becomes YES and the step 708 stores the four boundary points on both ends. In other words, in FIG. 47, the two boundary points of the cross section on the side of SR1 and the two boundary points of the cross section on the side of SR0 are stored. FIG. 47 is a diagram for explaining the processing of the SS and SR tags. The four boundary points are the information necessary to temporarily switch the connection of the boundary point sequences in the step 710.

Figure 48:
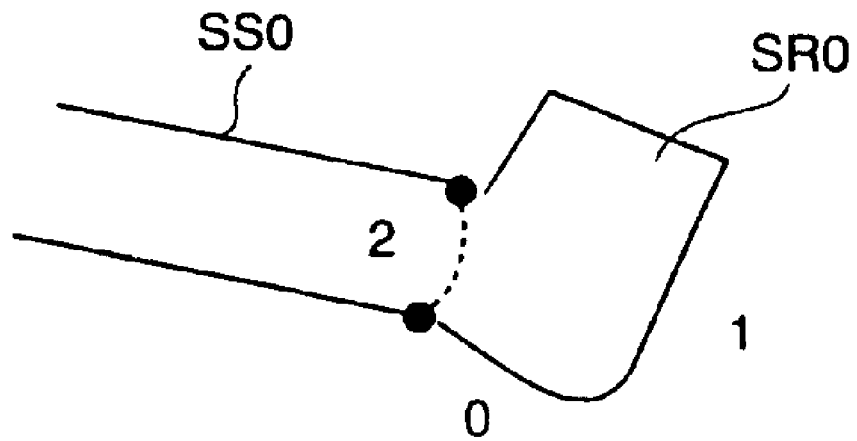
FIG. 48 is a diagram showing a connecting pattern of a singular region SR0.

Finally, when the SR0 tag is obtained, the decision result in the step 706 becomes YES and the step 709 acquires the narrowly interpreted virtual boundary point sequence. In other words, the singular region is obtained via the SR tag, and the connecting pattern of the singular region shown in FIG. 23 is obtained by a combination with the cross section sequence which is obtained via the SS tag. FIG. 48 is a diagram showing a connecting pattern of a singular region SR0 obtained by SR analysis. In FIG. 48, it is indicated that the cross section number having the start boundary point and the cross section number having the end boundary point are both 2.

Next, the narrowly interpreted virtual boundary point sequence which is obtained in advance in the format shown in FIG. 22 by the step 210 shown in FIG. 4, is collated using the connecting pattern shown in FIG. 23 as a key, so as to obtain the narrowly interpreted virtual boundary point sequence shown in FIG. 47.

The obtained element tag is the VS tag when the decision result in the step 706 is NO.

Only when the boundary points which are obtained and temporarily stored in the step 708 exist, the step 710 uses the boundary points as starting points, to successively obtain the boundary point structures in the connected order. In addition, the step 710 temporarily switches the connection to the virtual boundary point sequence obtained by the step 709 if necessary. In other words, the cross section of SS0 on the side of SR0 is replaced by the virtual boundary point sequence, as indicated by a dotted line in FIG. 48.

Figure 49:
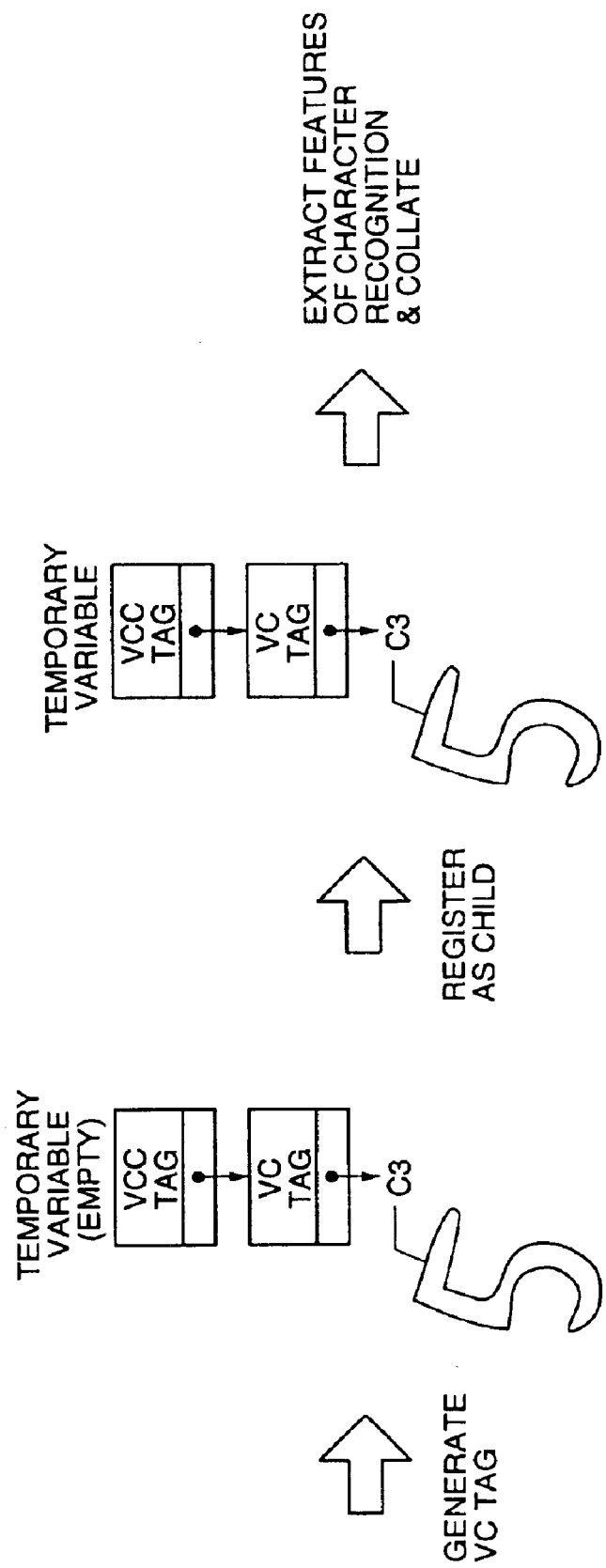
FIG. 49 is a diagram showing a generation of a VC tag having a broadly interpreted virtual boundary point sequence as a child thereof.

In the step 711, the four boundary points and the temporarily replacing virtual boundary point sequence are traced to create the broadly interpreted virtual boundary point sequence shown in FIG. 47, and creates a BCC tag (that is, VC tag) shown in FIG. 49 having the broadly interpreted virtual boundary point sequence C3 as the child. FIG. 49 is a diagram showing a generation of the VC tag having the broadly interpreted virtual boundary point sequence as the child thereof. Accordingly, the singular region and the cross section sequence shown in FIG. 46 are separated by the singular region as shown in FIG. 49 and converted into the boundary point sequence, so that the recognition process may be carried out with respect to this boundary point sequence in the step 713.

If the VC tag created by the step 711 exists, the step 712 registers the VC tag as a child of the temporary VCC tag.

In the step 713, the character recognition is carried out depending on the processing mode and the character recognition result is stored in the VC tag. As described above, a plurality of character recognition methods are prepared, the character recognition is carried out by combining predetermined recognition methods depending on the processing mode, and the recognition results are integrated to obtain the recognition result of the step 713.

If the virtual boundary point sequence temporarily switched in the step 710 exists, the step 714 returns the state to the state before the switching, and the process ends. The single character recognition process is carried out in the above described manner.

FIG. 50 is a diagram for explaining processed results obtained by this embodiment of the present invention. FIG. 50(*a*) shows an image of contacting characters, FIG. 50(*b*) shows a cross section sequence graph, FIG. 50(*c*) shows a virtual boundary point sequence, and FIG. 50(*d*) shows a processed result. In FIG. 50, the contacting characters are appropriately separated and extracted in the processed result via the virtual boundary point sequence which is generated based on the cross section sequence graph. The processed result in FIG. 50 is obtained by plotting the boundary points in order to visualize the image which is represented in the feature level.

Figure 51:
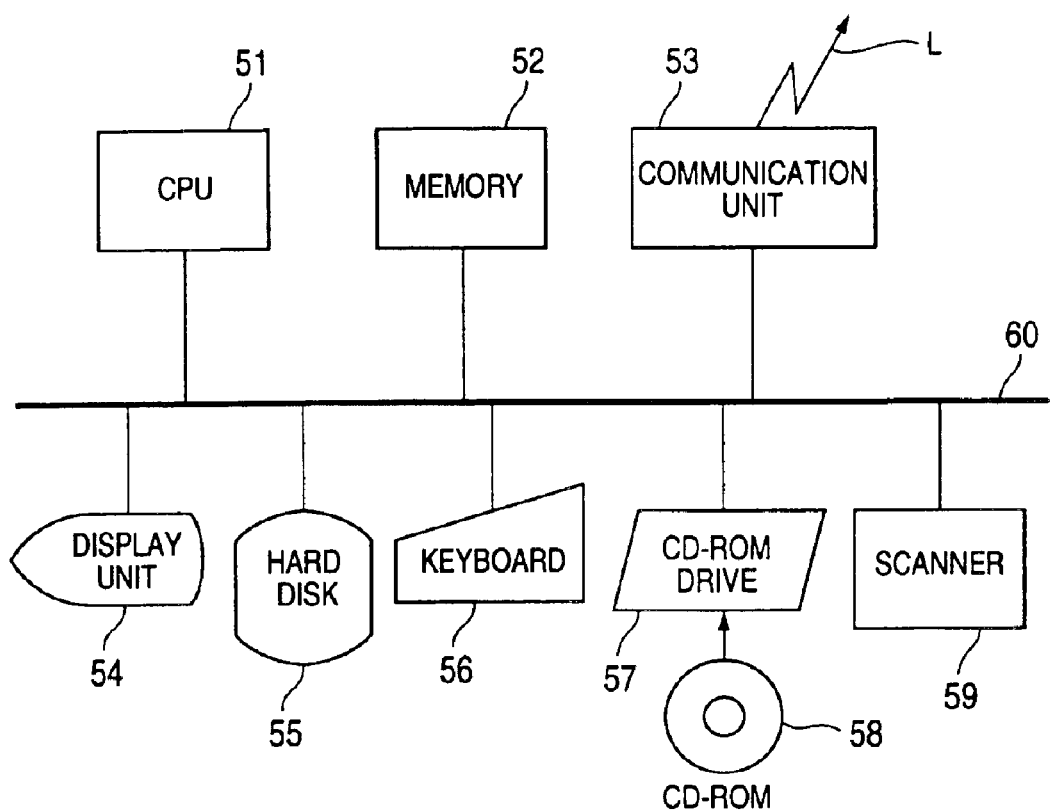
FIG. 51 is a diagram showing a structure of the embodiment when realizing the present invention by software.

FIG. 51 is a diagram showing a structure of the embodiment when realizing the present invention by software. The structure shown in FIG. 51 includes a CPU 51, a memory 52, a communication unit 53 for connecting to a communication line L, a display unit 54, a hard disk 55 within a hard disk drive (not shown), a keyboard 56, a CD-ROM driver 57 for a CD-ROM 58, and a scanner 59 which are connected via a bus 60. This structure corresponds to the structure of a known personal computer or the like, and it is of course possible to use other known structures to realize the present invention.

An image which is a recognition target is input from the scanner 59, for example, and is input to the computer. The recognition target image may be stored in the hard disk 55 or, input to the computer via the communication line L or network via the communication unit 53.

The CPU 51 carries out the processing steps and the processing functions with respect to the input recognition target image (image data) to carry out the character recognition process, and displays the character recognition result on the display unit 54 based on a program.

The program may be recorded on the CD-ROM 58, and installed into the computer by reading the program into the hard disk 55, the memory 52 or the like. The program may be recorded on any kind of recording medium capable of storing a program, such as magnetic, optical and magneto-optical disks and cards, and semiconductor memory devices. The program may also be installed into the computer from another computer, via media such as the communication line L or the network and the communication unit 53.

The computer which executes the program described above therefore forms a character recognition apparatus which carries out the character recognition using the character recognition method according to the present invention.

Therefore, according to the present invention, it is possible to obtain the following advantageous effects.

First, since the virtual boundary point sequence is generated with respect to the singular region of the cross section sequence graph, it is possible to appropriately extract contacting characters of the character string and recognize the characters with a high accuracy.

In addition, because the virtual boundary point sequence is generated in the singular region where the contacting characters of the character string exist, it is possible to positively separate the contacting characters.

When the virtual boundary point sequence is generated by a predetermined curve generating method, it is possible to smoothen the character curve, and accordingly improve the recognition accuracy of the character recognition.

Moreover, when the image features of different hierarchical layers are managed using tags, it is possible to generate character candidates using combinations of the tags, thereby reducing access to the image data and increasing the processing speed of the recognition process.

When combining the tags, the overlap of the tags spanning a plurality of hierarchical layers may be removed, so as to suppress the number of character candidates and reduce the amount of processing that is required.

In addition, by using identical representation formats, that is, identical logic structures, for the tags, it becomes possible to carry out the processes using the tags in common, to thereby enable the structure of the system such as the character recognition apparatus to be simplified.

Further, the present invention is not limited to these embodiments, but various variations and modifications may be made without departing from the scope of the present invention.

What is claimed is:

1. A character recognition method for carrying out a character recognition using a cross section sequence graph which describes features of a character image, comprising the steps of:
   (a) extracting the cross section sequence graph from a character string image;
   (b) analyzing a singular region of the cross section sequence graph and generating a virtual boundary point sequence in the singular region based on an analyzed result;
   (c) generating character candidates by combining structural elements of the cross section sequence graph and recognizing one character by supplying the virtual boundary point sequence with respect to the generated character candidates if necessary; and
   (d) recognizing a character string based on an adjacency relationship of the character candidates which are recognized as one character in said step (c).

2. The character recognition method as claimed in claim 1, wherein the singular region in which the virtual boundary point sequence is generated includes a region where character string is closely adjacent or in contact.

3. The character recognition method as claimed in claim 1, further comprising the step of:
   (e) determining a generating position of the virtual boundary point sequence based on the singular region and a connecting sequence and positions of cross section sequences connecting to the singular region.

4. The character recognition method as claimed in claim 1, wherein said step (b) refers to a direction of the character string when generating the virtual boundary point sequence and generating no virtual boundary point sequence between cross section sequences not corresponding to the direction of the character string.

5. The character recognition method as claimed in claim 1, wherein said step (b) generates the virtual boundary point sequence using a predetermined curve generating method.

6. The character recognition method as claimed in claim 1, further comprising the step of:
   (e) dividing the structural elements into first and second layers and managing the first and second layers by tags.

7. The character recognition method as claimed in claim 6, wherein the first layer of the structural elements include the cross section sequences and the singular region, and said step (e) manages the cross section sequences by a first tag and manages the singular region by a second tag.

8. The character recognition method as claimed in claim 7, wherein the second layer of the structural elements include boundary point sequences, and said step (e) manages the boundary point sequences by a third tag.

9. The character recognition method as claimed in claim 8, wherein said step (e) manages a blank region between characters of the character string by a fourth tag.

10. The character recognition method as claimed in claim 9, wherein said step (c) generates the character candidates by combining the first, second, third and fourth tags, and said step (e) manages the generated character candidates by a fifth tag.

11. The character recognition method as claimed in claim 10, wherein said step (c) eliminates an overlap of tags when combining the first, second and third tags, by using either one of the tag of the first layer and the tag of the second layer, with respect to identical structural elements.

12. The character recognition method as claimed in claim 10, wherein said step (d) recognizes the character string by generating links among fifth tags, generating paths among generated links, and selecting an optimum path of the generated paths.

13. A computer-readable storage medium which stores a program for causing a computer to carry out a character recognition, said program comprising:
   means for causing the computer to extract from a character string image, cross section sequences and a singular region of a first layer of a cross section sequence graph, and boundary point sequence of a second layer of the cross section sequence graph;
   means for causing the computer to generate character candidates by combining the cross section sequences, the singular region and the boundary point sequences;

means for causing the computer to recognize one character with respect to the generated character candidates; and means for causing the computer to recognizing a character string based on an adjacency relationship of the character candidates which are recognized as one character.

14. The computer-readable storage medium as claimed in claim 13, wherein the program further comprises:

means for causing the computer to analyze the singular region and generating a virtual boundary point sequence in the singular region based on an analyzed result of the singular region; and means for causing the computer to convert the character candidates made up of the cross section sequences and the singular region into boundary point sequences by supplying the virtual boundary point sequence if necessary when recognizing one character.

15. The computer-readable storage medium as claimed in claim 14, wherein the program further comprises:

means for generating a first tag for managing the cross section sequences, a second tag for managing the singular region, a third tag for managing the boundary point sequences, and a fourth tag for managing a blank within the character string.

16. The computer-readable storage medium as claimed in claim 15, wherein the program further comprises:

means for causing the computer to generating a fifth tag for managing character candidates which are generated by combining the first, second, third and fourth tags.

17. The computer-readable storage medium as claimed in claim 16, wherein the program further comprises:

means for causing the computer to managing the first, second, third and fifth tags by identical logic structures.

18. A computer-readable storage medium which stores a program for causing a computer to carry out a character recognition using a cross section sequence graph which describes features of a character image, said program comprising the steps of:

(a) causing the computer to extract the cross section sequence graph from a character string image;

(b) causing the computer to analyze a singular region of the cross section sequence graph and generating a virtual boundary point sequence in the singular region based on an analyzed result;

(c) causing the computer to generate character candidates by combining structural elements of the cross section sequence graph and recognize one character by supplying the virtual boundary point sequence with respect to the generated character candidates if necessary; and (d) causing the computer to recognize a character string based on an adjacency relationship of the character candidates which are recognized as one character in said step (c).

19. A character recognition apparatus for carrying out a character recognition using a cross section sequence graph which describes features of a character image, comprising:

an extracting unit configured to extract the cross section sequence graph from a character string image;

an analyzing unit configured to analyze a singular region of the cross section sequence graph and to generate a virtual boundary point sequence in the singular region based on an analyzed result;

a generating unit configured to generate character candidates by combining structural elements of the cross section sequence graph and to recognize one character by supplying the virtual boundary point sequence with respect to the generated character candidates if necessary; and a recognizing unit configured to recognize a character string based on an adjacency relationship of the character candidates which are recognized as one character in said generating unit.

20. A character recognition apparatus for carrying out a character recognition using a cross section sequence graph which describes features of a character image, comprising:

means for extracting the cross section sequence graph from a character string image;

means for analyzing a singular region of the cross section sequence graph and for generating a virtual boundary point sequence in the singular region based on an analyzed result;

means for generating character candidates by combining structural elements of the cross section sequence graph and for recognizing one character by supplying the virtual boundary point sequence with respect to the generated character candidates if necessary; and means for recognizing a character string based on an adjacency relationship of the character candidates which are recognized as one character in said means for generating.

* * * * *